(12) United States Patent
Kadowaki et al.

(10) Patent No.: US 7,460,448 B2
(45) Date of Patent: Dec. 2, 2008

(54) OPTICAL PICK-UP HEAD, OPTICAL INFORMATION APPARATUS, AND OPTICAL INFORMATION REPRODUCING METHOD

(75) Inventors: Shin-ichi Kadowaki, Sanda (JP); Kousei Sano, Osaka (JP); Akihiro Arai, Souraku-gun (JP); Katsuhiko Yasuda, Neyagawa (JP); Tomotada Kamei, Neyagawa (JP); Hiroaki Yamamoto, Kawabe-gun (JP); Fumitomo Yamasaki, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/789,106

(22) Filed: Apr. 23, 2007

(65) Prior Publication Data
US 2007/0195664 A1 Aug. 23, 2007

Related U.S. Application Data

(62) Division of application No. 10/646,602, filed on Aug. 22, 2003, now Pat. No. 7,227,819.

(30) Foreign Application Priority Data

| Aug. 23, 2002 | (JP) | ............................. 2002-243059 |
| Feb. 26, 2003 | (JP) | ............................. 2003-048932 |
| Feb. 27, 2003 | (JP) | ............................. 2003-050846 |
| Feb. 28, 2003 | (JP) | ............................. 2003-052828 |
| Feb. 28, 2003 | (JP) | ............................. 2003-052829 |

(51) Int. Cl.
*G11B 7/00* (2006.01)

(52) U.S. Cl. ............. 369/44.41; 369/44.27; 369/112.01

(58) Field of Classification Search ........................ None
See application file for complete search history.

(56) References Cited

U.S. PATENT DOCUMENTS 5,159,589 A 10/1992 Ohsato (Continued)

FOREIGN PATENT DOCUMENTS

EP 0 492 515 7/1992

(Continued)

*Primary Examiner*—Muhammad N. Edun
(74) *Attorney, Agent, or Firm*—Hamre, Schumann, Mueller & Larson, P.C.

(57) ABSTRACT

An optical information apparatus of the present invention includes: an optical pick-up head including: a light source; a diffraction unit; a condensing unit; a beam splitter; a photodetector; and a tracking error signal generator. An optical recording medium has tracks arranged substantially at a constant pitch. An average of a pitch is tp. When a main beam is placed on the track, a first sub-beam and a second sub-beam are placed between the tracks. The tracking error signal generator performs a differential arithmetic operation with respect to signals output from a light-receiving portion receiving the main beam to generate a first push-pull signal, performs a differential arithmetic operation with respect to signals output from the light-receiving portions receiving the first sub-beam and the second sub-beam to generate a second push-pull signal, and performs a differential arithmetic operation with respect to the first push-pull signal and the second push-pull signal to generate a tracking error signal, in a case where an amplitude of the first push-pull signal obtained at the pitch tp is fluctuated when the light beam is scanned in a direction orthogonal to the tracks of the optical recording medium.

4 Claims, 56 Drawing Sheets

U.S. PATENT DOCUMENTS

| | | |
|---|---|---|
| 6,185,167 B1 | 2/2001 | Arai et al. |
| 6,275,463 B1 | 8/2001 | Nagata et al. |
| 6,493,296 B1 | 12/2002 | Fukumoto et al. |
| 7,116,624 B2 | 10/2006 | Nakamura et al. |
| 2002/0041542 A1 | 4/2002 | Sano et al. |
| 2002/0159378 A1 | 10/2002 | Lee et al. |
| 2005/0088930 A1 | 4/2005 | Minechika et al. |
| 2006/0104183 A1 | 5/2006 | Kataoka et al. |

FOREIGN PATENT DOCUMENTS

| | | |
|---|---|---|
| EP | 1 170 739 | 1/2002 |
| EP | 1 172 807 | 1/2002 |
| JP | 59-191143 | 10/1984 |
| JP | 3-5927 | 1/1991 |
| JP | 4-229435 | 8/1992 |
| JP | 8-306057 | 11/1996 |
| JP | 10-83546 | 3/1998 |
| JP | 11-73658 | 3/1999 |
| JP | 11-513835 | 11/1999 |
| JP | 2000-3523 | 1/2000 |
| JP | 2000-149298 | 5/2000 |
| JP | 2000-331355 | 11/2000 |
| JP | 2000-331356 | 11/2000 |
| JP | 2002-190125 | 7/2002 |
| JP | 2002-216369 | 8/2002 |
| WO | 99/18466 | 4/1999 |

Tangential Direction

Radial Direction

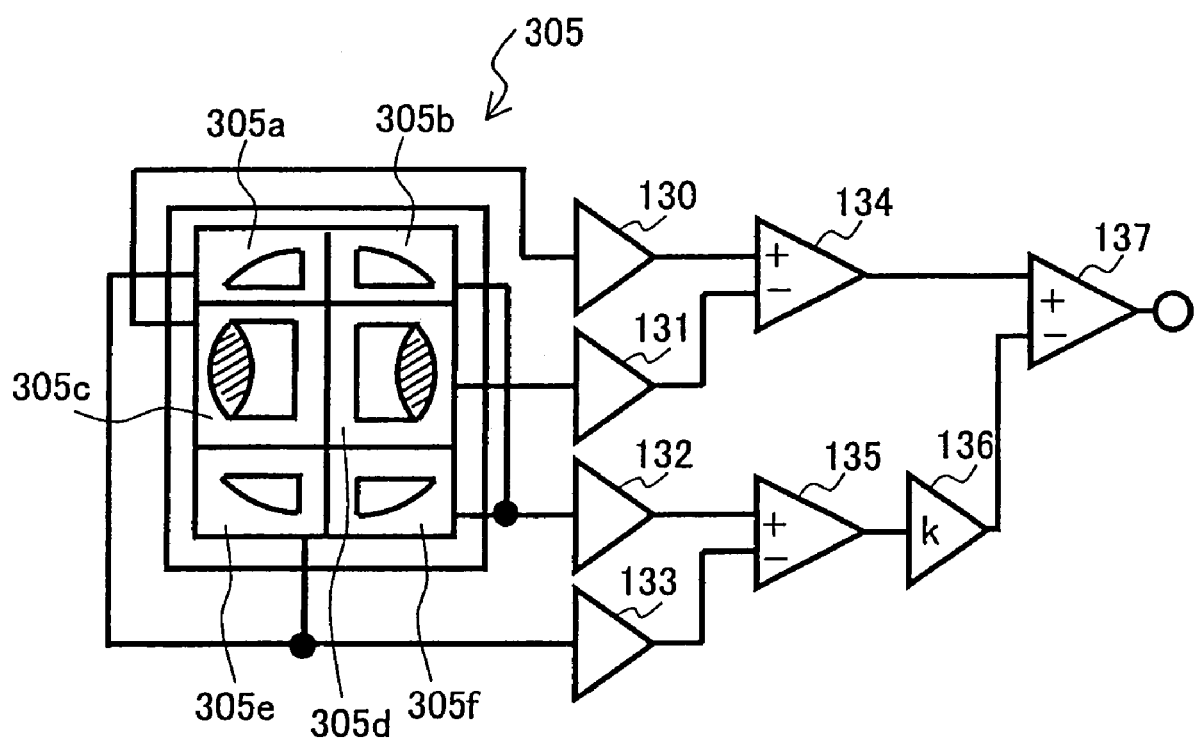
F I G. 57

OPTICAL PICK-UP HEAD, OPTICAL INFORMATION APPARATUS, AND OPTICAL INFORMATION REPRODUCING METHOD

CROSS-REFERENCE TO RELATED APPLICATION

This application is a Division of application Ser. No. 10/646,602, filed Aug. 22, 2003, which application is incorporated herein by reference.

BACKGROUND OF THE INVENTION

1. Field of the Invention

The present invention relates to an optical pick-up head for recording, reproducing or erasing information with respect to an optical recording medium on which information is recorded with a mark and a space, an optical information apparatus, and an information reproducing method.

2. Description of the Related Art

Recently, as high-density and large-capacity recording media, high-density and large-capacity optical disks called DVDs have been put into practical use, and spread widely as information media that can deal with a large amount of information such as animation.

FIG. 70 shows a configuration of a general optical system used in an optical pick-up head in an optical disk system as an optical information apparatus capable of recording/reproducing information. According to a conventional configuration, an optical recording medium is irradiated with three light beams to detect a tracking error signal (e.g., see pages 5 to 8 and FIG. 2 of JP 3(1991)-005927 A).

A light source 1 such as a semiconductor laser emits a linearly polarized divergent beam 70 having a wavelength λ1 of 405 nm. The divergent beam 70 emitted from the light source 1 is converted into parallel light by a collimator lens 53 with a focal length f1 of 15 mm. Thereafter, the beam 70 is incident upon a polarized beam splitter 52. The beam 70 incident upon the polarized beam splitter 52 passes through the polarized beam splitter 52 and passes through a quarter-wavelength plate 54 to be converted to a circularly polarized beam. Then, the beam 70 is converted into a convergent beam by an objective lens 56 with a focal length f2 of 2 mm, passes through a transparent substrate 40a of an optical recording medium 40, and is condensed onto an information recording surface 40b. An opening of the objective lens 56 is limited by an aperture 55, and a numerical aperture NA is set to be 0.85. The thickness of the transparent substrate 40a is 0.1 mm. The optical recording medium 40 has an information recording surface 40b. The optical recording medium 40 is provided with a continuous groove to be a track, and a pitch tp is 0.32 μm.

The beam 70 reflected from the information recording surface 40b passes through the objective lens 56 and the quarter-wavelength plate 54 to be converted to linearly polarized light whose plane of polarization is shifted by 90° from an ingoing path. Then, the beam 70 is reflected from the polarized beam splitter 52. The beam 70 reflected from the polarized beam splitter 52 passes through a condensing lens 59 with a focal length f3 of 30 mm to be converted to convergent light. The resultant beam 70 passes through a cylindrical lens 57 to be incident upon a photodetector 30. The beam 70 is provided with astigmatism when passing through the cylindrical lens 57.

The photodetector 30 has four light-receiving portions 30a to 30d. The light-receiving portions 30a to 30d output current signals I30a to I30d in accordance with the respective light amounts received.

A focus error (hereinafter, referred to as a "FE") signal according to an astigmatism method is obtained by (I30a+I30c)−(I30b+I30d). A tracking error hereinafter, referred to as a "TE") signal according to a push-pull method is obtained by (I30a+I30d)−(I30b+I30c). Information (hereinafter, referred to as a "RF") signal recorded on the optical recording medium 40 is obtained by I30a+I30b+I30c+I30d. The FE signal and the TE signal are supplied to actuators 91 and 92 after being amplified to a desired level and compensated for a phase, whereby focus and tracking control is performed.

When a pitch is reduced so as to increase the capacity of one optical recording medium 40 for recording information, the precision for producing a track also must be enhanced accordingly. However, actually, an absolute amount of error is present, so that when a pitch is narrowed, a production error amount with respect to a pitch is relatively increased. Thus, compared with a DVD, the influence of this error is very large.

FIG. 71 shows a TE signal obtained by scanning the beam 70 in a direction orthogonal to tracks formed on the optical recording medium 40. Tn−4, . . . , Tn+4 on a horizontal axis represent tracks formed on the information recording surface 40b of the optical recording medium 40. In FIG. 71, solid lines extending in a vertical direction represent central positions of the respective tracks Tn−4, . . . , Tn+4 in the case where a pitch tp is formed uniformly. Herein, the track Tn−1 is formed at a position shifted by Δn−1 from a position where the track Tn−1 is supposed to be formed, and the track Tn is formed at a position shifted by Δn from a position where the track Tn is supposed to be formed. Δn−1 is +25 nm, and Δn is −25 nm. As a result, the TE signal exhibits a maximum amplitude a and a minimum amplitude b in the vicinity of the track Tn−1. Thus, the TE minimum amplitude b in the vicinity of the track Tn−1. Thus, the TE signal fluctuates greatly. Furthermore, the position of a zero-intersection point of the TE signal is shifted by an off-track oft1 in the track Tn−1 and by an off-track oft2 in the track Tn from the centers of the tracks Tn−1 and Tn, respectively. More specifically, the off-tracks oft1 and oft2 represent off-track amounts.

Assuming that a fluctuation amount of the TE signal amplitude is defined as ΔPP=(amplitude a−amplitude b)/(amplitude a+amplitude b), and a TE signal is detected by the above-mentioned conventional configuration, the fluctuation amount ΔPP is 0.69, the off-track oft1 is +33 nm, and the off-track oft2 is −33 nm. Thus, the fluctuation amount and the off-track are large. When the fluctuation amount ΔPP of the TE signal amplitude is large, the gain of tracking control is decreased in the tracks Tn−1 and Tn. As a result, tracking control becomes unstable, and information cannot be recorded/reproduced with high reliability.

SUMMARY OF THE INVENTION

Therefore, with the foregoing in mind, it is an object of the present invention to provide an optical pick-up head capable of recording/reproducing information with high reliability while reducing fluctuation in a TE signal amplitude, an optical information apparatus, and an information reproducing method.

An optical information apparatus of the present invention includes: an optical pick-up head that includes: a light source emitting a light beam; a diffraction unit receiving a beam emitted from the light source to generate a plurality of diffracted beams composed of a 0th order diffracted light beam and a 1st or higher order diffracted light beam; a condensing unit receiving the plurality of diffracted beams from the diffraction unit and condensing the beams onto an optical recording medium; a beam splitter receiving the plurality of beams reflected from the optical recording medium and splitting the beams; and a photodetector receiving the beams split by the beam splitter and outputting signals in accordance with amounts of the received light beams. The 0th order diffracted light beam generated in the diffraction unit is set to be a main beam, and two 1st or higher order diffracted light beams generated in the diffraction unit are set to be a first sub-beam and a second sub-beam. The photodetector has a plurality of light-receiving portions, and the main beam, the first sub-beam, and the second sub-beam are received by the plurality of light-receiving portions, respectively. The apparatus further includes a tracking error signal generator generating a tracking error signal for irradiating a desired track with a beam, wherein the optical recording medium has tracks arranged substantially at a constant pitch, and an average of the pitch is tp. When the main beam is placed on the track, the first sub-beam and the second sub-beam are placed between the tracks, the tracking error signal generator performs a differential arithmetic operation with respect to signals output from the light-receiving portion receiving the main beam to generate a first push-pull signal, performs a differential arithmetic operation with respect to signals output from the light-receiving portions receiving the first sub-beam and the second sub-beam to generate a second push-pull signal, and performs a differential arithmetic operation with respect to the first push-pull signal and the second push-pull signal to generate the tracking error signal, in a case where an amplitude of the first push-pull signal obtained at the pitch tp is fluctuated when the light beam is scanned in a direction orthogonal to the tracks of the optical recording medium.

The first push-pull signal is generated without using a region in a vicinity of a center of the main beam, and the second push-pull signal is generated without using regions in a vicinity of centers of the first sub-beam and the second sub-beam.

The above-mentioned optical information apparatus further includes a spherical aberration error signal generator generating a spherical aberration error signal representing a spherical aberration amount of a beam condensed onto the optical recording medium. The spherical aberration error signal generator performs a differential arithmetic operation of the signals output from the plurality of light-receiving portions receiving a region in a vicinity of a center of the main beam to generate a first focus error signal, performs a differential arithmetic operation of the signals output from the plurality of light-receiving portions receiving a region in a vicinity of an outer side of the main beam to generate a second focus error signal, and performs a differential arithmetic operation of the first focus error signal and the second focus error signal to obtain the spherical aberration error signal.

The main beam, the first sub-beam, and the second sub-beam are received by four light-receiving portions, respectively, and the first push-pull signal and the second push-pull signal are obtained by an arithmetic operation $(I1-I2)-k \cdot (I3-I4)$ where I1 to I4 are outputs from the four light-receiving portions receiving the main beam, the first sub-beam, and the second sub-beam, respectively, and k is a real number.

The above-mentioned optical information apparatus further includes a spherical aberration error signal generator generating a spherical aberration error signal representing a spherical aberration amount of a beam condensed onto the optical recording medium. The spherical aberration error signal generator performs a differential arithmetic operation of the signals output from the plurality of light-receiving portions receiving a region in a vicinity of a center of the main beam to generate a first focus error signal, performs a differential arithmetic operation of the signals output from the plurality of light-receiving portions receiving a region in a vicinity of an outer side of the main beam to generate a second focus error signal, and performs a differential arithmetic operation of the first focus error signal and the second focus error signal to obtain the spherical aberration error signal.

An optical information apparatus of the present invention includes: an optical pick-up head that includes: a light source emitting a light beam; a condensing unit receiving a beam from the light source and condensing the beam onto an optical recording medium; a beam splitter receiving the beam reflected from the optical recording medium and splitting the beam; and a photodetector receiving the beams split by the beam splitter and outputting signals in accordance with amounts of the light received beams. The photodetector has a plurality of light-receiving portions. The apparatus further includes a tracking error signal generator generating a tracking error signal for irradiating a desired track with a beam. The optical recording medium has tracks arranged substantially at a constant pitch, an average of the pitch is tp, the beams are received by the plurality of light-receiving portions, and the tracking error signal generator performs a differential arithmetic operation with respect to the signals output from the light-receiving portions to generate a push-pull signal, and in a case where an amplitude of the push-pull signal, obtained at a pitch tp when the light beam is scanned in a direction orthogonal to the tracks of the optical recording medium, is changed at a pitch different from the pitch tp, the push-pull signal is obtained by an arithmetic operation $(I1-I2)-k \cdot (I3-I4)$ where I1 to I4 are the outputs from four light-receiving portions receiving the beams and k is a real number.

The above-mentioned optical information apparatus further includes a spherical aberration error signal generator generating a spherical aberration error signal representing a spherical aberration amount of a beam condensed onto the optical recording medium. The optical recording medium has tracks arranged substantially at a constant pitch, an average of the pitch is tp, the spherical aberration error signal generator performs a differential arithmetic operation of the signals output from the plurality of light-receiving portions receiving a region in a vicinity of a center of the main beam to generate a first focus error signal, performs a differential arithmetic operation of the signals output from the plurality of light-receiving portions receiving a region in a vicinity of an outer side of the main beam to generate a second focus error signal, and performs a differential arithmetic operation of the first focus error signal and the second focus error signal to obtain the spherical aberration error signal.

The tracking error signal generator generates the push-pull signal without using the region in the vicinity of the center of the beam.

The above-mentioned optical information apparatus further includes a spherical aberration error signal generator generating a spherical aberration error signal representing a spherical aberration amount of a beam condensed onto the optical recording medium. The optical recording medium has tracks arranged substantially at a constant pitch, an average of the pitch is tp. The spherical aberration error signal generator performs a differential arithmetic operation of the signals output from the plurality of light-receiving portions receiving a region in a vicinity of a center of the main beam to generate a first focus error signal, performs a differential arithmetic operation of the signals output from the plurality of light-receiving portions receiving a region in a vicinity of an outer side of the main beam to generate a second focus error signal, and performs a differential arithmetic operation of the first focus error signal and the second focus error signal to obtain the spherical aberration error signal.

Light passing through a region containing a large amount of 1st order diffracted light diffracted by the tracks of the optical recording medium is received by the light-receiving portions, whereby the outputs I1 and I2 are output from the light-receiving portions. Light passing through a region containing almost no 1st order diffracted light diffracted by the tracks of the optical recording medium is received by the light-receiving portions, the outputs I3 and I4 are output from the light-receiving portions, and in an image of the beam condensed on the condensing unit, assuming that a distance of the region in the vicinity of the center of the beam that is not used for generating the push-pull signal from a center of the condensing unit is L1 and a minimum distance of the 1st order diffracted light diffracted by the tracks of the optical recording medium from the center of the condensing unit is L2, light having passed through a region between the distance L1 and the distance L2 is received by the light-receiving portions, whereby the outputs I3 and I4 are output from the light-receiving portions.

An optical information apparatus of the present invention includes: an optical pick-up head that includes: a light source emitting a light beam; a condensing unit receiving a beam from the light source and condensing the beam onto an optical recording medium; a beam splitter receiving the beam reflected from the optical recording medium and splitting the beam; and a photodetector receiving the beams split by the beam splitter and outputting signals in accordance with amounts of the received light beams. The photodetector has a plurality of light-receiving portions. The apparatus further includes a tracking error signal generator generating a tracking error signal for irradiating a desired track with a beam. The optical recording medium has tracks arranged substantially at a constant pitch, an average of the pitch is tp, and the beams are received by the plurality of light-receiving portions. The tracking error signal generator performs a differential arithmetic operation with respect to the signals output from the light-receiving portions to generate a push-pull signal, and in a case where an amplitude of the push-pull signal, obtained at a pitch tp when the light beam is scanned in a direction orthogonal to the tracks of the optical recording medium, is changed at a pitch different from the pitch tp, the push-pull signal is generated without using a region in a vicinity of a center of the beam. The optical information apparatus further includes a spherical aberration error signal generator generating a spherical aberration error signal representing a spherical aberration amount of a beam condensed on the optical recording medium, the spherical aberration error signal generator performs a differential arithmetic operation of the signals output from the plurality of light-receiving portions receiving a region in a vicinity of a center of the main beam to generate a first focus error signal, performs a differential arithmetic operation of the signals output from the plurality of light-receiving portions receiving a region in a vicinity of an outer side of the main beam to generate a second focus error signal, and performs a differential arithmetic operation of the first focus error signal and the second focus error signal to obtain the spherical aberration error signal.

An optical information apparatus of the present invention includes: an optical pick-up head that includes: a light source emitting a light beam; a condensing unit receiving a beam from the light source and condensing the beam onto an optical recording medium; a beam splitter receiving the beam reflected from the optical recording medium and splitting the beam; and a photodetector receiving the beams split by the beam splitter and outputting signals in accordance with amounts of the received light beams. The photodetector has a plurality of light-receiving portions. The apparatus further includes a tracking error signal generator generating a tracking error signal for irradiating a desired track with a beam. The optical recording medium has tracks arranged substantially at a constant pitch, and an average of the pitch is tp, the beams are received by the plurality of light-receiving portions. The tracking error signal generator performs a differential arithmetic operation with respect to the signals output from the light-receiving portions to generate a push-pull signal, and in a case where an amplitude of the push-pull signal, obtained at a pitch tp when the light beam is scanned in a direction orthogonal to the tracks of the optical recording medium, is changed at a pitch different from the pitch tp, the push-pull signal is generated without using a region in a vicinity of a center of the beam.

In an image of the beam condensed on the condensing unit, the region in the vicinity of the center of the beam that is not used for generating the push-pull signal may form a shape symmetrical with respect to a segment parallel to the image of the tracks in the condensing unit.

In the image of the beam condensed on the condensing unit, the region in the vicinity of the center of the beam that is not used for generating the push-pull signal may have a rectangular shape.

In the image of the beam condensed on the condensing unit, the region in the vicinity of the center of the beam that is not used for generating the push-pull signal may have a square shape.

In the image of the beam condensed on the condensing unit, the region in the vicinity of the center of the beam that is not used for generating the push-pull signal may have a spiral shape.

An optical information apparatus of the present invention includes: an optical pick-up head that includes: a light source emitting a light beam; a condensing unit receiving a beam from the light source and condensing the beam onto an optical recording medium; a beam splitter receiving the beam reflected from the optical recording medium and splitting the beam; and a photodetector receiving the beams split by the beam splitter and outputting signals in accordance with amounts of the received light beams. The photodetector has a plurality of light-receiving portions. The apparatus further includes a tracking error signal generator generating a tracking error signal for irradiating a desired track with a beam; a focus error signal generator generating a focus error signal for irradiating a desired focus position with a beam; a recording/non-recording detector detecting whether or not information is recorded at a position of the beam condensed on the optical recording medium; and an amplitude controller controlling an amplitude of the tracking error signal with a coefficient k. The amplitude controller is controlled by using a signal generated from the recording/non-recording detector and a signal generated from the focus error signal generator.

The recording/non-recording detector detects an amplitude of a signal varied depending upon a mark and a space recorded on the optical recording medium and a signal with a low frequency component obtained by a low-pass filter from a signal output from the photodetector, thereby detecting whether or not information is recorded at a position of the beam condensed on the optical recording medium.

k may be set so that a change amount of the amplitude is minimum in a case where the amplitude of the push-pull signal, obtained at the pitch tp when the light beam is scanned in a direction orthogonal to the tracks of the optical recording medium, is changed at a pitch different from the pitch tp, k may be set so that a position of a light beam, where the push-pull signal obtained at the pitch tp when the light beam is scanned in a direction orthogonal to the tracks of the optical recording medium is a substantially zero-intersection point, is close to a center of the track.

Assuming that k1 is a value of k for minimizing a change amount in a case where the amplitude of the push-pull signal, obtained at the pitch tp when the light beam is scanned in a direction orthogonal to the tracks of the optical recording medium, is changed at a pitch different from the pitch tp, and k2 is a value of k in a case where a position of a light beam, where the push-pull signal obtained at the pitch tp when the light beam is scanned in a direction orthogonal to the tracks of the optical recording medium is a substantially zero-intersection point, is closest to a center of the track, k may be set to be a value between k1 and k2.

An optical information apparatus of the present invention includes: an optical pick-up head that includes: a light source emitting a light beam; a condensing unit receiving a beam from the light source and condensing the beam onto an optical recording medium; a beam splitter receiving the beam reflected from the optical recording medium and splitting the beam; and a photodetector receiving the beams split by the beam splitter and outputting signals in accordance with amounts of the received light beams. The photodetector has a plurality of light-receiving portions. The apparatus further includes a tracking error signal generator generating a tracking error signal for irradiating a desired track with a beam. The optical recording medium has an information recording surface for recording information, the optical recording medium has a reflective surface for reflecting the beam when the beam is condensed onto the information recording surface, and the beam splitter has a plurality of regions. A size of the beam on the beam splitter is D, a numerical aperture of the condensing unit is NA, a lateral multiplication of an optical system in the optical pick-up head from the optical recording medium to the photodetector is $\alpha$, an interval between the information recording surface and the reflective surface is d, and a refractive index present in the interval d between the information recording surface and the reflective surface is n2. The tracking error signal generator performs a differential arithmetic operation with respect to the signals output from the light-receiving portions to generate a push-pull signal, and when the beam splitter splits the beam in a direction different from that of the light-receiving portion outputting a signal for generating the tracking error signal over a width h of a region in a vicinity of a center to be irradiated with the beam, a width S of the light-receiving portion outputting a signal for generating the tracking error signal has a relationship $S \leq 2 \cdot h \cdot \alpha \cdot NA \cdot d/(D \cdot n2)$.

An optical information apparatus of the present invention includes: an optical pick-up head that includes: a light source emitting a light beam; a condensing unit receiving a beam from the light source and condensing the beam onto an optical recording medium; a beam splitter receiving the beam reflected from the optical recording medium and splitting the beam; and a photodetector receiving the beams split by the beam splitter and outputting signals in accordance with amounts of the received light beams. The photodetector has a plurality of light-receiving portions. The apparatus further includes a tracking error signal generator generating a tracking error signal for irradiating a desired track with a beam. The optical recording medium has an information recording surface for recording information, and the optical recording medium has a reflective surface for reflecting the beam when the beam is condensed onto the information recording surface. The tracking error signal generator performs a differential arithmetic operation with respect to the signals output from the light-receiving portions to generate a push-pull signal, and the beam splitter has five regions, and splits the beam in a direction different from that of the light-receiving portion outputting a signal for generating the tracking error signal over a width h of a region in a vicinity of a center to be irradiated with the beam and splits the beam in the substantially same direction in the other four regions.

The condensing unit is driven in accordance with tracking control, the beam splitter splits the beam in a direction substantially orthogonal to a direction in which an image on the light-receiving portion is moved when the condensing unit is driven, and the tracking error signal is generated with the split beams.

The beams split from the plurality of regions in the beam splitter are received by the plurality of light-receiving portions substantially adjacent to each other.

The beams split by first and second regions of the beam splitter contain a large amount of 1st order diffracted light diffracted by the tracks of the optical recording medium, the beams split by third and fourth regions of the beam splitter contain almost no 1st order diffracted light diffracted by the tracks of the optical recording medium, and a first virtual segment on the photodetector connecting the beam split by the first region to the beam split by the second region, and a second virtual segment on the photodetector connecting the beam split by the third region to the beam split by the fourth region is orthogonal to an image of the tracks on the photodetector, respectively.

An outline of the plurality of light-receiving portions substantially adjacent to each other may be a rectangle.

An optical information apparatus of the present invention includes: an optical pick-up head that includes: a light source emitting a light beam; a condensing unit receiving a beam from the light source and condensing the beam onto an optical recording medium; a beam splitter receiving the beam reflected from the optical recording medium and splitting the beam; and a photodetector receiving the beams split by the beam splitter and outputting signals in accordance with amounts of the received light beams. The photodetector has a plurality of light-receiving portions. The apparatus further includes a tracking error signal generator generating a tracking error signal for irradiating a desired track with a beam. The optical recording medium has an information recording surface for recording information, and the optical recording medium has a reflective surface for reflecting the beam when the beam is condensed onto the information recording surface. The tracking error signal generator performs a differential arithmetic operation with respect to the signals output from the light-receiving portions to generate a push-pull signal. The beam splitter has five different regions, and splits the beam in a direction different from that of the light-receiving portion outputting a signal for generating the tracking error signal over a width h of a region in a vicinity of a center to be irradiated with the beam and splits the beam in the substantially same direction in the other four regions. The photodetector has five light-receiving portions at positions close to each other, each of the beams split by the other four regions of the beam splitter is received one light-receiving portion, and the tracking error signal generator obtains the push-pull signal by an arithmetic operation $\{(I1-I5)-k1\cdot(I2-I5)\}-k\cdot\{(I3-I5)-k2\cdot(I4-I5)\}$, where I1 to I4 are signals output from the four light-receiving portions receiving the beams split by the other four regions of the beam splitter, I5 is a signal output from the light-receiving portion provided close to the four light-receiving portions receiving the beams split by the beam splitter, and k is a real number.

The beams split by the beam splitter are substantially focused on the light-receiving portion;

The light-receiving portion outputting a signal for detecting the focus error signal is integrated with the light-receiving portion outputting a signal for detecting the tracking error signal.

The optical pick-up head further includes an astigmatism generator that provides a beam with astigmatism in an optical path from the optical recording medium to the photodetector, and the focus error signal is detected based on the beam provided with the astigmatism.

The beam splitter provides a beam to be split with a wave front for canceling the astigmatism provided to the beam by the astigmatism generator.

The region in the vicinity of the center of the beam that is not used for generating the push-pull signal corresponds to a region where the 0th order diffracted light and the first order diffracted light, which are reflected and diffracted by the optical recording medium, are not overlapped with each other.

The plurality of light-receiving portions respectively receive a beam partially, thereby splitting the beam.

The beam is split by providing the beam splitter in an optical path from the optical recording medium to the photodetector.

The amplitude of the push-pull signal obtained at the pitch tp when the light beam is scanned in a direction orthogonal to the tracks of the optical recording medium is changed at a pitch different from the pitch tp, in a region where a track in which information is not recorded is adjacent to a track in which information is recorded.

The amplitude of the push-pull signal obtained at the pitch tp when the light beam is scanned in a direction orthogonal to the tracks of the optical recording medium is changed at a pitch different from the pitch tp, by fluctuation in a pitch formed on the optical recording medium.

The amplitude of the push-pull signal obtained at the pitch tp when the light beam is scanned in a direction orthogonal to the tracks of the optical recording medium is changed at a pitch different from the pitch tp, by fluctuation in a track width formed on the optical recording medium.

The amplitude of the push-pull signal obtained at the pitch tp when the light beam is scanned in a direction orthogonal to the tracks of the optical recording medium is changed at a pitch different from the pitch tp, by fluctuation in a track depth formed on the optical recording medium.

Assuming that tracks irradiated with the main beam when the main beam is scanned in a direction orthogonal to the tracks are Tn−1, Tn, and Tn+1, and when the main beam is placed at a center of the track Tn, the first sub-beam is placed between the tracks Tn−1 and Tn, and the second sub-beam is placed between the tracks Tn and Tn+1.

Assuming that tracks irradiated with the main beam when the main beam is scanned in a direction orthogonal to the tracks are Tn−2, Tn−1, Tn, Tn+1, and Tn+2, and when the main beam is placed at a center of the track Tn, the first sub-beam is placed between the tracks Tn−2 and Tn−1, and the second sub-beam is placed between the tracks Tn+1 and Tn+2.

A relationship $tp/0.8 < \lambda/NA < 0.5$ μm may be satisfied, where $\lambda$ is a wavelength of the light source, and NA is a numerical aperture of the condensing unit.

An optical information apparatus of the present invention includes: an optical pick-up head that includes: a light source emitting a light beam; a condensing unit receiving a beam from the light source and condensing the beam onto an optical recording medium; a beam splitter receiving the beam reflected from the optical recording medium and splitting the beam; and a photodetector receiving the beams split by the beam splitter and outputting signals in accordance with amounts of the received light beams. The photodetector has a plurality of light-receiving portions. The apparatus further includes a tracking error signal generator generating a tracking error signal for irradiating a desired track with a beam. The optical recording medium has an information recording surface for recording information, the optical recording medium has a reflective surface for reflecting the beam when the beam is condensed onto the information recording surface, and the light-receiving portions are placed so that the beam reflected from the reflective surface when the beam is condensed onto the information recording surface is not incident upon the light-receiving portions.

The reflective surface for reflecting the beam when the beam is condensed onto the information recording surface may be a second information recording surface.

The reflective surface for reflecting the beam when the beam is condensed onto the information recording surface may be a beam incident surface of the optical recording medium.

The light-receiving portion receiving a beam used for generating the tracking error signal may be smaller than the light-receiving portions receiving the other beams.

The optical recording medium has a plurality of information recording surfaces.

An optical information apparatus of the present invention includes: an optical pick-up head that includes: a light source emitting a light beam; a spherical aberration providing unit providing the beam with spherical aberration; a condensing unit receiving the beam from the spherical aberration providing unit and condensing the beam onto an optical recording medium; a beam splitter receiving the beam reflected from the optical recording medium and splitting the beam; a photodetector receiving the beams split by the beam splitter and outputting signals in accordance with mounts of the received light beams; and a driving unit driving the condensing unit to enable tracking control to be performed. The photodetector, has a plurality of light-receiving portions. The apparatus further includes a tracking error signal generator generating a tracking error signal for irradiating a desired track with a beam and an offset compensating unit compensating an offset occurring in the tracking error signal in accordance with a position of the condensing unit driven by the driving unit. The spherical aberration providing unit is capable of adjusting spherical aberration provided to the beam in accordance with a state of the beam condensed on the optical recording medium, and the offset compensating unit is controlled in accordance with the spherical aberration provided by the spherical aberration providing unit.

An optical information apparatus of the present invention includes: a light source emitting a light beam; a condensing unit condensing the light beam emitted from the light source onto an optical recording medium having a track; a splitter splitting the light beam reflected/diffracted from the optical recording medium; a divider dividing the split light beams into a plurality of regions; a photodetector having a plurality of detection regions detecting light beams divided by the divider and outputting current signals in accordance with amounts of the detected light beams; a plurality of converters converting the current signal output from the photodetector to voltage signals; and a tracking error signal generator generating a tracking error signal by subtracting a voltage signal obtained from a second region multiplied by a coefficient from a voltage signal obtained from a first region. Among the plurality of regions placed in the divider, a region mainly containing a tracking error signal component is set to be the first region, and a region mainly containing an offset component of a tracking error signal is set to be the second region. An efficiency at which a light beam having passed through the second region reaches the photodetector is higher than an efficiency at which a light beam having passed through the first region reaches the photodetector.

An optical information apparatus of the present invention includes: a light source emitting a light beam; a condensing unit condensing the light beam emitted from the light source onto an optical recording medium having a track; a splitter splitting the light beam reflected/diffracted from the optical recording medium; a divider dividing the split light beams into a plurality of regions; a photodetector having a plurality of detection regions detecting light beams split by the splitter and outputting current signals in accordance with light amounts of the detected light beams; a plurality of converters converting the current signal output from the photodetector to voltage signals; and a tracking error signal generator generating a tracking error signal by converting a current signal obtained from a light beam having passed through the first region and a current signal obtained from a light beam having passed through the second region to voltages by an identical converter. Among the plurality of regions placed in the divider, a region mainly containing a tracking error signal component is set to be the first region, and a region mainly containing an offset component of a tracking error signal is set to be the second region.

An efficiency at which a light beam having passed through the second region reaches the photodetector is higher than an efficiency at which a light beam having passed through the first region reaches the photodetector.

An efficiency at which a part of a light beam having passed through the second region reaches the photodetector is higher than an efficiency at which a light beam having passed through the first region reaches the photodetector.

An efficiency at which a light beam having passed through an outer circumferential portion of the second region reaches the photodetector is high.

An efficient at which a light beam having passed through a circumferential portion in a track tangent direction of the second region reaches the photodetector is high.

An efficiency at which a light beam having passed through a circumferential portion in a direction traversing a track in the second region reaches the photodetector is high.

The photodetector may include at least first to fourth detection regions. The first region is divided into at least four regions by a dividing line substantially parallel to a track tangent direction and a dividing line substantially parallel to a direction orthogonal to the tracks. The second region is divided into at least four regions by a dividing line substantially parallel to a track tangent direction and a dividing line substantially parallel to a direction orthogonal to the tracks. Light having passed through the second region is converted to a voltage signal by the converter converting a current signal obtained by receiving light having passed through regions in a diagonal-direction of the first region.

The light having passed through the second region is condensed so as to be focused on the photodetector.

The light having passed through the first region is condensed so as to be focused on the photodetector.

A focus error signal and an information reproducing signal are generated based on the signals obtained by the photodetector having at least the first to fourth detection regions.

An optical information apparatus of the present invention includes: an optical pick-up head including: a light source emitting a light beam; a condensing unit receiving a light beam from the light source and condensing the light beam onto an optical recording medium; a beam splitter splitting the light beam reflected/diffracted from the optical recording medium; a divider dividing the light beams, split by the beam splitter, into a plurality of regions; a photodetector receiving the light beams divided by the divider and outputting signals in accordance with amounts of the received light beams; a tracking error signal generator generating a tracking error signal for irradiating a desired track with the light beam; and an information signal generator generating an information signal recorded on the optical recording medium. The tracking error signal generator performs a differential arithmetic operation with respect to the signals output from the light-receiving portions to generate a push-pull signal. The divider divides the light beam so as to generate the information signal and the push-pull signal. The push-pull signal is generated based on signals from regions other than a region in a vicinity of a center of the light beam, and a ratio of signals obtained from the region in the vicinity of the center of the light beam so as to generate the information signal is higher than a ratio of signals obtained from a region on an outer circumference side of the light beam.

The region in the vicinity of the center of the light beam among the plurality of regions of the divider may have a rectangular shape.

The divider may be integrated with the condensing unit.

The divider may be a diffraction element, with a difference in the reaching efficiency is caused based on a difference in a diffraction efficiency of the diffraction element.

An optical pick-up head includes: a light source emitting a light beam; a diffraction unit receiving the light beam emitted from the light source to generate a plurality of diffracted beams composed of a 0th order diffracted light beam and a 1st or higher order diffracted light beam; a condensing unit receiving the plurality of diffracted beams from the diffraction unit and condensing the beams onto an optical recording medium; a beam splitter receiving the plurality of beams reflected from the optical recording medium and splitting the beams; and a photodetector receiving the beams split by the beam splitter and outputting signals in accordance with amounts of the received light beams. The 0th order diffracted light beam generated in the diffraction unit is set to be a main beam, and two 1st or higher order diffracted light beams generated in the diffraction unit are set to be a first sub-beam and a second sub-beam, assuming that Tn−2, Tn−1, Tn, Tn+1, and Tn+2 represent tracks irradiated with the main beam when the main beam is scanned in a direction orthogonal to the tracks, and the main beam is placed at a center of the track Tn, the first sub-beam is placed between the tracks Tn−2 and Tn−1, and the second sub-beam is placed between the tracks Tn+1 and Tn+2.

An optical pick-up head of the present invention includes: a light source emitting a light beam; a first condensing unit receiving the light beam from the light source and condensing the light beam onto a recording surface of an optical recording medium; a beam splitter receiving the beam reflected from the optical recording medium and splitting the beam; a photodetector receiving the beams split by the beam splitter and outputting signals in accordance with amounts of the received light beams; a beam divider dividing the beams split by the beam splitter into a plurality of beams so as to correspond to a plurality of light-receiving portions placed on the photodetector; and a second condensing unit condensing the beam onto the photodetector. The optical recording medium has a reflective surface for reflecting the beam when the beam is condensed to the recording surface. An opening limit member is provided between the first condensing unit and the second condensing unit, and an outer circumference portion of the beam reflected from the reflective surface for reflecting the beam of the optical information recording medium is blocked against light so that the beam reflected from the reflective surface for reflecting the beam of the optical information recording medium is not incident upon the photodetector.

The reflective surface for reflecting the beam when the beam is condensed onto the recording surface may be formed on a beam incident side with respect to the recording surface.

The reflective surface for reflecting the beam when the beam is condensed onto the recording surface may be another recording surface of the optical recording medium.

The reflective surface for reflecting the beam when the beam is condensed onto the recording surface may be a surface of the optical recording medium.

The opening limit member may be provided in a vicinity of the beam divider.

The opening limit member may be integrated with the beam divider.

Even in a case where the condensing unit is displaced in a tracking direction of the optical recording medium, an opening of the opening limit member is larger in the tracking direction than in a direction orthogonal to the tracking direction, so as not to block light reflected from the recording surface of the optical recording medium.

An optical information apparatus of the present invention includes: the above-mentioned optical pick-up head; a driving portion changing a relative position between the optical recording medium and the optical pick-up head; and an electric signal processing portion receiving signals output from the optical pick-up head and performing a differential arithmetic operation to obtain desired information.

A method for reproducing optical information of the present invention uses an optical pick-up head that includes: a light source emitting a light beam; a condensing unit receiving a beam from the light source and condensing the beam onto an optical recording medium; a beam splitter receiving the beam reflected from the optical recording medium and splitting the beam; and a photodetector receiving the beams split by the beam splitter and outputting signals in accordance with amounts of the received light beams. The photodetector has a plurality of light-receiving portions, and the method uses a tracking error signal generator generating a tracking error signal for irradiating a desired track with a beam. The tracking error signal generator performs a differential arithmetic operation with respect to the signals output from the light-receiving portions to generate a push-pull signal. The optical recording medium has tracks arranged substantially at a constant pitch, and an average of the pitch is tp. When an amplitude of the push-pull signal obtained at the pitch tp when the light beam is scanned in a direction orthogonal to the tracks of the optical recording medium is changed at a pitch different from the pitch tp, the change in the amplitude of the push-pull signal is reduced by avoiding use of a partial region of the beam or manipulating a signal obtained from the partial region of the beam.

A method for reproducing optical information of the present invention uses an optical pick-up head that includes: a light source emitting a light beam; a diffraction unit receiving the light beam emitted from the light source to generate a plurality of diffracted beams composed of a 0th order diffracted light beam and 1st or higher order diffracted light beams; a condensing unit receiving the plurality of beams from the diffraction unit and condensing the beams onto an optical recording medium; a beam splitter receiving the plurality of beams reflected from the optical recording medium and splitting the beams; and a photodetector receiving the beams split by the beam splitter and outputting signals in accordance with amounts of the received light beams. The method uses a tracking error signal generator generating a tracking error signal for irradiating a desired track with a beam. The photodetector has a plurality of light-receiving portions, the plurality of beams are radiated to positions different in a direction orthogonal to the tracks, the tracking error signal generator performs a differential arithmetic operation with respect to the signals output from the light-receiving portions to generate a push-pull signal, the optical recording medium has tracks arranged substantially at a constant pitch, and an average of the pitch is tp. When an amplitude of the push-pull signal obtained at the pitch tp when the light beam is scanned in a direction orthogonal to the tracks of the optical recording medium is changed at a pitch different from the pitch tp, the change in the amplitude of the push-pull signal is reduced by manipulating a signal obtained from the plurality of beams.

A track in which information is not recorded and a track in which information has been recorded may be formed previously on the optical recording medium so that the amplitude of the push-pull signal obtained at the pitch tp when the light beam is scanned in a direction orthogonal to the tracks of the optical recording medium is changed at a pitch different from the pitch tp.

The track in which information has been recorded and the track in which information is not recorded may be placed alternately.

A method for reproducing optical information of the present invention uses: a light source emitting a light beam; a condensing unit condensing the light beam emitted from the light source onto an optical recording medium having a track; a splitter splitting the light beam reflected/diffracted from the optical recording medium; a divider dividing the split light beams into a plurality of regions; a photodetector having a plurality of detection regions detecting light beams divided by the divider and outputting current signals in accordance with amounts of the detected light beams; a plurality of converters converting the current signal output from the photodetector to voltage signals; and a tracking error signal generator generating a tracking error signal by subtracting a voltage signal obtained from a second region multiplied by a coefficient from a voltage signal obtained from a first region. Among the plurality of regions placed in the divider, a region mainly containing a tracking error signal component is set to be the first region, and a region mainly containing an offset component of a tracking error signal is set to be the second region. An efficiency at which a light beam having passed through the second region reaches the photodetector is higher than an efficiency at which a light beam having passed through the first region reaches the photodetector, whereby the offset component of the tracking error signal is reduced.

A method for reproducing optical information of the present invention reduces an offset of a tracking error signal by including: a light source emitting a light beam; a condensing unit condensing the light beam emitted from the light source onto an optical recording medium having a track; a splitter splitting the light beam reflected/diffracted from the optical recording medium; a divider dividing the split light beams into a plurality of regions; a photodetector having a plurality of detection regions detecting light beams divided by the divider and outputting current signals in accordance with amounts of the detected light beams; a plurality of converters converting the current signal output from the photodetector to voltage signals; and a tracking error signal generator generating a tracking error signal by converting a current signal obtained from a light beam of a first region and a current signal obtained from a light beam of the second region to voltages by an identical converter. Among the plurality of regions placed in the divider, a region mainly containing a tracking error signal component is set to be the first region, and a region mainly containing an offset component of a tracking error signal is set to be the second region, A method for reproducing optical information of the present invention uses: an optical pick-up head that includes: a light source emitting a light beam; a condensing unit receiving a light beam from the light source and condensing the light beam onto an optical recording medium; a beam splitter splitting the light beam reflected/diffracted from the optical recording medium; a divider dividing the light beams, split by the beam splitter, into a plurality of regions; a photodetector receiving the beams divided by the divider and outputting signals in accordance with light amounts of the received light beams; a tracking error signal generator generating a tracking error signal for irradiating a desired track with the light beam; and an information signal generator generating an information signal recorded on the optical recording medium. The tracking error signal generator performs a differential arithmetic operation with respect to the signals output from the light-receiving portions to generate a push-pull signal. The divider divides the light beam so as to generate the information signal and the push-pull signal. The push-pull signal is generated based on signals from regions other than a region in a vicinity of a center of the light beam, and a ratio of information signals generated based on signals from the region in the vicinity of the light beam is set to be higher than a ratio of information signals generated based on signals from a region on an outer circumference side of the light beam, whereby information recorded on the optical recording medium is reproduced.

These and other advantages of the present invention will become apparent to those skilled in the art upon reading and understanding the following detailed description with reference to the accompanying figures.

BRIEF DESCRIPTION OF THE DRAWINGS

FIG. 57 shows a relationship between a light beam and division of a photodetector of the optical information apparatus of Embodiment 22 according to the present invention and an electric circuit.

DESCRIPTION OF THE PREFERRED EMBODIMENTS

Figure 1:
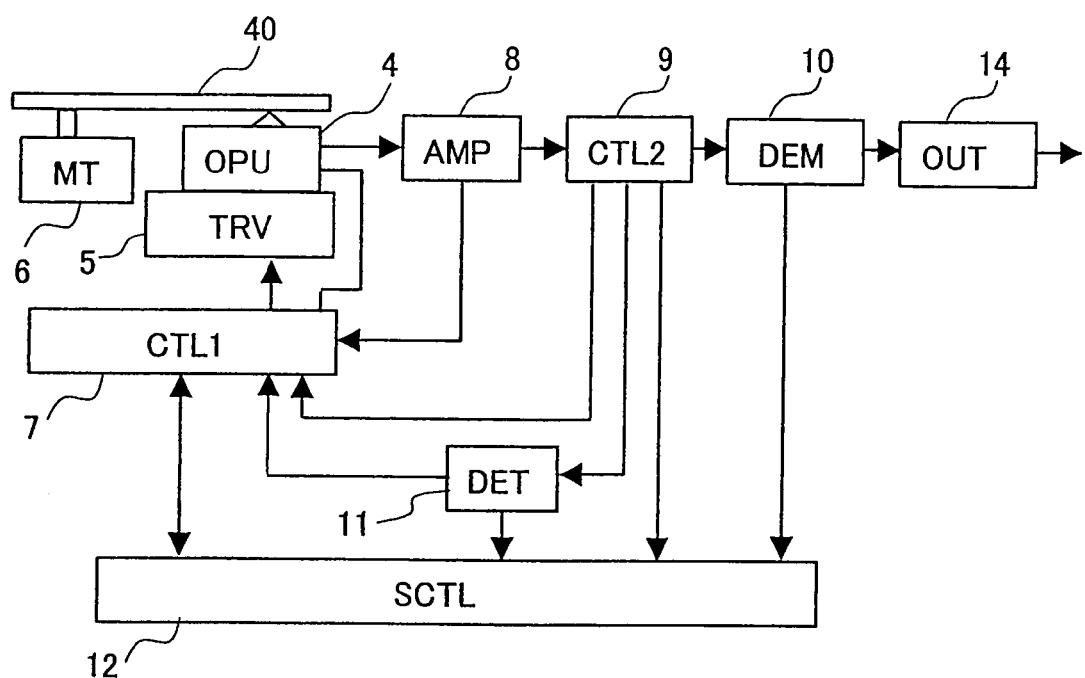
FIG. 1 schematically shows a configuration of an optical information apparatus of Embodiment 1 according to the present invention.

Hereinafter, an optical information apparatus, an optical pick-up head, and an optical information reproducing method of the present invention will be described by way of illustrative embodiments with reference to the drawings. In each figure, the same reference numerals denote the same components or those having similar functions and operations.

Embodiment 1

FIG. 1 shows a configuration of an optical information apparatus of Embodiment 1 according to the present invention. An optical pick-up head 4 irradiates an optical recording medium 40 with laser light having a wavelength λ of 405 nm, thereby reproducing a signal recorded on the optical recording medium 40. A transport controller 5 moves the optical pick-up head 4 in a radius direction of the optical recording medium 40 so as to record/reproduce information at any position on the optical recording medium 40. A motor 6 for driving the optical recording medium 40 rotates the optical recording medium 40. A controller 7 controls the optical pick-up head 4, the transport controller 5, and the motor 6.

An amplifier 8 amplifies a signal read by the optical pick-up head 4. A controller 9 receives an output signal from the amplifier 8. Based on this signal, the controller 9 generates a servo signal such as a FE (focusing error) signal and a TE (tracking error) signal required for the optical pick-up head 4 to read a signal of the optical recording medium 40 and outputs the servo signal to the controller 7. Furthermore, the controller 9 receives a signal in an analog form and digitizes it. A demodulator 10 analyzes the digitized signal read from the optical recording medium 40, and reconfigures data of an original video and music. The reconfigured signal is output from an output unit 14.

A detector 11 detects an address signal and the like based on the signal output from the controller 9, and outputs the detected address signal and the like to a system controller 12. The system controller 12 identifies the optical recording medium 40 based on physical format information and optical recording medium production information (optical recording medium management information) read from the optical recording medium 40, and interprets a recording/reproducing condition and the like, thereby controlling the entire optical information apparatus. In the case of recording/reproducing information with respect to the optical recording medium 40, the controller 7 drives the transport controller 5 in accordance with an instruction from the system controller 12. As a result, the transport controller 5 moves the optical pick-up head 4 to a desired position on an information recording surface 40b (described later in FIG. 2) formed on the optical recording medium 40. The optical pick-up head 4 records/reproduces information with respect to the information recording surface 40b of the optical recording medium 40.

Figure 2:
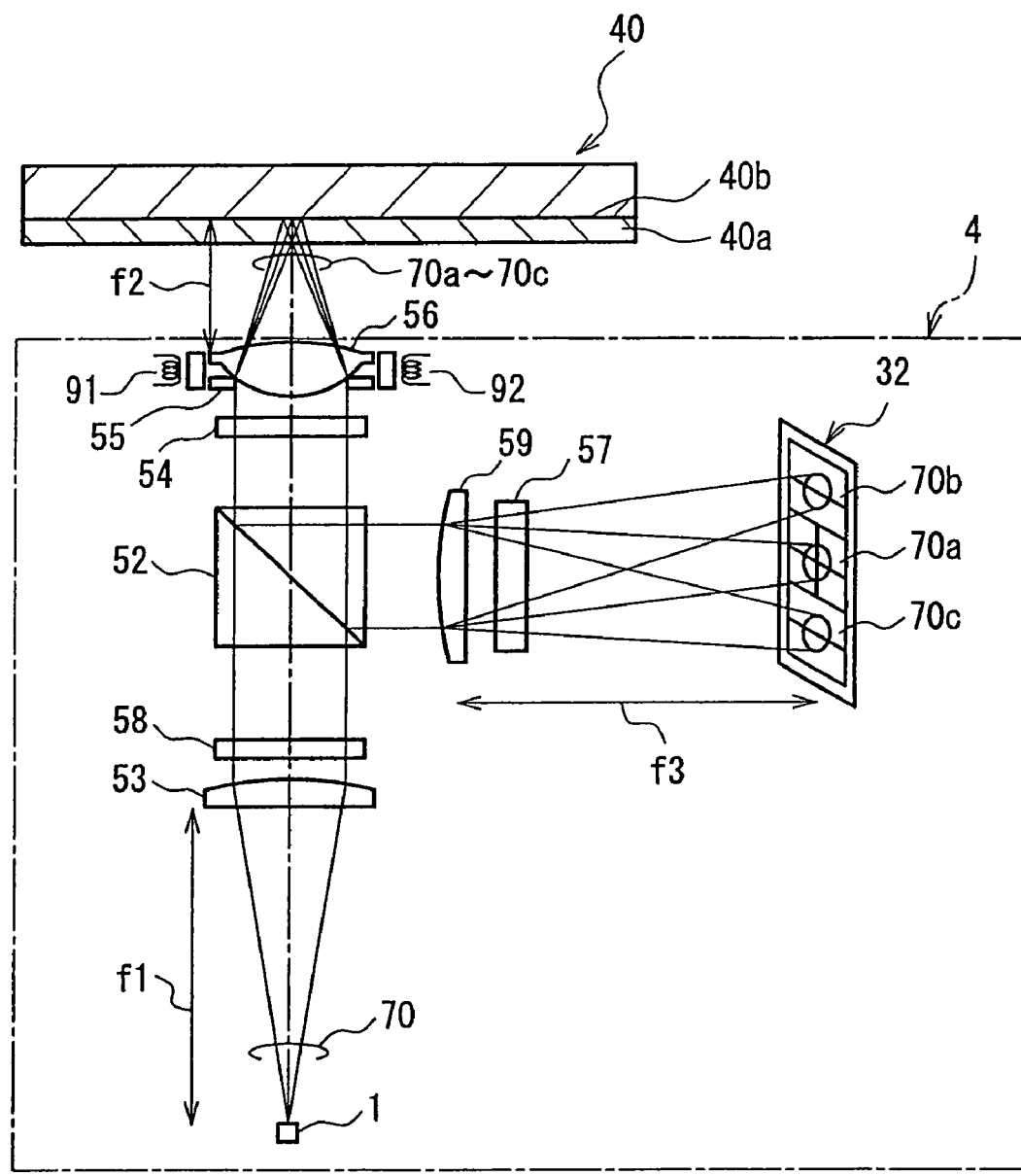
FIG. 2 shows a configuration of an optical pick-up head constituting the optical information apparatus of Embodiment 1 according to the present invention.

FIG. 2 shows an exemplary configuration of the optical pick-up head 4 according to Embodiment 1.

A light source 1 emits a linearly polarized divergent beam 70 having a wavelength λ of 405 nm. The divergent beam 70 emitted from the light source 1 is converted to parallel light by a collimator lens 53 having a focal length f1 of 15 mm, and thereafter, is incident upon a diffraction grating 58. The beam 70 incident upon the diffraction grating 58 is diffracted into three beams (0th order diffracted light and ±1st order diffracted light). The 0th order diffracted light functions as a main beam 70a for recording/reproducing information, and the ±1st order diffracted light functions as two sub-beams 70b and 70c for a differential push-pull (DPP) method for detecting a TE signal. The ratio of a diffraction efficiency between the 0th order diffracted light 70a and the 1st order diffracted light 70b or 70c diffracted by the diffraction circuit 58 generally is set to be 10:1 to 20:1 so as to avoid unnecessary recording by the sub-beams. Herein, the ratio is set to be 20:1. Three beams 70a to 70c generated by the diffraction grating 58 pass through a polarized beam splitter 52. Then, the beams 70a to 70c pass through a quarter-wavelength plate 54 to be converted into circularly polarized light. Thereafter, the beams 70a to 70c are converted to convergent beams by an objective lens 56 having a focal length f2 of 2 mm, and pass through a transparent substrate 40a formed on the optical recording medium 40 to be condensed onto the information recording surface 40b. An opening of the objective lens 56 is limited by an aperture 55, and a numerical aperture NA is set to be 0.85. The thickness of the transparent substrate 40a formed on the optical recording medium 40 is 0.1 mm, and a refractive index n is 1.57.

Figure 3:
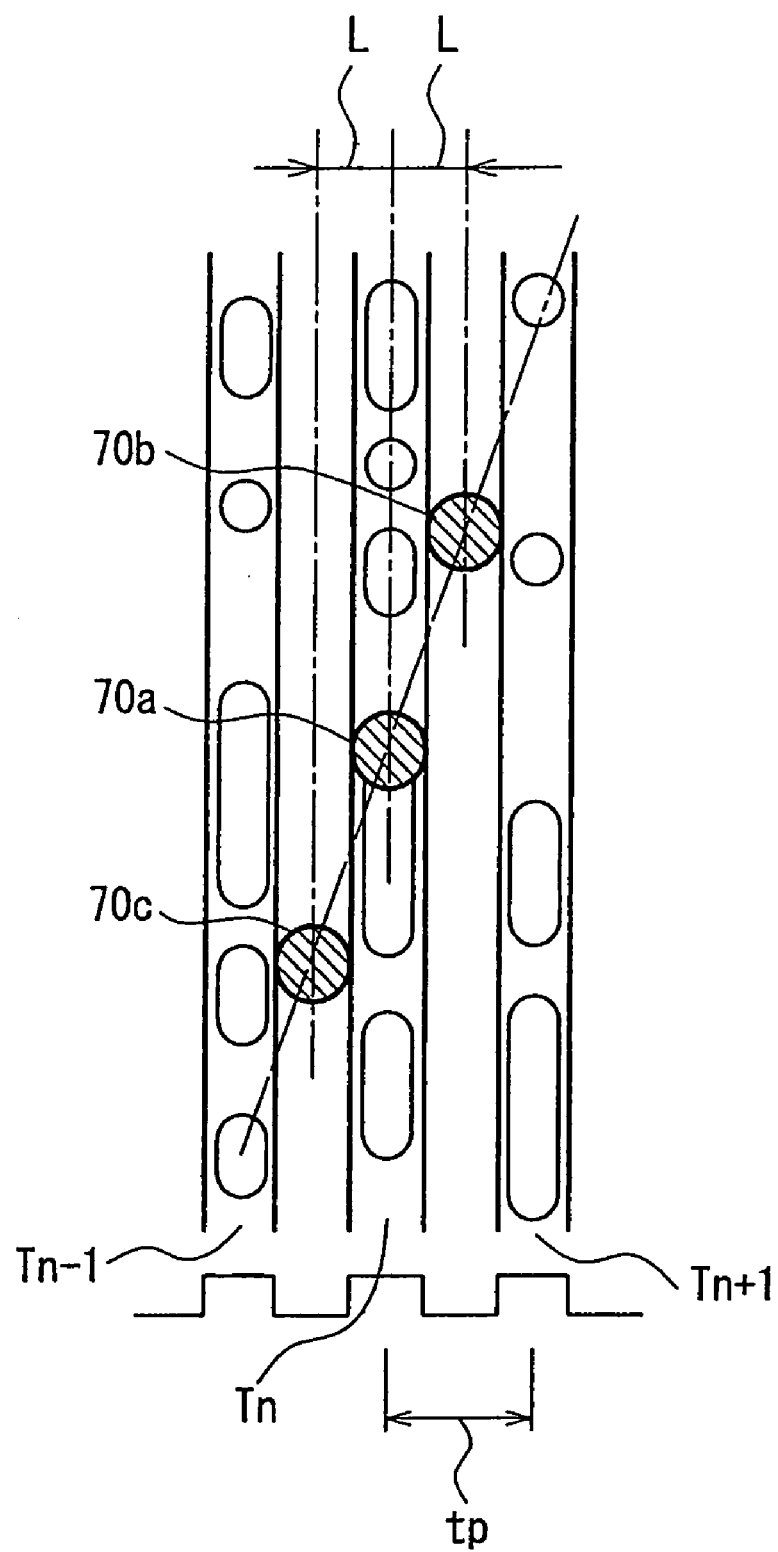
FIG. 3 shows a relationship between a track and a beam on an optical recording medium in the optical information apparatus of Embodiment 1 according to the present invention.

FIG. 3 shows a relationship between a beam and a track on the information recording surface 40b formed on the optical recording medium 40. The optical recording medium 40 is provided with a continuous groove to be a track. Tn−1, Tn, and Tn+1 are tracks, respectively. Information is recorded on the groove to be a track. A pitch tp is 0.32 μm. When the main beam 70a is positioned on the track Tn, the sub-beam 70c is positioned between the track Tn−1 and the track Tn, and the sub-beam 70b is positioned between the track Tn and the track Tn+1. An interval L in a direction orthogonal to each track between the main beam 70a and the sub-beams 70b, 70c is 0.16 μm.

The beams 70a to 70c reflected from the information recording surface 40b pass through the objective lens 56 and the quarter-wavelength plate 54. Then, the beams 70a to 70c are converted to linearly polarized light whose plane of polarization is shifted by 90° from an ingoing path, and thereafter, are reflected from the polarized beam splitter 52. The beams 70a to 70c reflected from the polarized beam splitter 52 pass through a detection lens 59 having a focal length f3 of 30 mm and a cylindrical lens 57 to be incident upon a photodetector 32. The beams 70a to 70c are provided with astigmatism when passing through the cylindrical lens 57.

Figure 4:
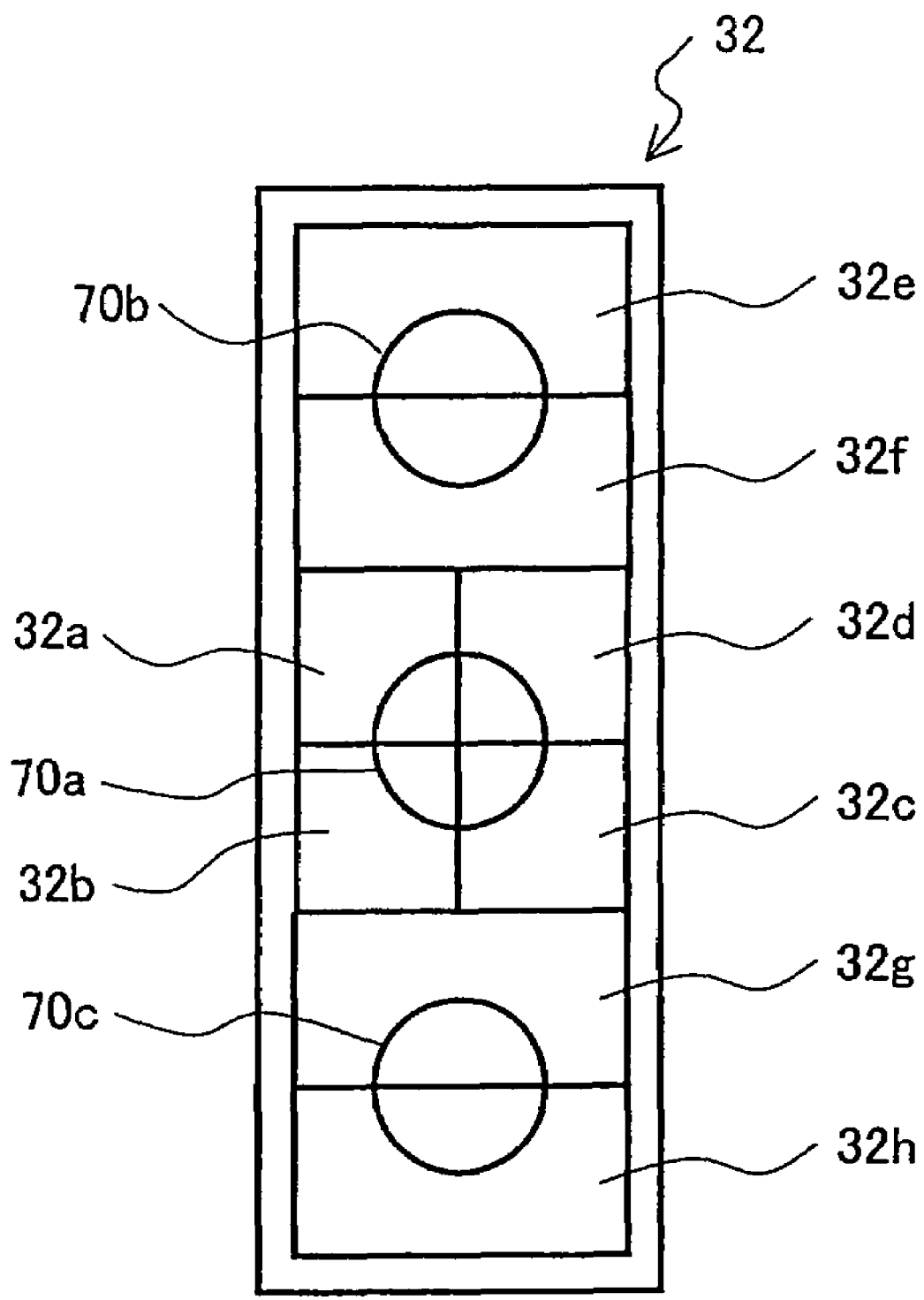
FIG. 4 shows a relationship between a beam and a photodetector constituting an optical pick-up head in the optical information apparatus of Embodiment 1 according to the present invention.

FIG. 4 schematically shows a relationship between the photodetector 32 and the beams 70a to 70c incident upon the photodetector 32. The photodetector 32 has 8 light-receiving portions 32a to 32h in total. The light-receiving portions 32a to 32d arranged in a matrix receive the beam 70a, the light-receiving portions 32e and 32f receive the beam 70b, and the light-receiving portions 32g and 32h receive the beam 70c. The light-receiving portions 32a to 32h output current signals I32a to I32h in accordance with the received light amounts, respectively.

AFE signal is obtained by the astigmatism method using the signals I32a to I32d output from the photodetector 32, i.e., by an arithmetic operation (I32a+I32c)−(I32b+I32d). Furthermore, a TE signal is obtained by a DPP method, i.e., by an arithmetic operation {(I32a+I32d)−(I32b+I32c)}−C·{(I32e+I32g)−(I32f+I32h)}. Herein, C is a coefficient determined by a ratio of a diffraction efficiency between the 0th order diffracted light and one 1st order diffracted light of the diffraction grating 58. The FE signal and the TE signal are amplified to a desired level and compensated for phase. Thereafter, these signals are supplied to actuators 91 and 92 for moving the objective lens 56, whereby focus and tracking control is performed.

Figure 5:
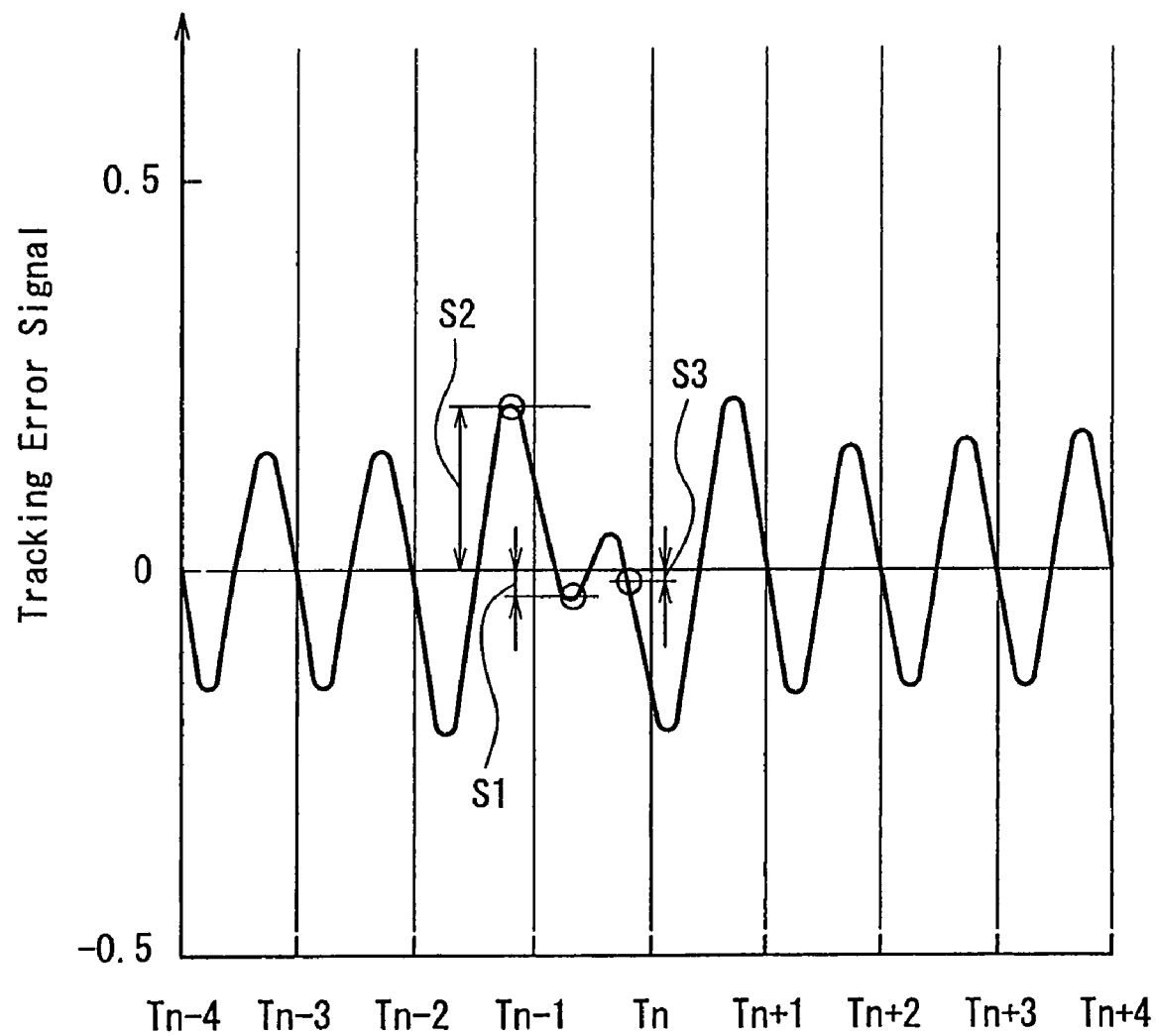
FIG. 5 shows a state of a TE signal obtained in the optical information apparatus of Embodiment 1 according to the present invention.

FIG. 5 shows a TE signal according to the push-pull method obtained by scanning the beams 70a to 70c in a direction orthogonal to the tracks formed on the optical recording medium 40. Due to the error occurring in the course of production of the optical recording medium 40, the tracks Tn−1 and Tn formed on the information recording surface 40b of the optical recording medium 40 are formed at positions shifted by 25 nm from positions where they are supposed to be formed. Herein, the main beam 70a and the sub-beams 70b and 70c are placed so as to be shifted by tp/2 in a direction orthogonal to the tracks. Therefore, as shown in FIG. 5, when the main beam 70a is positioned between the tracks Tn−1 and Tn, and a signal with an amplitude S1 is obtained, the sub-beam 70c is positioned between the tracks Tn−1 and Tn−2, and a signal with an amplitude S2 is obtained, and the sub-beam 70b is positioned in the vicinity of the track Tn between the tracks Tn−1 and Tn, and a signal with an amplitude S3 is obtained.

A signal obtained by averaging the signal with an amplitude S2 and the signal with an amplitude S3 is a TE signal according to the push-pull method obtained from two sub-beams 70b and 70c. Herein, a relationship |(S2+S3)/2|>|S1| is satisfied. Assuming that the TE signal obtained from the main beam 70a is a first push-pull signal, and the TE signal obtained from two sub-beams 70b and 70c is a second push-pull signal, according to the DPP method, a TE signal is obtained by subjecting the first push-pull signal and the second push-pull signal to a differential arithmetic operation.

As described above, |(S2+S3)/2|>|S1| is satisfied. Therefore, a fluctuation in a TE signal amplitude can be reduced by the DPP method. Regarding a TE signal obtained by a conventional optical information apparatus described above, in the case where there is an error in a production position of tracks on the optical recording medium, the error is reflected directly in the amplitude of the TE signal. In Embodiment 1, positions different from that of the main beam 70a in a direction orthogonal to tracks are irradiated with the sub-beams 70b and 70c. Therefore, even when the main beam 70a is positioned on a track having an error in a production position, the sub-beams 70b and 70c are placed at other positions, so that the influence of this error is alleviated irrespective of the error in a production position when the tracks are formed on the optical recording medium 40. A fluctuation amount ΔPP of a TE signal is 0.69 in the conventional optical information apparatus, whereas the fluctuation amount ΔPP in the optical information apparatus of Embodiment 1 is 0.44, which is about ⅔ of that of the conventional optical information apparatus. Thus, in the optical information apparatus of Embodiment 1, a fluctuation in a TE signal amplitude is reduced, and a tracking operation can be performed stably. Therefore, information can be recorded/produced with high reliability.

Furthermore, in the conventional optical information apparatus, the off-track oft1 in the track Tn−1 is +33 nm and the off-track oft2 in the track Tn is −33 nm. In the optical information apparatus according to Embodiment 1, the off-track oft1 is +10 nm, and the off-track oft2 is −10 nm, which are about ⅓ of those in the conventional optical information apparatus. Thus, in the optical information apparatus of Embodiment 1, even with the use of an inexpensive optical recording medium in which a TE signal amplitude is fluctuated, an off-track amount is small, and information recorded in adjacent tracks is unlikely to be erased. Accordingly, an optical information apparatus capable of recording/reproducing information with high reliability can be obtained.

Embodiment 2

Figure 6:
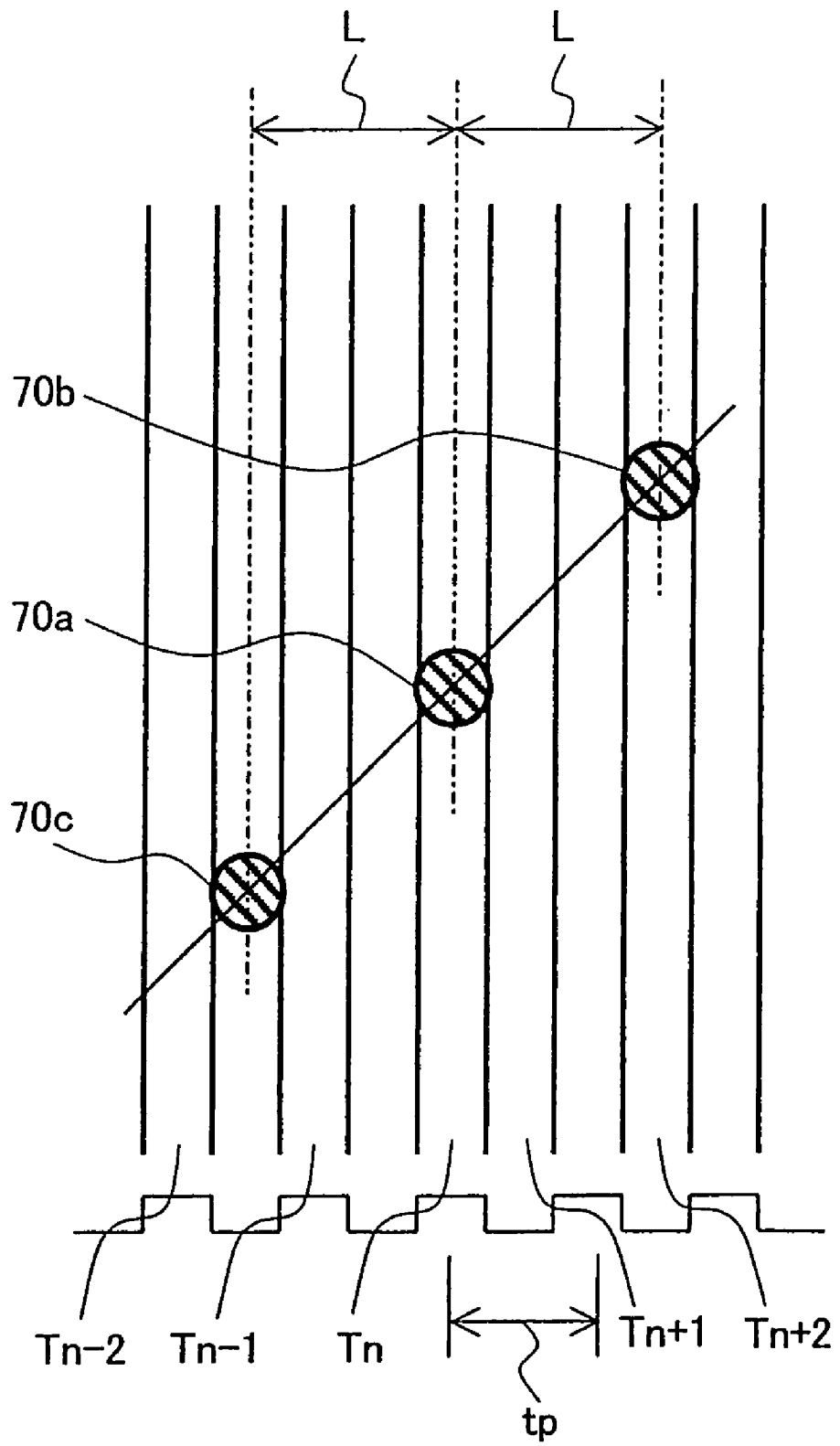
FIG. 6 shows a relationship between a track and a beam on an optical recording medium in an optical information apparatus of Embodiment 2 according to the present invention.

FIG. 6 shows a relationship between a beam and a track on the information recording surface 40b as an example of another optical information apparatus according to the present invention. In the optical pick-up head 4 constituting the optical information apparatus of Embodiment 1, when the main beam 70a is positioned on the track Tn, the sub-beam 70c is positioned between the tracks Tn−1 and Tn, and the sub-beam 70b is positioned between the tracks Tn and Tn+1. In the optical pick-up head constituting the optical information apparatus of Embodiment 2, when the main beam 70a is positioned on the track Tn, the sub-beam 70c is positioned between the tracks Tn−2 and Tn−1, and the sub-beam 70b is positioned between the tracks Tn+1 and Tn+2. More specifically, an interval L in a direction orthogonal to the tracks between the main beam and the sub-beams is (3·tp)/2=0.48 μm. By slightly rotating the diffraction grating 58 in the optical pick-up head 4, an optical pick-up head constituting the optical information apparatus of Embodiment 2 can be configured. ATE signal can be obtained by the arithmetic operation similar to that described in Embodiment 1.

The interval L in a direction orthogonal to the tracks between the main beam and the sub-beams is set to be larger than that described with reference to FIG. 3 in Embodiment 1, whereby the fluctuation in a TE signal amplitude can be reduced compared with the optical information apparatus of Embodiment 1. The fluctuation amount ΔPP of the TE signal is 0.44 in the optical information apparatus of Embodiment 1, whereas in the optical information apparatus of Embodiment 2, the fluctuation amount ΔPP of the TE signal is 0.21, which is about ½ of that of Embodiment 1. Thus, in the optical information apparatus of Embodiment 2, the fluctuation in a TE signal amplitude is reduced further, and a tracking operation can be performed stably, so that information can be recorded/reproduced with high reliability.

Furthermore, in the optical information apparatus of Embodiment 1, the off-track oft1 in the track Tn−1 is +10 nm, and the off-track oft2 in the track Tn is −10 nm. In the optical information apparatus of Embodiment 2, the off-track oft1 is −6 nm, and the off-track oft2 is +6 nm, which is about ½ of that in Embodiment 1. Thus, in the optical information apparatus of Embodiment 2, even in the case of using an inexpensive optical recording medium in which a TE signal amplitude is fluctuated, an off-track amount is reduced further, and information recorded on adjacent tracks is further unlikely to be erased. Thus, an optical information apparatus is obtained, capable of recording/reproducing information with higher reliability.

Embodiment 3

Figure 7:
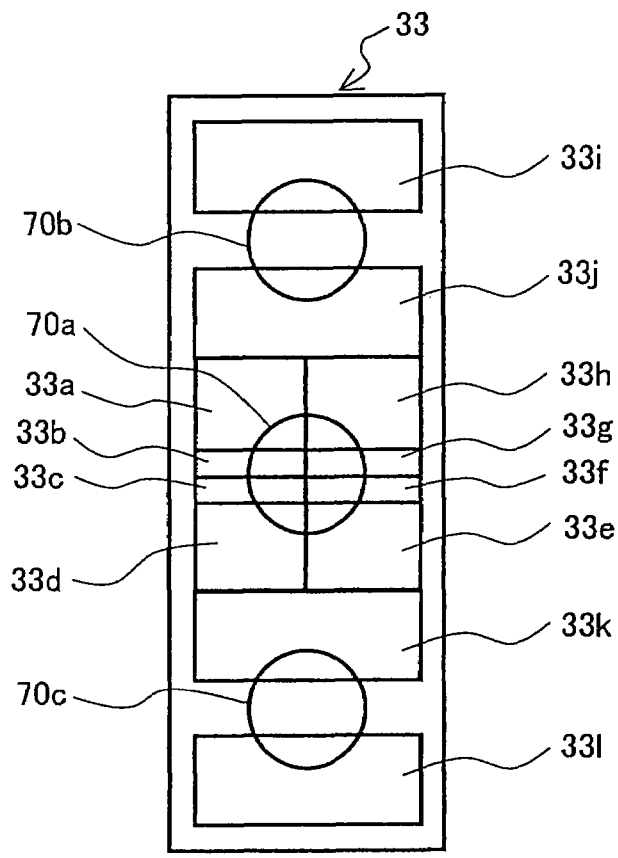
FIG. 7 shows a relationship between a beam and a photodetector constituting an optical pick-up head in the optical information apparatus of Embodiment 3 according to the present invention.

FIG. 7 schematically shows a relationship between a photodetector 33 and the beams 70a to 70c as an example of another optical information apparatus according to Embodiment 3. By using the photodetector 33 in place of the photodetector 32 constituting the optical pick-up head 4, an optical information apparatus of Embodiment 3 can be configured. The photodetector 33 has 12 light-receiving portions 33a to 33l in total. The light-receiving portions 33a to 33h receive the beam 70a. The light-receiving portions 33i to 33j receive the beam 70b. The light-receiving portions 33k to 33l receive the beam 70c. The light-receiving portions 33a to 33l output current signals I33a to I33l in accordance with the respectively received light amounts. AFE signal is obtained by the astigmatism method using the current signals I33a to I33h output from the photodetector 33, i.e., by an arithmetic operation (I33a+I33b+I33e+I33f)−(I33c+I33d+I33g+I33h). This arithmetic operation seems to be complicated, since the photodetector 33 has more light-receiving portions than the photodetector 32. Actually, this arithmetic operation is a general operation of obtaining a FE signal by the astigmatism method.

On the other hand, a TE signal is obtained by a DPP method. The TE signal herein is obtained by an arithmetic operation {(I33a+I33h)−(I33d+I33e)}−C·{(I33i+I33k)−(I33j+I33l)}. Assuming that the TE signal obtained from the main beam 70a is a first push-pull signal, and the TE signal obtained from two sub-beams 70b and 70c is a second push-pull signal, a TE signal is obtained by subjecting the first push-pull signal and the second push-pull signal to a differential operation in the same way as in the optical information apparatus of Embodiment 1.

However, signals output from the light-receiving portions 33b, 33c, 33f, and 33g that receive light in the vicinity of a center of the main beam 70a are not used for generating the first push-pull signal. Furthermore, the light-receiving portions 33i and 33j that receive the sub-beam 70b do not receive light in the vicinity of a center of the beam 70b. Herein, the width of a region that does not receive a beam is set to be 70% of the diameter of the beam. Similarly, the light-receiving portions 33k and 33l that receive the sub-beam 70c do not receive light in the vicinity of a center of the beam 70c. More specifically, the first push-pull signal is generated without using the region in the vicinity of the center of the main beam, and the second push-pull signal is generated without using the region in the vicinity of the center of the first and second sub-beams, which is different from Embodiments 1 and 2. This is based on the following principle: a number of fluctuation components are concentrated in the vicinity of the center of the beam when a track is formed by being fluctuated from a pitch tp. Therefore, the fluctuation can be reduced by avoiding the use of the vicinity of the center of the beam. For example, in the case where a positional shift of a track occurs every three tracks, three tracks should be considered as one periodic structure. The pitch in this case is three times of tp. The diffracted light from this periodic structure has a long pitch, so that the diffraction angle of the beam is smaller accordingly. That is, 1st order diffracted light from the periodic structure is concentrated at the center of the beam.

The fluctuation in a TE signal amplitude can be reduced further, compared with the optical information apparatus of Embodiment 2. The fluctuation amount ΔPP of the TE signal is 0.14 in the optical information apparatus, which is ¼ or less of that of the conventional optical information apparatus. Thus, in the optical information apparatus of Embodiment 3, the fluctuation in a TE signal amplitude can be reduced, and a tracking operation can be performed stably. Therefore, the optical information apparatus of Embodiment 3 can record/reproduce information with high reliability.

Furthermore, in Embodiment 3, the off-track oft1 in the track Tn−1 is −11 nm, and the off-track oft2 in the track Tn is +11 nm, which are about ⅓ of those of the conventional optical information apparatus. Thus, in the optical information apparatus of Embodiment 3, even in the case of using an inexpensive optical recording medium in which a TE signal amplitude is fluctuated, an off-track amount is further reduced, and information recorded on adjacent tracks is more unlikely to be erased. Thus, an optical information apparatus capable of recording/reproducing information with high reliability can be obtained.

The region in the vicinity of the center of the beam that is not used for generating a TE signal is prescribed to be a portion excluding a region where 0th order diffracted light is overlapped with 1st order diffracted light from an optical recording medium in which a diffraction angle is dependent upon a pitch tp, a numerical aperture NA, and a wavelength λ. Thus, the fluctuation in a TE signal amplitude can be reduced effectively.

Embodiment 4

Figure 8:
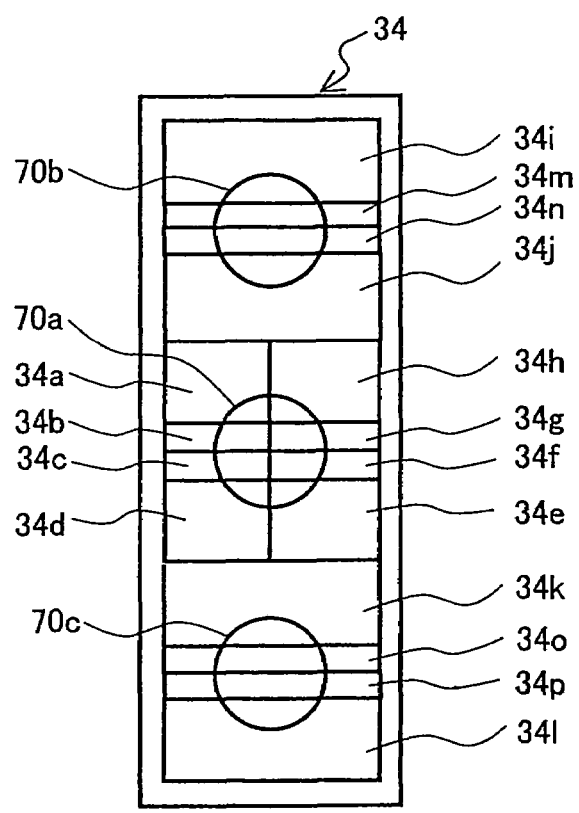
FIG. 8 shows a relationship between a beam and a photodetector constituting an optical pick-up head in the optical information apparatus of Embodiment 4 according to the present invention.

FIG. 8 schematically shows a relationship between a photodetector 34 and the beams 70a to 70c as an example of another optical information apparatus according to the present invention. By using the photodetector 34 in place of the photodetector 32 constituting the optical pick-up head 4, an optical information apparatus of Embodiment 4 can be configured. The photodetector 34 has 16 light-receiving portions 34a to 34p in total. The light-receiving portions 34a to 34h receive the beam 70a. The light-receiving portions 34i to 34j and 34m to 34n receive the beam 70b. The light-receiving portions 34k to 34l and 34o to 34p receive the beam 70c.

The light-receiving portions 34a to 34p output current signals I34a to I34p in accordance with the respectively received light amounts. AFE signal is obtained by the astigmatism method using the current signals I34a to I34h output from the photodetector 34. An arithmetic operation is the same as that in the case of using the photodetector 33 described with reference to FIG. 7.

On the other hand, a TE signal is obtained by a DPP method. The TE signal herein is obtained by an arithmetic operation {(I34a+I34h)−(I34d+I34e)}−K·{(I34b+I34g)−(I34c+I34f)}−C·[{(I34i+I34k)−(I34j+I34l)}−k·{(I34m+I34o)−(I34n+I34p)}]. In this operation, k is a coefficient and a real number. Assuming that the TE signal obtained from the main beam 70a is a first push-pull signal, and the TE signal obtained from two sub-beams 70b and 70c is a second push-pull signal, a TE signal is obtained by subjecting the first push-pull signal and the second push-pull signal to a differential operation according to the DPP method in the same way as in the optical information apparatus of Embodiment 1.

However, the above-mentioned operation is different from that according to the general DPP method in that, in order to generate the first push-pull signal, the signals output from the light-receiving portions 34b, 34c, 34f, and 34g that receive light in the vicinity of the center of the main beam 70a, the light-receiving portions 34m and 34n that receive light in the vicinity of the center of the sub-beam 70b, and the light-receiving portions 34o and 34p that receive light in the vicinity of the center of the sub-beam 70c are multiplied by the coefficient k, respectively. This is based on the following principle: a number of fluctuation components are concentrated in the vicinity of the center of the beam when a track is formed by being fluctuated from a pitch tp; therefore, the fluctuation can be reduced by manipulating the vicinity of the center of the beam. For example, in the case where a positional shift of a track occurs every three tracks, three tracks should be considered as one periodic structure. The pitch in this case is three times of tp. The diffracted light from this periodic structure has a long pitch, so that the diffraction angle of the beam is smaller accordingly. That is, 1st order diffracted light from the periodic structure is concentrated at the center of the beam.

In the optical information apparatus of Embodiment 3, the fluctuation in a TE signal amplitude is suppressed by avoiding the use of the vicinity of the center of the beam. However, in Embodiment 4, the fluctuation components mixed in the light-receiving portions 34a, 34d, 34e, and 34h-34l that detect a TE signal are cancelled with signals obtained from the vicinity of the centers of the beams 70a to 70c received by the light-receiving portions 34b, 34c, 34f, 34g, and 34m-34p, whereby the fluctuation in a TE signal amplitude is further reduced.

The fluctuation in a TE signal amplitude can be reduced further, compared with the optical information apparatus of Embodiment 2. Assuming that k=−0.45, the fluctuation amount ΔPP of the TE signal is 0.28, the off-track oft1 in the track Tn−1 is 0 nm, and the off-track oft2 in the track Tn is 0 nm. Thus, the fluctuation in a TE signal amplitude is reduced by ½ or less compared with the conventional optical information apparatus, whereby an off-track can be reduced to substantially 0. More specifically, in the optical information apparatus of Embodiment 4, even in the case where a track position is shifted in the course of production of an optical recording medium, information can be recorded/reproduced with respect to the center of a groove at all times. On the other hand, assuming that k=0.35, the fluctuation amount ΔPP of the TE signal is 0.04, the off-track oft1 in the track Tn−1 is −21 nm, and the off-track oft2 in the track Tn is +21 nm. The fluctuation in a TE signal amplitude can be reduced to substantially 0, compared with the conventional optical information apparatus. Thus, the optical information apparatus of Embodiment 4 has very stable tracking control, and is capable of recording/reproducing information with high reliability. Furthermore, the off-tracks oft1 and oft2 represent a shift amount from the center of a groove. Assuming that the off-track amount in the tracks Tn−1 and Tn are toft1 and toft2, respectively, in the case where information is always recorded on an optical recording medium at a pitch tp, and tracks are virtually present at an interval of tp, the off-track amount toft1 is +4 nm and the off-track amount toft2 is −4 nm, which are very small. That is, in the optical information apparatus of Embodiment 4, even in the case where the position of a groove is shifted in the course of the production of the optical recording medium, information always can be recorded at a constant pitch, and information recorded on adjacent tracks is more unlikely to be erased. Thus, an optical information apparatus capable of recording/reproducing information with high reliability can be obtained.

By splitting the beams 70a to 70c by the light-receiving portions 34a to 34p constituting the photodetector 34, the optical information apparatus of the present embodiment can be configured without the necessity of adding another optical component and without complicating an optical system. Thus, an inexpensive optical information apparatus can be provided.

Furthermore, the coefficient k for minimizing the fluctuation amount of the TE signal is different from that for minimizing an off-track. Therefore, in accordance with the performance required by the optical information apparatus, the coefficient k may be set between the value for minimizing the fluctuation amount of the TE signal and the value for minimizing an off-track, whereby an optical information apparatus with good balance of performance can be obtained.

Embodiment 5

Figure 9:
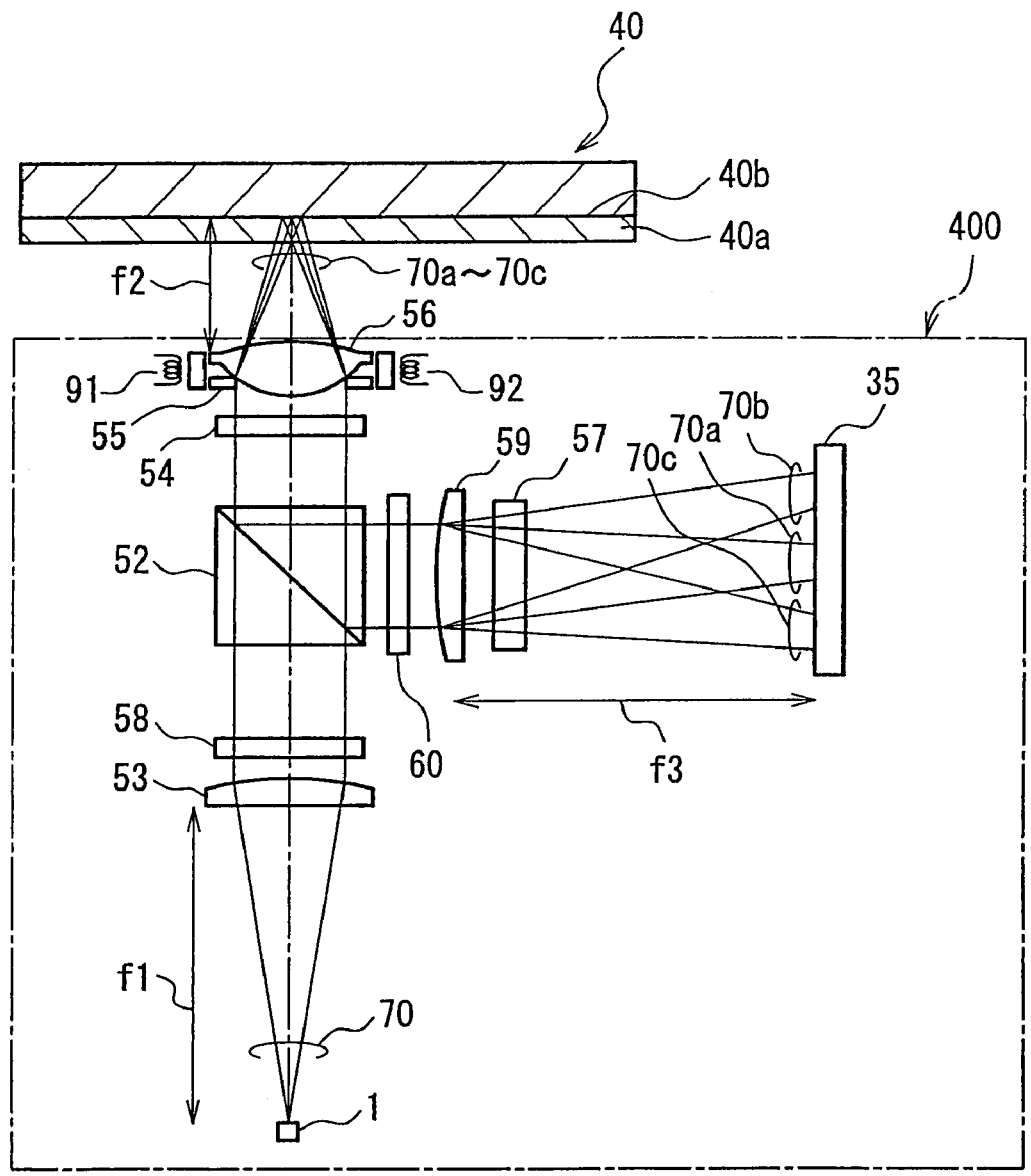
FIG. 9 shows a configuration of an optical pick-up head in an optical information apparatus of Embodiment 5 according to the present invention.

FIG. 9 shows an exemplary configuration of an optical pick-up head 400. of the present invention, as an example of another optical information apparatus according to the present invention.

The optical pick-up head 400 is different from the optical pick-up head 4 of Embodiment 1 in that a beam splitter 60 is provided between the polarized beam splitter 52 and the condensing lens 59, and a photodetector 35 is used in place of the photodetector 32. By using the optical pick-up head 400 in place of the optical pick-up head 4, the optical information apparatus of Embodiment 5 can be configured.

Figure 10:
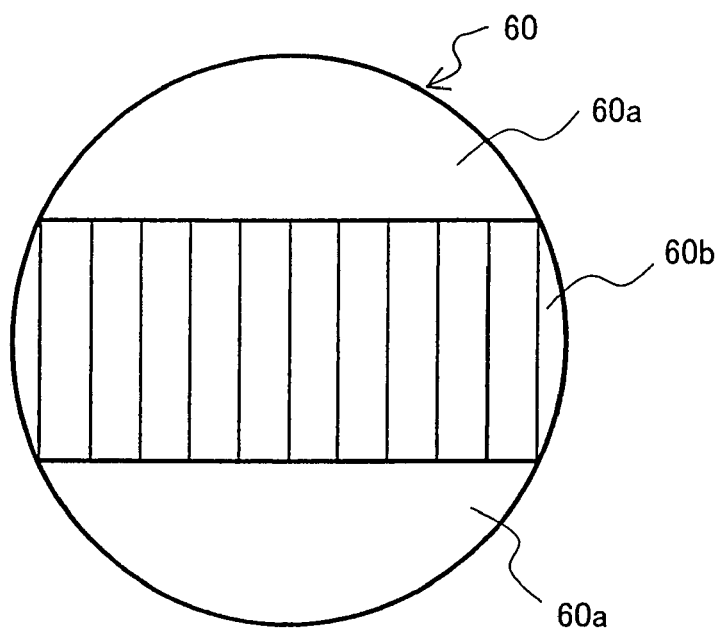
FIG. 10 shows a configuration of a beam splitter constituting the optical information apparatus of Embodiment 5 according to the present invention.

FIG. 10 schematically shows a configuration of the beam splitter 60. The beam splitter 60 has two kinds of regions 60a and 60b. The region 60a is transparent, which transmits an incident beam as it is. On the other hand, the region 60b is provided with a blazed diffraction grating and diffracts an incident beam efficiently in one direction. Thus, when the beams 70a to 70c are incident upon the regions 60a and 60b, the beams 70a to 70c are split into two, respectively.

Figure 11:
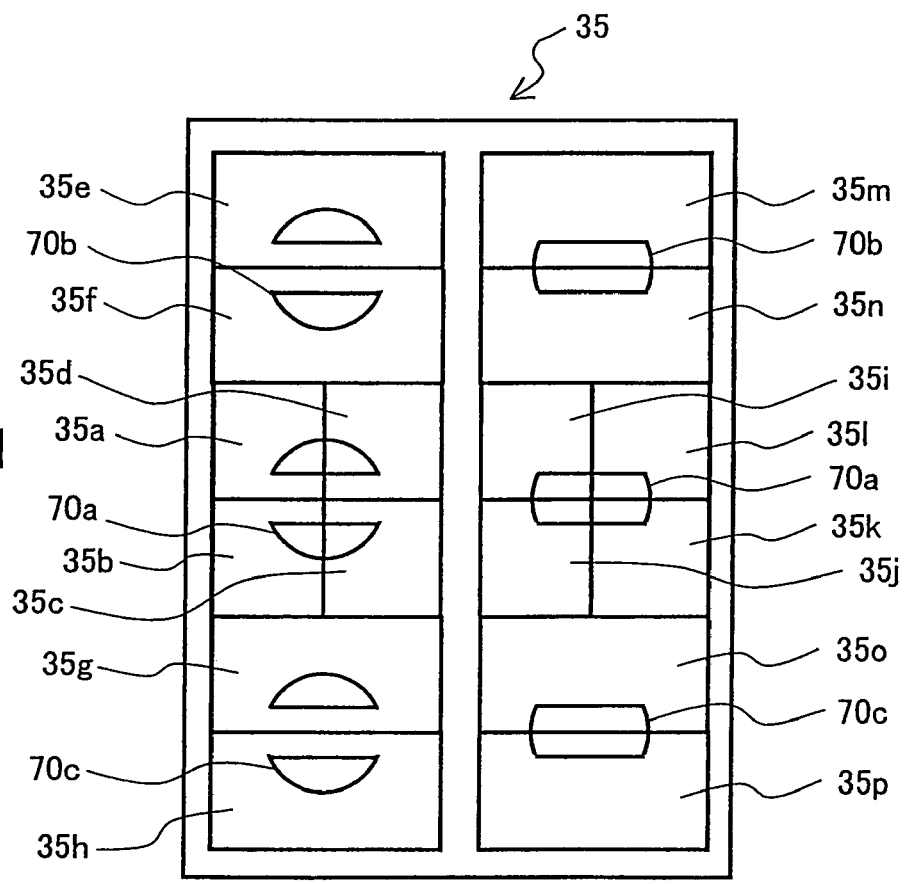
FIG. 11 shows a relationship between a beam and a photodetector constituting an optical pick-up head in the optical information apparatus of Embodiment 5 according to the present invention.

FIG. 11 schematically shows a relationship between the photodetector 35 and the beams 70a to 70c. The photodetector 35 has 16 light-receiving portions 35a to 35p in total. The light-receiving portions 35a to 35h receive the beams 70a to 70c having passed through the region 60a of the beam splitter 60, and the light-receiving portions 35i to 35p receive the beams 70a to 70c diffracted in the region 60b of the beam splitter 60. Sixteen light-receiving portions 35a to 35p output current signals I35a to I35p in accordance with the respectively received light amounts. AFE signal is obtained by an arithmetic operation (I35a+I35c+I35i+I35k)−(I35b+I35d+I35j+I35l). This arithmetic operation seems to be complicated, since the photodetector 35 has more light-receiving portions than the photodetector 32. Actually, this arithmetic operation is a general operation of obtaining a FE signal by the astigmatism method.

A TE signal is obtained by a DPP method. The TE signal herein is obtained by an arithmetic operation {(I35a+I35d)−(I35b+I35c)}−C·{(I35e+I35g)−(I35f+I35h)}−k·[{(I35i+I35l)−(I35j+I35k)}−C19 {(I35m+I35o)−(I35n+I35p)}].

The characteristics of a TE signal to be obtained are the same as those of the optical information apparatus of Embodiment 4. The TE signal also may be obtained by an arithmetic operation {(I35a+I35d)−(I35b+I35c)}−k·{(I35e+I35g)−(I35f+I35h)}. The characteristics of the TE signal are the same as those of the optical information apparatus of Embodiment 3.

On the other hand, in the optical information apparatus of Embodiment 5, a spherical aberration error signal that is indicative of the spherical aberration amount of the beams 70a to 70c condensed onto the optical recording medium 40 can be generated. The spherical aberration error signal is obtained by an arithmetic operation (I35a+I35c)−(I35b+I35d)}−C2·{(I35i+I35k)−(I35j+I35l)}. More specifically, signals output from the light-receiving portions 35i to 35l receiving a region in the vicinity of the center of the main beam 70a are subjected to a differential operation to generate a first FE signal. Signals output from the light-receiving portions 35a to 35d receiving a region in the vicinity of the outside of the main beam 70a are subjected to a differential operation to generate a second FE signal. Then, the first FE signal and the second FE signal are subjected to a differential operation to obtain a spherical aberration error signal. Herein, a coefficient C2 is a real number, which is a correction coefficient for adjusting the spherical aberration error signal to be 0 at a desired spherical aberration amount. A spherical aberration corrector is provided in the optical pick-up head 4, and is controlled using a spherical aberration error signal. Because of this, a spherical aberration of a beam condensed onto the optical recording medium 40 can be reduced, and a mark with less jitter can be recorded on the optical recording medium, whereby an optical information apparatus with high reliability can be provided. The spherical aberration corrector can have a generation configuration such as a liquid crystal element, a concave and convex cemented lens, and the like. Therefore, the description thereof is omitted here.

Embodiment 6

Figure 12:
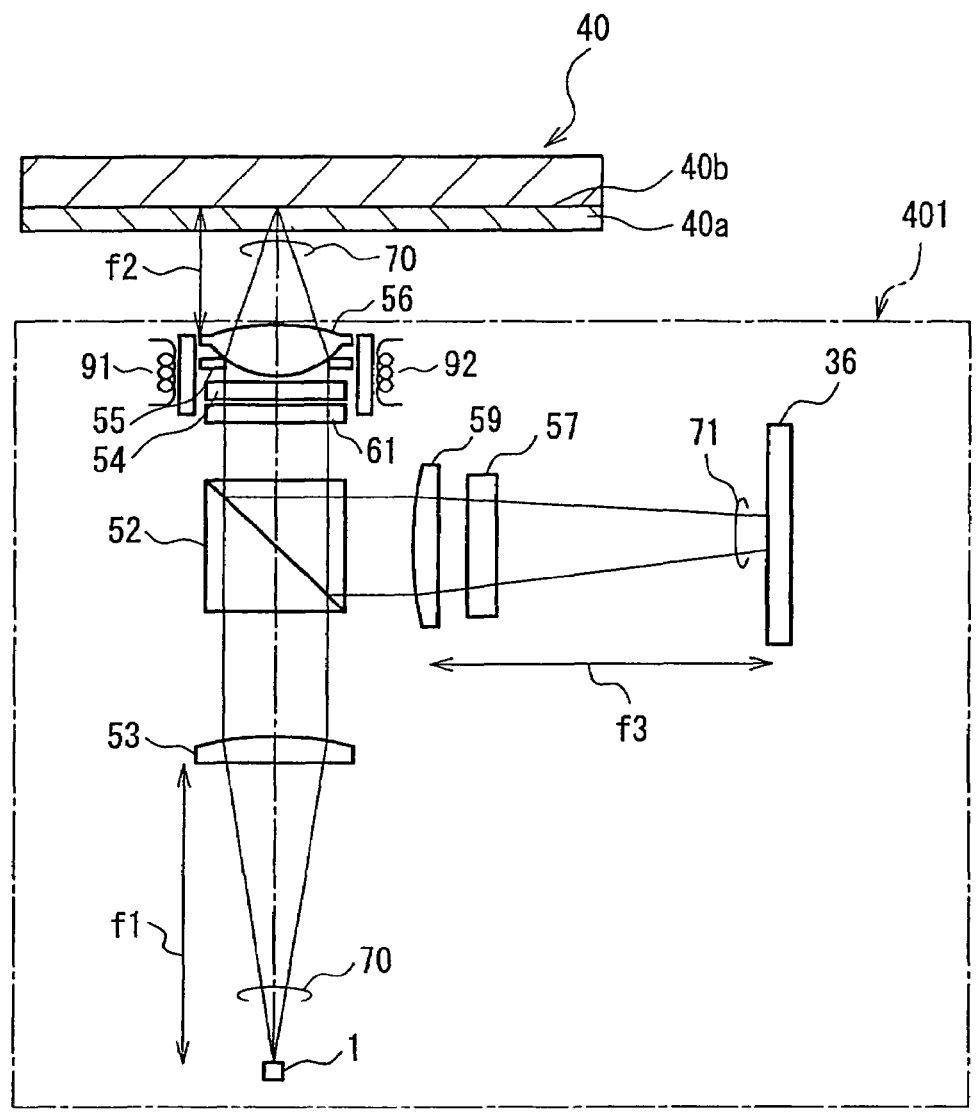
FIG. 12 shows a configuration of an optical pick-up head in an optical information apparatus of Embodiment 6 according to the present invention.

FIG. 12 shows an exemplary configuration of an optical pick-up head 401 according to the present invention, as an example of another optical information apparatus according to the present invention.

The difference between the optical pick-up head 4 in Embodiment 1 and the optical pick-up head 401 in Embodiment 6 is as follows. In the optical pick-up head 401, the diffraction grating 58 is not used, so that one beam 70 is condensed onto the information recording surface 40b of the optical recording medium 40. Furthermore, a beam splitter 61 is provided. The beam splitter 61 is integrated with the quarter-wavelength plate 54 and the objective lens 56. The actuators 91 and 92 drive the beam splitter 61, the quarter-wavelength plate 54, and the objective lens 56 to perform focus control and tracking control. The beam splitter 61 is dependent upon polarization, and transmits all the incident beams 70 in an ingoing path toward the optical recording medium 40 from the light source 1. On the other hand, in an outgoing path toward the photodetector 36 of a beam reflected from the optical recording medium 40, a large part of the incident light beam is transmitted, and a part thereof is diffracted to generate a plurality of diffracted light beams. Furthermore, the photodetector 36 is used in place of the photodetector 32. By using the optical pick-up head 401 in place of the optical pick-up head 4, an optical information apparatus of Embodiment 6 can be configured.

Figure 13:
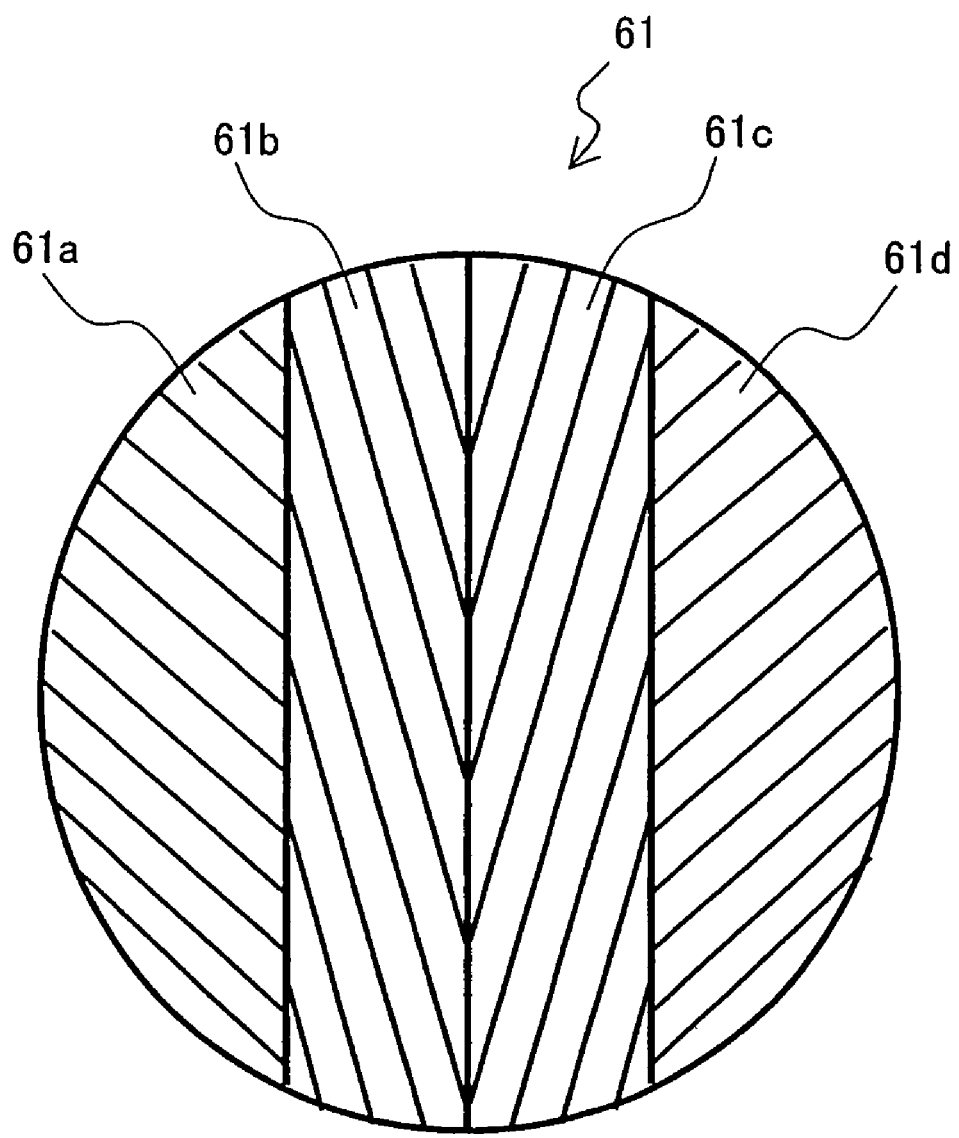
FIG. 13 shows a configuration of a beam splitter constituting the optical information apparatus of Embodiment 6 according to the present invention.

FIG. 13 schematically shows a configuration of the beam splitter 61. The beam splitter 61 has 4 kinds of regions 61a to 61d, which transmit a large part of the incident beam 70 to generate a 0th order diffracted light beam 710 and diffract a part of the incident beam 70 to generate the beams 71a to 71d from the regions 61a to 61d, respectively.

Figure 14:
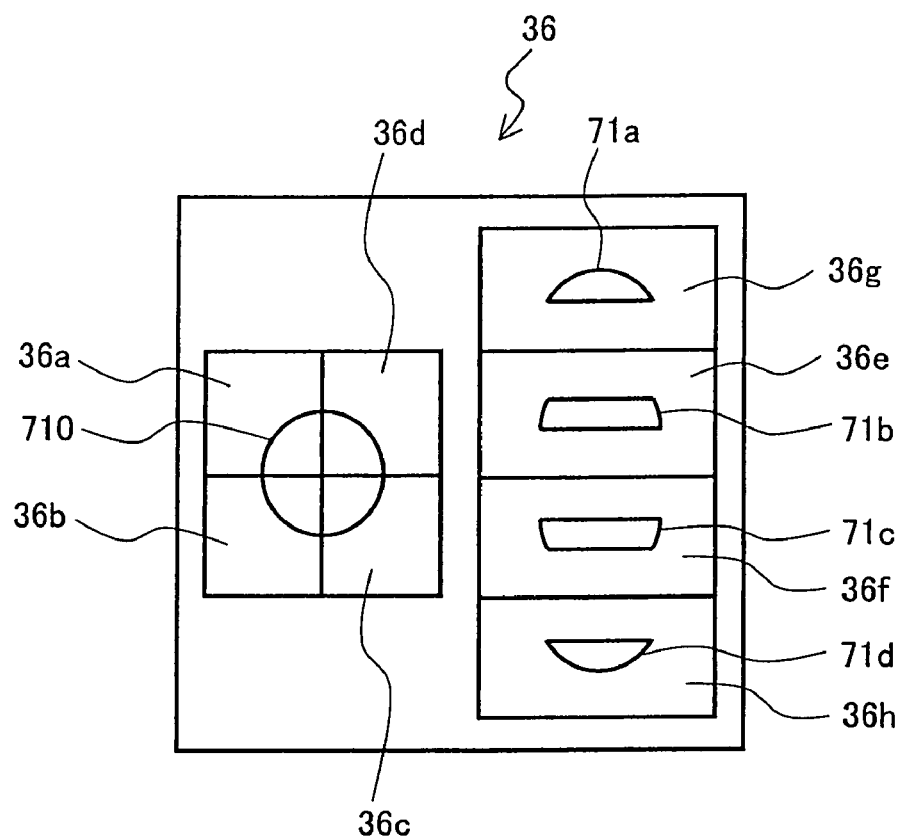
FIG. 14 shows a relationship between a beam and a photodetector constituting an optical pick-up head in the optical information apparatus of Embodiment 6 according to the present invention.

FIG. 14 schematically shows a relationship between the photodetector 36 and the beams 71a to 71d, and 710. The photodetector 36 has 8 light-receiving portions 36a to 36h in total. The light-receiving portions 36a to 36d receive the beam 710. The light-receiving portion 36g receives the beam 71a. The light-receiving portion 36e receives the beam 71b. The light-receiving portion 36f receives the beam 71c. The light-receiving portion 36h receives the beam 71d. The light-receiving portions 36a to 36h output current signals I36a to I36h in accordance with the respectively received light amounts. AFE signal is obtained by an arithmetic operation (I36a+I36c)−(I36b+I36d).

On the other hand, a TE signal is obtained by an arithmetic operation (I36g−I36h)−k·(I36e−I36f). Assuming that k=0.35, a fluctuation amount ΔPP of the TE signal is 0.04, an off-track oft1 in the track Tn−1 is −19 nm, and an off-track oft2 in the track Tn is +19 nm. Thus, the fluctuation in a TE signal amplitude can be reduced to substantially 0 compared with the conventional optical information apparatus, and tracking control can be performed very stably.

The TE signal also may be obtained by an arithmetic operation (I36g−I36h). At this time, the fluctuation amount ΔPP of the TE signal is 0.24, the off-track oft1 in the track Tn−1 is −1 nm, and the off-track oft2 in the track Tn is +1 nm. Thus, even in the case where the position of a track is shifted in the course of production of the optical recording medium, information can be recorded at the center of a groove at all times.

In the optical information apparatus of Embodiment 6, only one beam 71 is condensed onto the optical recording medium 40. Therefore, even in the case where the optical recording medium 40 has large eccentricity, the fluctuation amount of the TE signal amplitude is not increased, and tracking control can be performed stably.

Furthermore, the beam splitter 61, the quarter-wavelength plate 54, and the objective lens 56 are integrated, and driven by the actuators 91 and 92. Even in the case where a track is followed while the optical recording medium 40 has eccentricity, the position at which the beam 71 is split is always constant. Therefore, the fluctuation in a TE signal amplitude always can be reduced stably without depending upon the amount of eccentricity of the optical recording medium 40. Furthermore, the split width of the beam 71 can be set so as to minimize the fluctuation in a TE signal amplitude without considering the eccentricity of the optical recording medium, thereby providing an optical information apparatus capable of further reducing the fluctuation in a TE signal amplitude. Furthermore, an offset occurring in a TE signal when a track is followed can be reduced.

Furthermore, since the diffraction grating 58 is not provided, an output amount from the light source 1 required for recording information on the optical recording medium 40 may be smaller than that of the optical pick-up head 4. This reduces the burden of the light source 1 accordingly, and prolongs the life of the light source 1. Thus, an optical information apparatus that can be used for a long period of time is provided.

Furthermore, the regions 61a to 61d of the beam splitter 61 have a lens effect so that diffracted light is focused on the photodetector 36, whereby the size of the light-receiving portions 36e to 36h can be reduced. As the size of the light-receiving portions 36e to 36h is smaller, they are less likely to be influenced by stray light, which allows tracking control to be performed more stably. This is effective, particularly, in the case of using an optical recording medium having a plurality of information recording surfaces. When the size of the light-receiving portions is decreased, even if the focal length of the condensing lens 59 is shortened, i.e., even if the magnification of a detection optical system is decreased, the influence of stray light is not increased, enabling an optical information apparatus stable to a change with passage of time to be provided.

Embodiment 7

Figure 15:
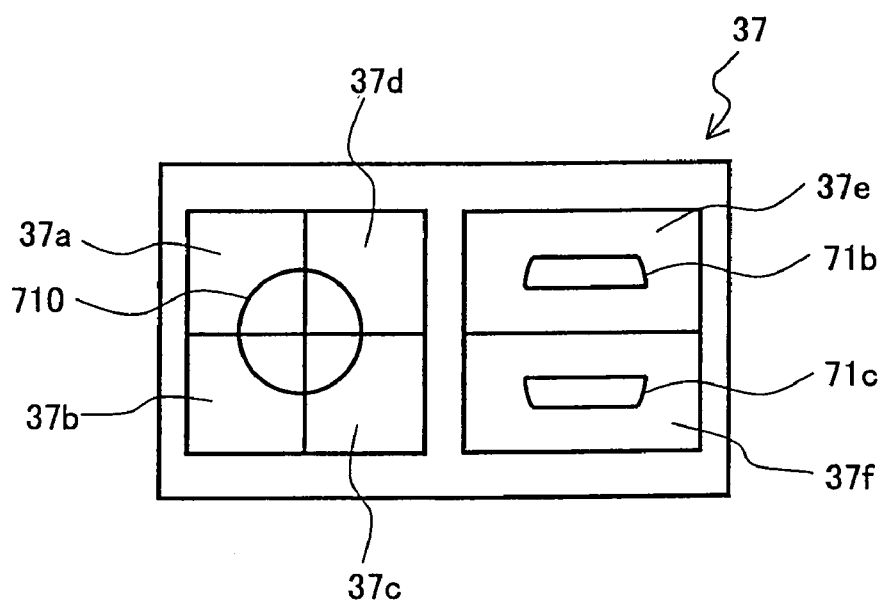
FIG. 15 shows a relationship between a beam and a photodetector constituting an optical pick-up head in an optical information apparatus of Embodiment 7 according to the present invention.

FIG. 15 schematically shows a relationship between a photodetector 37 and the beams 71b to 71c, and 710, as an example of another optical information apparatus according to the present invention. By using the photodetector 37 in place of the photodetector 36 in Embodiment 6, an optical information apparatus of Embodiment 7 can be configured. The photodetector 37 is obtained by eliminating the light-receiving portions 36g and 36h from the photodetector 36. The photodetector 37 has 6 light-receiving portions 37a to 37f in total. The light-receiving portions 37a to 37d receive the beam 710. The light-receiving portion 37e receives the beam 71b. The light-receiving portion 37f receives the beam 71c.

A TE signal is obtained by an arithmetic operation {(I37a+I37d)−(I37b+I37c)}−k·(I37e−I37f). By appropriately selecting a coefficient k, the same characteristics as those of the optical information apparatus of Embodiment 6 can be obtained. The photodetector 37 is smaller than the photodetector 36 of Embodiment 6, so that an optical pick-up head of the present embodiment becomes smaller than that of Embodiment 6 by the decreased size of the photodetector 37. Furthermore, the number of light-receiving portions of the photodetector 37 is smaller than that of the photodetector 36, so that a circuit for processing a signal also is decreased in size and becomes less expensive.

Furthermore, since diffracted light may not be generated from the regions 61a and 61d of the beam splitter, if a light beam is allowed simply to pass through the beam splitter without forming the regions 61a and 61d, the light amount of the beam 710 is increased accordingly. Therefore, a S/N ratio is enhanced at a time when information recorded on the optical recording medium 40 is read.

Embodiment 8

Figure 16:
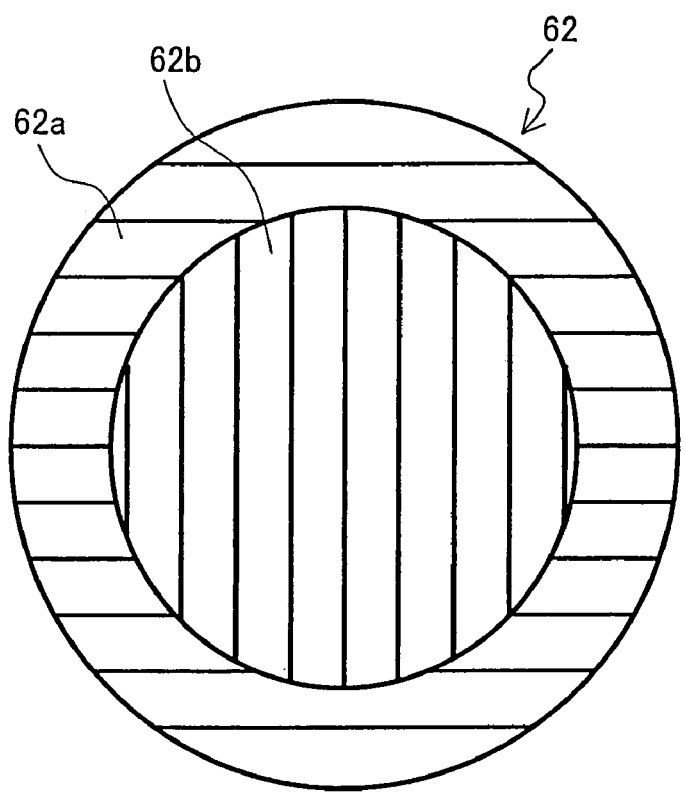
FIG. 16 shows a configuration of a beam splitter constituting the optical information apparatus of Embodiment 8 according to the present invention.

FIG. 16 schematically shows a configuration of a beam splitter 62, as an example of another optical information apparatus according to the present invention. By using the beam splitter 62 in place of the beam splitter 61 in Embodiment 6 and using a photodetector 38 in place of the photodetector 36, an optical information apparatus of Embodiment 8 can be configured. The beam splitter 62 has two kinds of regions 62a and 62b. The beam splitter 62 transmits a large part of the incident beam 70 to generate a 0th order diffracted light beam 710, and diffracts a part thereof to generate beams 73a to 73b from the regions 62a to 62b, respectively.

Figure 17:
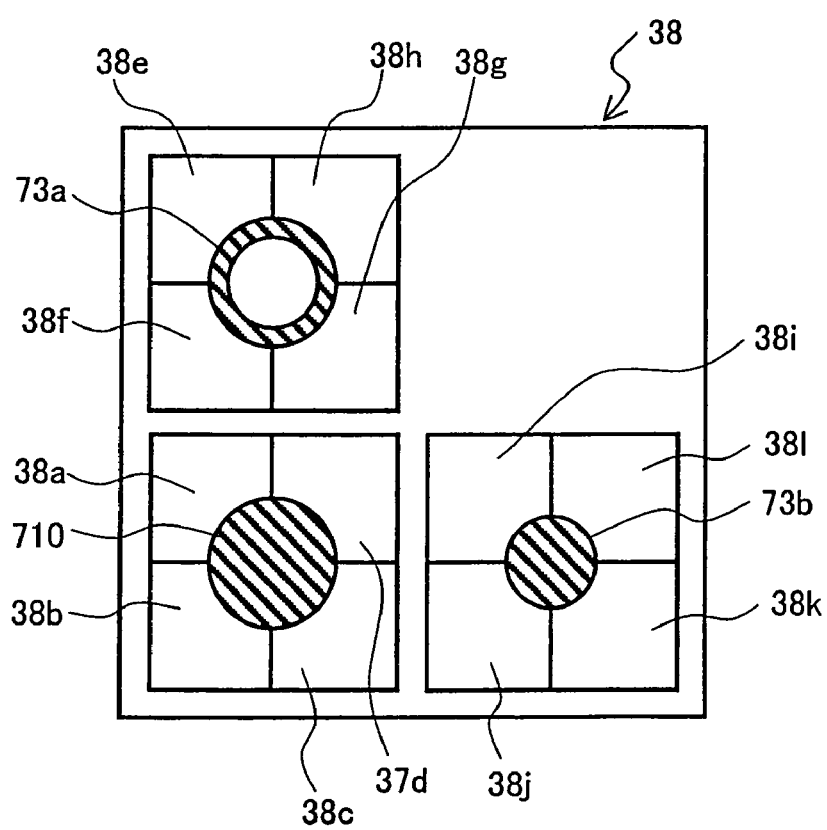
FIG. 17 shows a relationship between a beam and a photodetector constituting an optical pick-up head in the optical information apparatus of Embodiment 8 according to the present invention.

FIG. 17 schematically shows a relationship between the photodetector 38 and the beams 73a, 73b, and 710.

The photodetector 38 has 12 light-receiving portions 38a to 38l in total. The light-receiving portions 38a to 38d receive the beam 710. The light-receiving portions 38e to 38h receive the beam 73a. The light-receiving portions 38i to 38l receive the beam 73b. The light-receiving portions 38a to 38l output current signals I38a to I38l in accordance with the respectively received light amounts. AFE signal is obtained by an arithmetic operation (I38a+I38c)−(I38b+I38d).

A TE Signal is obtained by an arithmetic operation (I38e+I38h)−(I38f+I38g). The TE signal also may be obtained by an arithmetic operation $\{(I38e+I38h)-(I38f+I38g)\}-k\cdot\{(I38i+I38l)-(I38j+I38k)\}$. In the case where the beam splitter 62 is integrated with the objective lens 56, either of the arithmetic operations may be used. However, in the case where the beam splitter 62 is not integrated with the objective lens 56, the latter arithmetic operation preferably is used for the following reason. According to the latter arithmetic operation, in the case where an actuator is moved when a track is followed, an offset occurring in the TE signal becomes smaller compared with that according to the former arithmetic operation.

A spherical aberration error signal is obtained by an arithmetic operation $(I38e+I38g)-(I38f+I38h)\}-C2\cdot\{(I38i+I38k)-(I38j+I38l)\}$. In the optical information apparatus of Embodiment 8, the fluctuation in a TE signal amplitude can be reduced in the same way as in the optical information apparatus described in Embodiment 5. The quality of the spherical aberration error signal is more satisfactory than that in the optical information apparatus of Embodiment 5. Aspherical aberration can be corrected more precisely, and a mark with less jitter can be recorded on an optical recording medium. Thus, an optical information apparatus with high reliability can be provided.

Furthermore, it also may be possible that the beam splitter 62 is placed in an optical path leading from the polarized beam splitter 52 to the photodetector 38 without being integrated with the objective lens 56. In this case, it is not necessary that the beam splitter 62 has polarization dependency, and it may be of a non-polarization type. The beam splitter 62 can be produced by very inexpensive resin molding, so that an inexpensive optical information apparatus can be provided.

Embodiment 9

Figure 18:
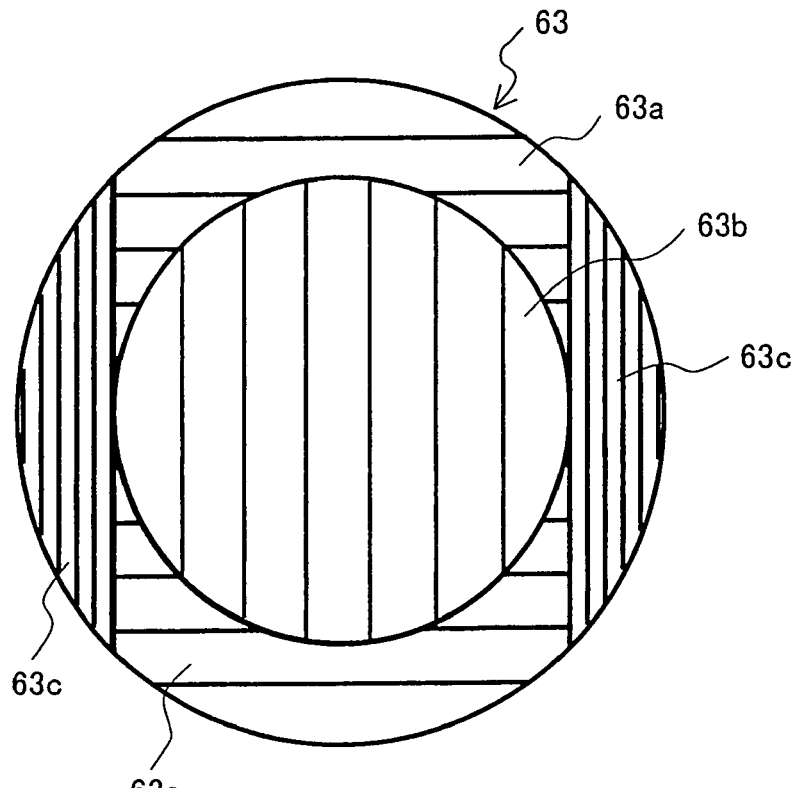
FIG. 18 shows a configuration of a beam splitter constituting an optical information apparatus of Embodiment 9 according to the present invention.

FIG. 18 schematically shows a configuration of a beam splitter 63, as an example of another optical information apparatus according to the present invention. By using the beam splitter 63 in place of the beam splitter 61 in Embodiment 6 and using the photodetector 39 in place of the photodetector 36, an optical information apparatus according to Embodiment 9 can be configured. The beam splitter 63 has three kinds of regions 63a to 63c. The beam splitter 63 transmits a large part of the incident beam 70 to generate a 0th order diffracted light beam 710, and diffracts a part thereof to generate beams 74a to 74c from the regions 63a to 63c, respectively.

Figure 19:
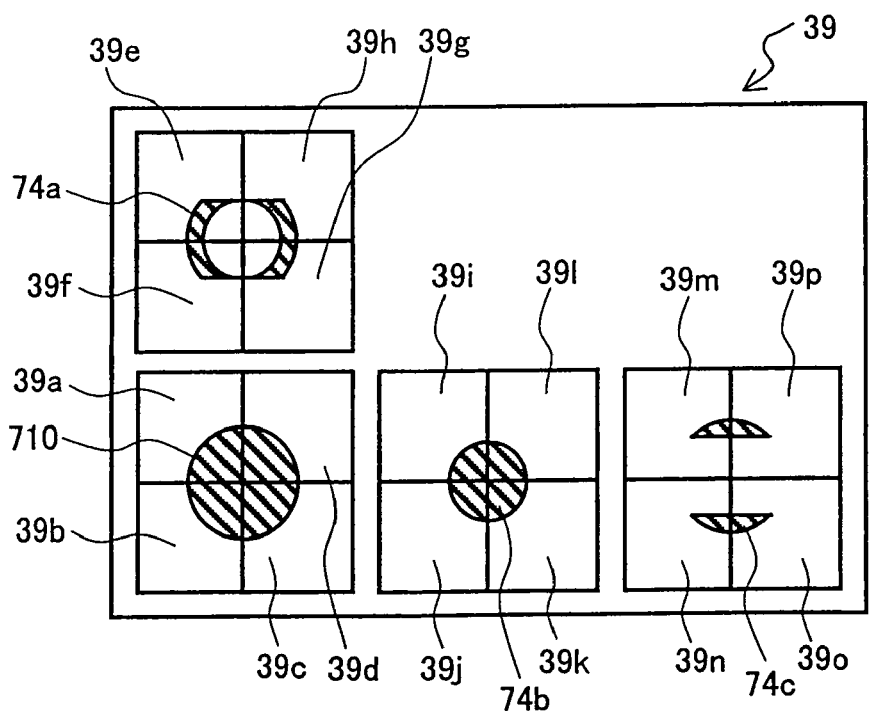
FIG. 19 shows a relationship between a beam and a photodetector constituting an optical pick-up head in the optical information apparatus of Embodiment 9 according to the present invention.

FIG. 19 schematically shows a relationship between the photodetector 39 and the beams 74a to 74c, and 710. The photodetector 39 has 16 light-receiving portions 39a to 39p in total. The light-receiving portions 39a to 39d receive the beam 710. The light-receiving portions 39e to 39h receive the beam 74a. The light-receiving portions 39i to 39l receive the beam 74b. The light-receiving portions 39m to 39p receive the beam 74c. The light-receiving portions 39a to 39p output current signals I39a to I39p in accordance with the respectively received light amounts. AFE signal is obtained by an arithmetic operation (I39a+I39c)−(I39b+I39d).

A TE signal is obtained by an arithmetic operation (I39m+I39p)−(I39n+I39o). The TE signal also may be obtained by an arithmetic operation $\{(I39m+I39p)-(I39n+I39o)\}-k\cdot\{(I39e+I39h)-(I39f+I39g)\}$. The TE signal also may be obtained by an arithmetic operation $\{(I39m+I39p)-(I39n+I39o)\}-k\cdot\{(I39i+I39l)-(I39j+I39k)\}$. The TE signal also may be obtained by an arithmetic operation $\{(I39m+I39p)-(I39n+I39o)\}-k\cdot\{(I39e+I39g+I39i+I39l)-(I39f+I39g+I39j+I39k)\}$. According to either of the arithmetic operations, the fluctuation in a TE signal amplitude can be reduced. In the case where the beam splitter 63 is integrated with the objective lens 56, either of the arithmetic operations may be used. However, in the case where the beam splitter 63 is not integrated with the objective lens 56, the second to fourth arithmetic operations preferably are used. According to the second to fourth arithmetic operations, in the case where an actuator is moved when a track is followed, an offset occurring in a TE signal is smaller than that according to the arithmetic operation. In the case of using either the first arithmetic operation or the fourth arithmetic operation, the same characteristics as those of the optical information apparatus of Embodiment 6 can be obtained. According to the second arithmetic operation, even in the case where defocusing occurs, an optical information apparatus can be provided, which has less off-track and has high reliability with respect to external disturbance such as defocusing and the like.

A spherical aberration error signal is obtained by an arithmetic operation $(I39i+I39k)-(I39j+I39l)\}-C2\cdot\{(I39e+I39g+I39m+I39o)-(I39f+I39h+I39n+I39p)\}$. Furthermore, the quality of the spherical aberration error signal in the present embodiment is more satisfactory than that of the optical information apparatus of Embodiment 5. A spherical aberration can be corrected more precisely, and a mark with less jitter can be recorded on an optical recording medium. Thus, an optical information apparatus with high reliability can be provided.

In the above-mentioned embodiments, the width of a beam in the vicinity of the center is set to be 0.7 times the diameter of the beam so as to suppress the fluctuation in a TE signal amplitude. The reason for this is that all the embodiments are put under the same condition so that ΔPP can be compared with the improvement of off-track. Thus, there is no particular limit to the width of the beam in the vicinity of the center, and it can be set freely. It also is appreciated that a beam is not necessarily split by a straight line.

The case where the fluctuation in a TE signal amplitude occurs due to a positional error during formation of a groove has been described. However, the fluctuation in a TE signal amplitude occurs similarly even in the case where there is an error in the width and depth of a groove, and even in the vicinity of a boundary between a track of an optical recording medium in which information is recorded and an unrecorded track. The present invention also is applicable to these cases.

Embodiment 10

Figure 20:
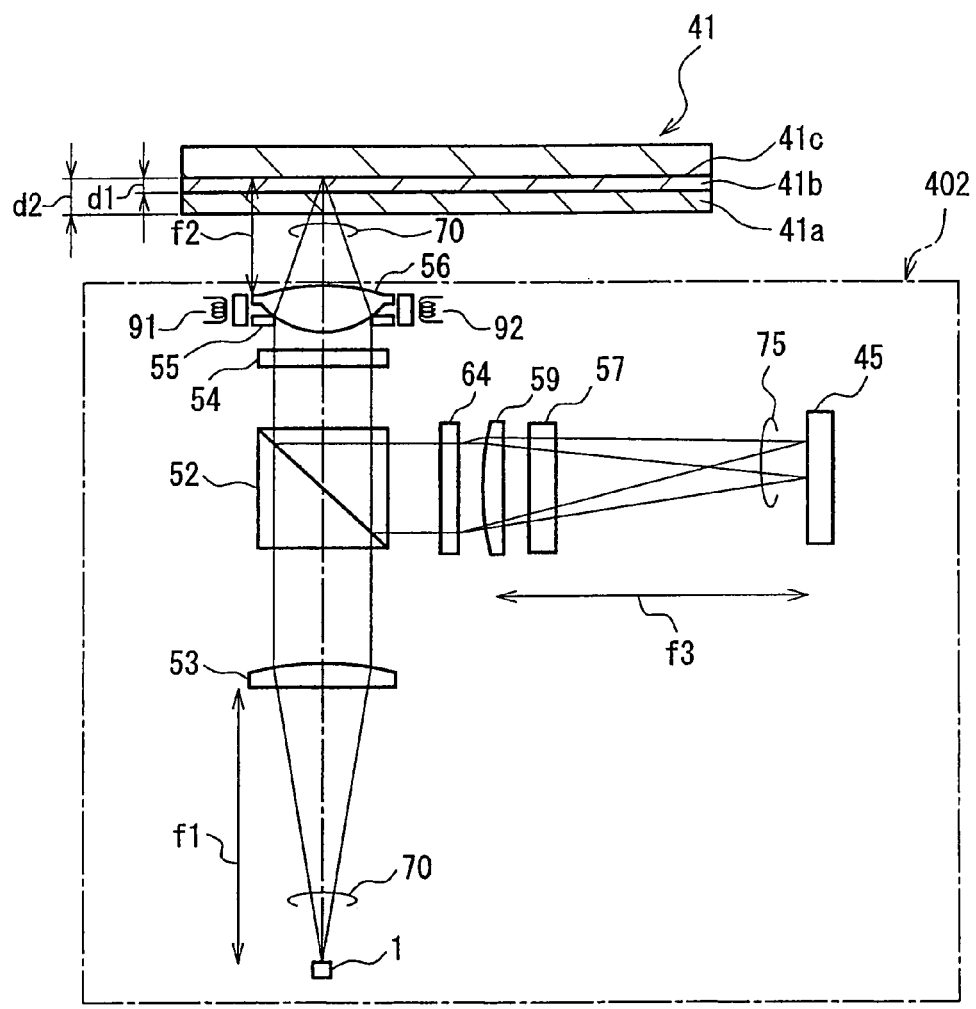
FIG. 20 shows a configuration of an optical pick-up head constituting an optical information apparatus of Embodiment 10 according to the present invention.

FIG. 20 shows an exemplary configuration of an optical pick-up head 402 according to the present invention, as an example of another optical information apparatus according to the present invention.

The optical pick-up head 402 of Embodiment 10 is different from the optical pick-up head 400 of Embodiment 5 in the following points: the diffraction grating 58 is not used; an optical recording medium 41 has two information recording layers 41b and 41c; and a beam splitter 64 is used in place of the beam splitter 60 and a photodetector 45 is used in place of the photodetector 35. Since the diffraction grating 58 is not used, one beam 70 output from the light source 1 is condensed onto the information recording surface of the optical recording medium 41.

The optical recording medium 41 has two information recording surfaces 41b and 41c. Herein, the beam 70 condensed by the objective lens 56 is shown as being focused on the information recording surface 41c. The optical recording medium 41 is composed of a transparent substrate 41a and information recording surfaces 41b and 41c. A distance d2 from the light incident surface of the optical recording medium 41 to the information recording surface 41c is 100 μm, and an interval d1 between the information recording surfaces 41b and 41c is 25 μm. Although not shown here, a pitch tp of tracks formed on the information recording surfaces 41b and 41c is 0.32 μm.

A wavelength λ of the light source 1 is 405 nm, and a numerical aperture of the objective lens is 0.85. The equivalent reflectance of the information recording surfaces 41b and 41c is about 4 to 8%. Herein, the equivalent reflectance refers to the light amount of a beam that is reflected from the information recording surface 41b or 41c and output from the optical recording medium 41, assuming that the light amount of a beam incident upon the optical recording medium 41 is 1. The information recording surface 41c absorbs or reflects a large part of the light amount of an incident beam, whereas the information recording surface 41b transmits about 50% of the light amount of an incident beam so as to allow the beam to reach the information recording surface 41c and absorbs or reflects the remaining 50% of the light amount.

The beam 70 reflected from the information recording surface 41c of the optical recording medium 41 passes through the objective lens 56, is reflected from the polarized beam splitter 52, and is incident upon the beam splitter 64. The beam splitter 64 generates a plurality of beams 75. The plurality of beams 75 generated by the beam splitter 64 pass through the cylindrical lens 57 to be provided with astigmatism, and are received by the photodetector 45.

Figure 21:
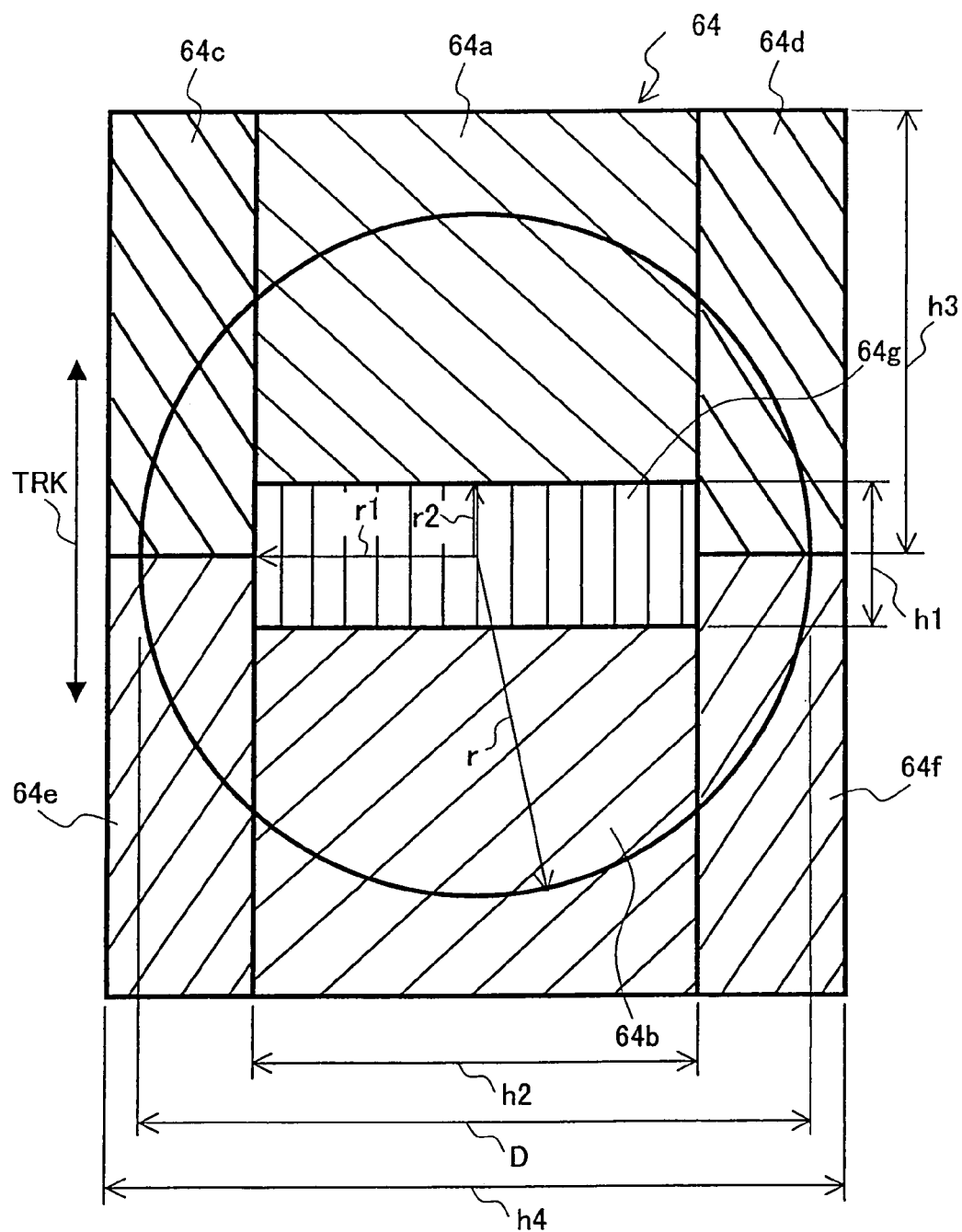
FIG. 21 shows a configuration of a beam splitter constituting the optical information apparatus of Embodiment 10 according to the present invention.
Figure 22:
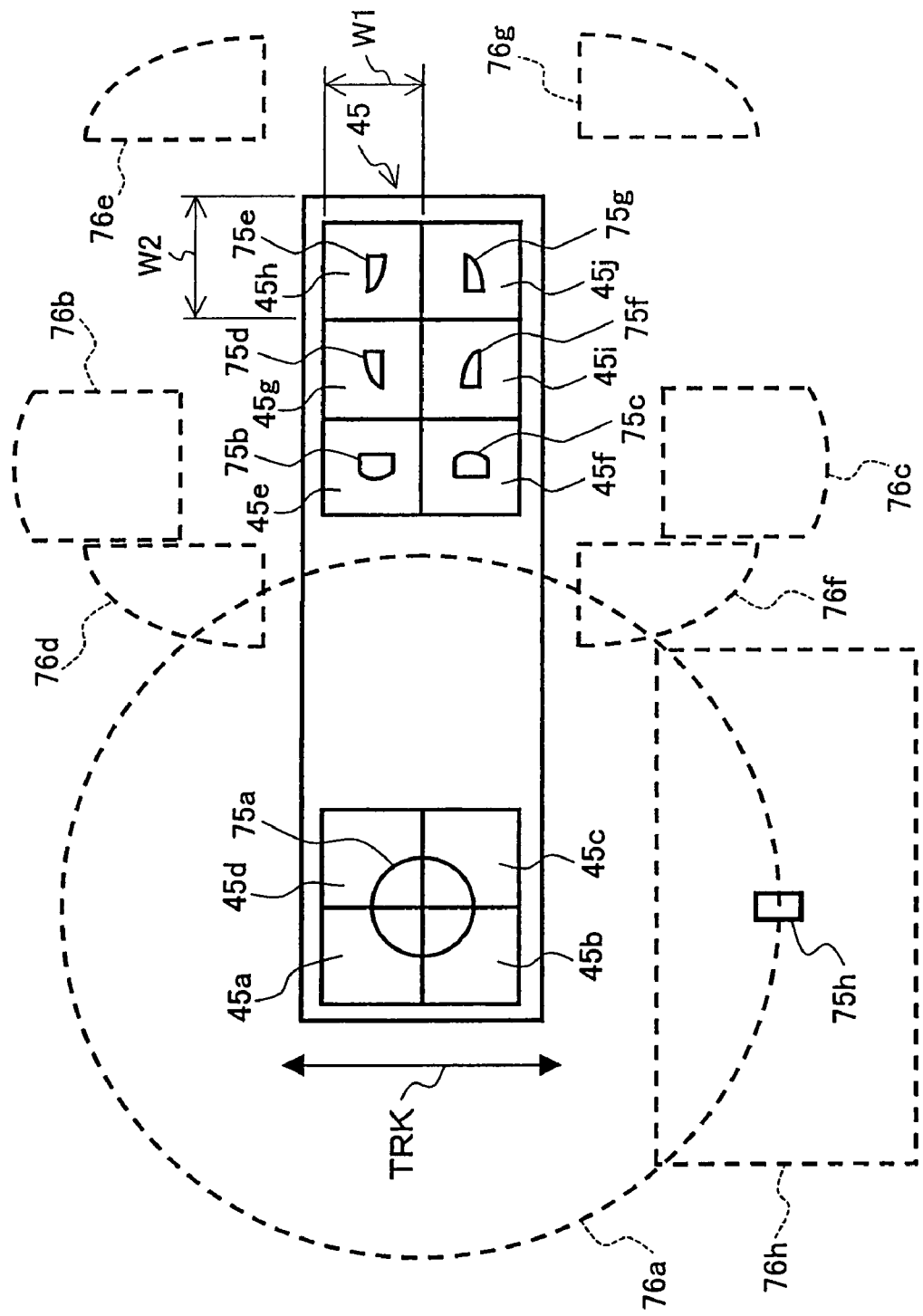
FIG. 22 shows a relationship between a beam and a photodetector constituting an optical pick-up head in the optical information apparatus of Embodiment 10 according to the present invention.

FIG. 21 schematically shows a configuration of the beam splitter 64, and FIG. 22 schematically shows a relationship between the photodetector 45 and the beam 75 received by the photodetector 45. The beam splitter 64 has 7 kinds of regions 64a to 64g in total. In the beam splitter 64, D denotes a diameter of the beam 70 incident upon the beam splitter 64 after being reflected from the polarized beam splitter 52, and generally is set to be about 2 to 4 mm. Herein, D is set to be 3 mm.

The beam 75 contains a 0th order diffracted light beam 75a and 7 1st order diffracted light beams 75b to 75h. The beam splitter 64 is a kind of a diffraction grating. Herein, the diffraction efficiency of the 0th order diffracted light is set to be 80%, and the diffraction efficiency of the 1st order diffracted light is set to be 8%. The reason for setting the diffraction efficiency of the 0th order diffracted light to be higher than that of the 1st order diffracted light is that information recorded on the information recording surfaces 41b and 41c of the optical recording medium 41 is read using 0th order diffracted light, and 1st order diffracted light is used only for generating a tracking error signal. As the diffraction efficiency of 0th order diffracted light is larger, a S/N ratio at a time when information recorded on the information recording surfaces 41b and 41c is read can be enhanced. Therefore, information can be reproduced faithfully.

The beam 75a is generated from the regions 64a to 64g. The beam 75b is generated from the region 64a. The beam 75c is generated from the region 64b. The beam 75d is generated from the region 64c. The beam 75e is generated from the region 64d. The beam 75f is generated from the region 64e. The beam 75g is generated from the region 64f. The beam 75h is generated from the region 64g. Patterns formed in the regions 64a to 64g are simple gratings in a linear shape with an equal pitch. The beam 70 is moved in a direction represented by an arrow TRK on the beam splitter 64 in accordance with tracking control.

By forming the regions 64a to 64f sufficiently larger than a radius r of the beam 70, a TE signal is prevented from decreasing during tracking control. Herein, a size h3 of the regions 64a to 64f in the direction represented by the arrow TRK is set to be larger than the radius r of the beam 70 by 500 μm. On the other hand, the size of the regions 64a to 64f in the direction orthogonal to the arrow TRK representing a track-following direction only needs to be a positional shift tolerance between the beam 70 and the beam splitter 64 in the course of assembly of an optical pick-up head. Therefore, this size generally may be 10 to 100 μm, and herein, a width h4 is set to be larger than the diameter D of the beam 70 by 100 μm. A width h1 is set to be 0.35 D, and a width h2 is set to be 0.6 D.

Referring to FIG. 22, the photodetector 45 has 10 light-receiving portions 45a to 45j in total. The light-receiving portions 45a to 45d are used for detecting a FE signal and a signal for reproducing information recorded on the optical recording medium 41, and the light-receiving portions 45e to 45j are used for detecting a TE signal. By forming the light-receiving portions 45a to 45d for detecting a FE signal and the light-receiving portions 45e to 45j for detecting a TE signal on the same semiconductor substrate, an optical pick-up head can be miniaturized, and the number of steps of assembling the optical pick-up head can be decreased.

The beam 75a is received by the four light-receiving portions 45a to 45d. The beam 75b is received by the light-receiving portion 45e. The beam 75c is received by the light-receiving portion 45f. The beam 75d is received by the light-receiving portion 45g. The beam 75e is received by the light-receiving portion 45h. The beam 75f is received by the light-receiving portion 45i. The beam 75g is received by the light-receiving portion 45j. The beam 75h is designed so as not to be received by any of the light-receiving portions. Because of this configuration, in the same way as in Embodiment 3 and the like, a fluctuation in a TE signal is reduced, which occurs when there is a variation in a position, a width, and a depth of a groove formed on an optical recording medium and when information is recorded in a track.

Furthermore, the above-mentioned configuration also has a function of preventing unnecessary light from being incident upon a light-receiving portion used for detecting a TE signal, in the case where an optical recording medium has a plurality of information recording surfaces. The light-receiving portions 45a to 45j output current signals I45a to I45j in accordance with the respectively received light amounts. AFE signal is obtained by an arithmetic operation (I45a+I45c)−(I45b+I45d). A method for detecting a TE signal will be described later.

The beams 75a to 75h are generated when the beam 70 reflected from the information recording surface 41c is incident upon the beam splitter 64. The optical recording medium 41 has two information recording surfaces 41b and 41c. Therefore, a beam reflected from the information recording surface 41b also is incident upon the beam splitter 64 after being reflected from the polarized beam splitter 52, whereby diffracted light is generated in the beam splitter 64. The beams 76a to 76h are diffracted light generated when the beam 70 reflected from the information recording surface 41b is incident upon the beam splitter 64. The beam 76a is generated from the regions 64a to 64g. The beam 76b is generated from the region 64a. The beam 76c is generated from the region 64b. The beam 76d is generated from the region 64c. The beam 76e is generated from the region 64d. The beam 76f is generated from the region 64e. The beam 76g is generated from the region 64f. The beam 76h is generated from the region 64g.

The beam 70 is focused on the information recording surface 41c, so that the beam 70 is defocused largely on the information recording surface 41b. Therefore, the beams 76a to 76h also are defocused largely on the photodetector 45. Herein, the beams 76a to 76h are prevented from being incident upon the light-receiving potions 45e to 45j. The reason for this is as follows: when the beams 76a to 76h are incident upon the light-receiving portions 45e to 45j, a TE signal is disturbed in accordance with the incident degree; consequently, stable tracking control cannot be performed. Herein, by forming the light-receiving portions 45e to 45j at a position away from the radius of the beam 76a, the beam 76a is prevented from being incident upon the light-receiving portions 45e to 45j.

Furthermore, the light-receiving portions 45e to 45j are formed dose to each other so as to receive the beams 75b to 75g. Furthermore, a region 64g is provided at the center of the beam splitter 64 shown in FIG. 21, and the beam 75h generated from the region 64g is not used for generating a TE signal. Because of this arrangement, the beams 76b to 76g are positioned outside of the light-receiving portions 45e to 45j, i.e., the beams 76b to 76g are not incident upon the light-receiving portions 45e to 45j. Furthermore, the beam 75h is diffracted in a direction orthogonal to the beams 75b to 75g. Because of this, the light-receiving portions 45e to 45j are formed at positions where the beam 76a is not incident, whereby the beam 76h is not incident upon the light-receiving portions 45e to 45j without fail.

Furthermore, the beam 76a is moved in the direction represented by the arrow TRK in accordance with tracking control. By forming the light-receiving portions 45e to 45j in a direction orthogonal to the direction represented by the arrow TRK, the beam 76a is prevented from being incident upon the light-receiving portions 45e to 45j by tracking control, and the light-receiving portions 45e to 45j can be formed dose to the light-receiving portions 45a to 45d. Because of this, the photodetector is decreased in size, and an inexpensive optical pick-up head can be provided.

As the condition for preventing the beams 76b to 76g from being incident upon the light-receiving portions 45e to 45j, a width W1 of the light-receiving portions 45e to 45j only needs to be 2·h1/D·d1/n2·α·NA or less. Similarly, a width W2 of the light-receiving portions 45e to 45j only needs to be 2·h2/D·d1/n2·α·NA or less, where d1 is an interval between the information recording surfaces 41b and 41c; n2 is a refractive index of a medium present between the information recording surfaces 41b and 41c of the optical recording medium 41; α is a lateral magnification of an optical system from the optical recording medium 41 to the photodetector 45; D is a diameter of the beam 70 on the beam splitter 64; h1 and h2 are widths of the region 64g of the beam splitter 64; and NA is a numerical aperture of the objective lens 56. Herein, the lateral magnification α is about f3/f2. The widths h1 and h2 of the region 64g of the beam splitter 64 and the widths W1 and W2 of the light-receiving portions 45e to 45j are set so as to satisfy the above condition. It is appropriate that the lateral magnification of the optical system is about 4 to 40 times.

Herein, the case where the optical recording medium 41 has two information recording surfaces has been described. However, the present invention similarly is applicable to the case where the optical recording medium has three or more information recording surfaces. In general, an antireflection film is not formed on a light incident surface (hereinafter, briefly referred to as a "surface") of an optical recording medium. Therefore, a beam travels to a photodetector after being reflected from the surface of the optical recording medium. The beam reflected from the surface of the optical recording medium may cause tracking control to be unstable. Therefore, it is desirable that this beam is not incident upon the light-receiving portions 45e to 45j. It also is possible that the beam reflected from the surface of the optical recording medium is prevented from being incident upon the light-receiving portions 45e to 45j by the above-mentioned design method. More specifically, by setting an interval d between a desired information recording surface and another surface for reflecting a beam such as the surface of the optical recording medium, instead of setting the interval d1 between the information recording surfaces 41b and 41c, the beam reflected from the surface of the optical recording medium is allowed to be incident upon an arbitrary surface.

Figure 23:
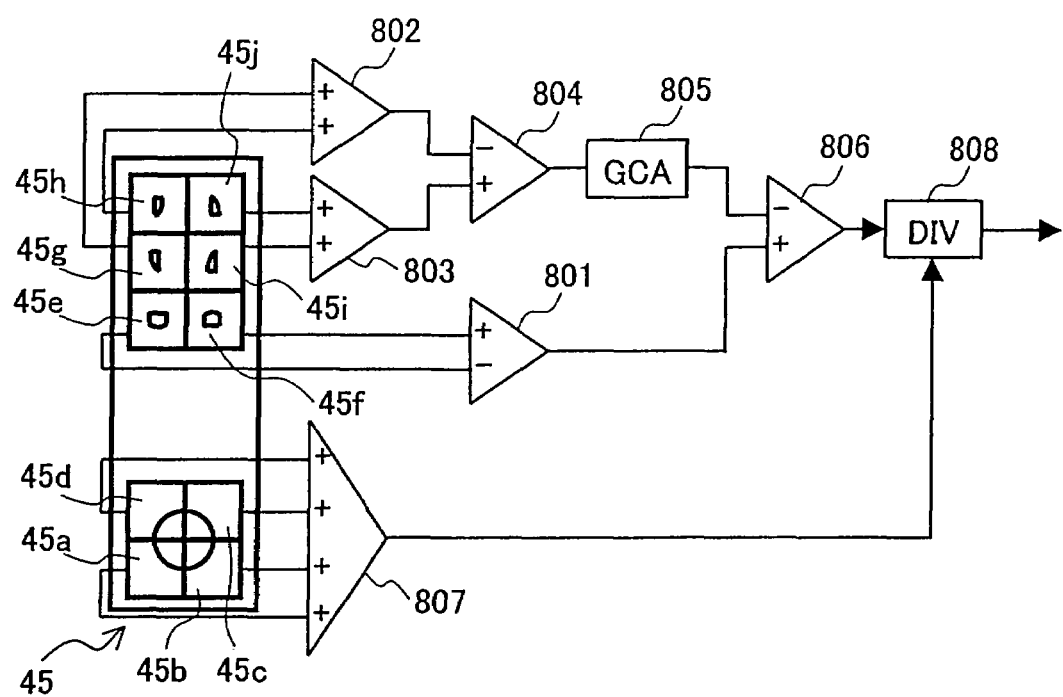
FIG. 23 shows a configuration of a signal processing part constituting the optical information apparatus of Embodiment 10 according to the present invention.

FIG. 23 shows a configuration of a signal processing portion for generating a TE signal. Signals I45e and I45f output from the light-receiving portions 45e and 45f are subjected to a differential arithmetic operation in a differential arithmetic operation portion 801. A signal (I45f-I45e) obtained by a differential arithmetic operation is a TE signal according a so-called push-pull method.

The beam splitter 64 is not integrated with the objective lens 56. Therefore, when the objective lens 56 is subjected to track-following in accordance with the eccentricity of the optical recording medium 41, an offset fluctuation is caused in a TE signal in accordance with track-following. In the signal processing portion shown in FIG. 23, signals I45g and I45h output from the light-receiving portions 45g and 45h are added to each other in an adder 802, and signals I45i and I45j output from the light-receiving portions 45i and 45j are added to each other in an adder 803. The signals output from the adders 802 and 803 are subjected to a differential arithmetic operation in the differential arithmetic operation portion 804. The signal output from the differential arithmetic operation portion 804 is input to a variable gain amplifier 805, and is amplified or attenuated to a desired signal intensity. Herein, the signal output from the differential arithmetic operation 804 is provided with an amplification degree of about 2.5. The signal output from the variable gain amplifier 805 has the same fluctuation as an offset fluctuation of the signal output from the differential arithmetic operation portion 801. The offset fluctuation occurs when a tracking operation, an access operation, or the like is performed with respect to an optical recording medium having eccentricity.

The differential arithmetic operation portion 806 receives the signal output from the differential arithmetic operation portion 801 and the signal output from the variable gain amplifier 805 and subjects them to a differential arithmetic operation, whereby the above-mentioned offset fluctuation of the signal output from the differential arithmetic operation portion 801 is reduced. The signal output from the differential arithmetic operation portion 806 is a TE signal having substantially no offset fluctuation even if a track is followed. However, if the signal output from the differential arithmetic operation portion 806 is used as it is, the signal intensity is changed in accordance with the reflectance of the information recording surfaces 41*b* and 41*c* of the optical recording medium 41 and the change in an intensity of a beam radiated to the optical recording medium 41. Therefore, the signal is input to a divider 808 so as to have a constant amplitude.

The signals I45*a* to I45*d* output from the light-receiving portions 45*a* to 45*d* are added to each other in the adder 807, and input to the divider 808 as a signal to be divided. The signal output from the adder 807 is proportional to the reflectance of the information recording surfaces 41*b* and 41*c* of the optical information medium 41 and the intensity of a beam radiated to the optical recording medium 41. The signal output from the divider 808 is a TE signal having a desired intensity.

In an optical information apparatus using the optical pick-up head and the signal processing portion according to Embodiment 10, even in the case where an optical recording medium has a plurality of information recording surfaces, a stable tracking operation is possible. Thus, the optical information apparatus is highly reliable. Furthermore, the beams 75*d* to 75*g* are received by the light-receiving portions 45*g* to 45*j*. Therefore, by comparing the intensities of the signals output from the light-receiving portions 45*g* to 45*j*, the set position of the beam splitter 64 with respect to the beam 70 can be recognized easily. Therefore, the beam splitter 64 easily can be set with respect to the beam 70 with good precision, whereby the productivity of an optical pick-up head can be enhanced.

Similarly to the optical pick-up head in Embodiment 6, it may be possible that the beam splitter 64 is composed of a polarization-dependent element and integrated with the objective lens 56. In this case, the position of the beam 70 on the beam splitter 64 is always constant. Therefore, even if the width h1 of the region 64*g* is increased, the amplitude of a TE signal is not decreased. Because of this, the beams 76*d* to 76*g* are unlikely to be incident upon the light-receiving portions 45*e* to 45*j* accordingly.

Embodiment 11

Figure 24:
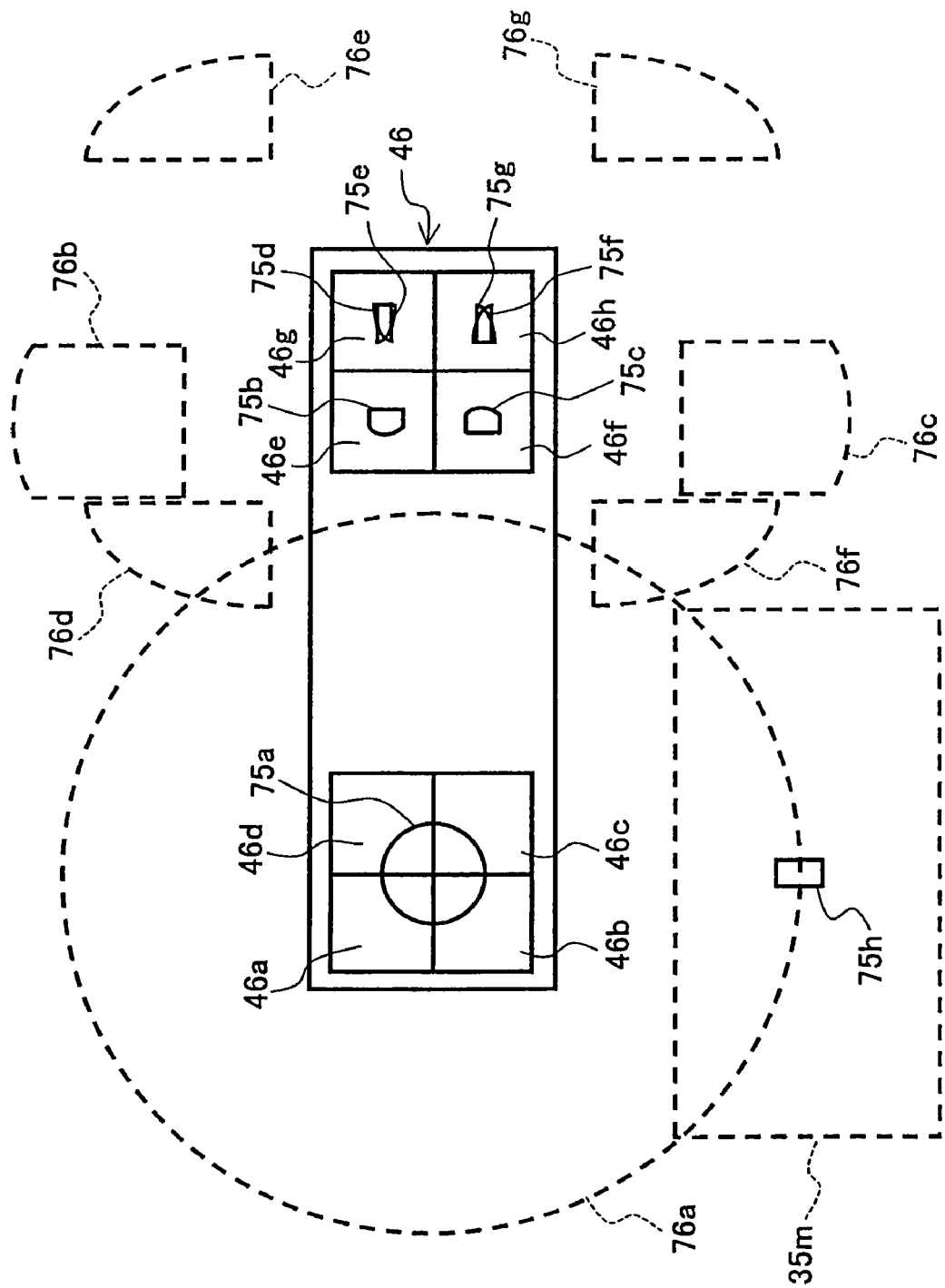
FIG. 24 shows a relationship between a beam and a photodetector constituting an optical pick-up head in the optical information apparatus of Embodiment 11 according to the present invention.

FIG. 24 schematically shows an exemplary relationship between a photodetector 46 constituting the optical pick-up head of the present invention and the beams 75*a* to 75*h* and 76*a* to 76*h*, as an example of another optical information apparatus according to the present invention. By using the photodetector 46 in place of the photodetector 45 in the optical pick-up head 402 in Embodiment 10, and slightly changing the patterns to be formed in the regions 64*d* and 64*f* of the beam splitter 64, an optical pick-up head in Embodiment 11 can be configured.

In the optical pick-up head in the present embodiment, the beams 75*d* and 75*e* are received by one light-receiving portion 46*g*, and the beams 75*f* and 75*g* are received by one light-receiving portion 46*h*. Furthermore, the beams 75*d* and 75*e* are overlapped with each other on the light-receiving portion 46*g*, and the beams 75*f* and 75*g* are overlapped with each other on the light-receiving portion 46*h*, whereby the light-receiving portions 46*g* and 46*h* are prevented from becoming large. Therefore, the photodetector 46 can be prescribed to be smaller than that of the photodetector 45 described with reference to FIG. 22, and the photodetector 46 is less expensive than the photodetector 45. The areas occupied by the light-receiving portions 46*e* to 46*h* are smaller than those occupied by the light-receiving portions 45*e* to 45*j*. Accordingly, the beams 76*a* to 76*h* reflected from the information recording surface 41*b* are unlikely to be incident upon the light-receiving portions 46*e* to 46*h*, a fluctuation in a TE signal can be reduced further than the case of using the optical pick-up head apparatus in Embodiment 10, and tracking control can be performed more stably. This also applies to the beam reflected from the surface of the optical recording medium 41.

In order to receive the beams 75*d* and 75*e* by one light-receiving portion 46*g*, and receive the beams 75*f* and 75*g* by one light-receiving portion 46*h*, the pitches of patterns formed in the regions 64*d* and 64*f* of the beam splitter 64 shown in FIG. 21 and the spatial frequency axis are changed slightly. The patterns formed in the regions 64*d* and 64*f* are simple gratings in a straight line shape with an equal pitch. The light-receiving portions 46*a* to 46*d* are the same as those of the light-receiving portions 45*a* to 45*d*.

Furthermore, the adders 802 and 803 are not required, so that an optical information apparatus can be less expensive accordingly. Even if the light-receiving portions 64*g* to 46*h* are placed so that the beams 76*a* to 76*h* are not optically incident upon the light-receiving portions 64*g* to 46*h*, unintended stray light may be incident upon the light-receiving portions 46*g* to 46*h*. However, the areas of the light-receiving portions 46*g* to 46*h* are smaller than those of the light-receiving portions 45*e* to 45*j*, so that the light amount of unintended stray light is decreased relatively, and more stable tracking control can be performed.

Embodiment 12

Figure 25:
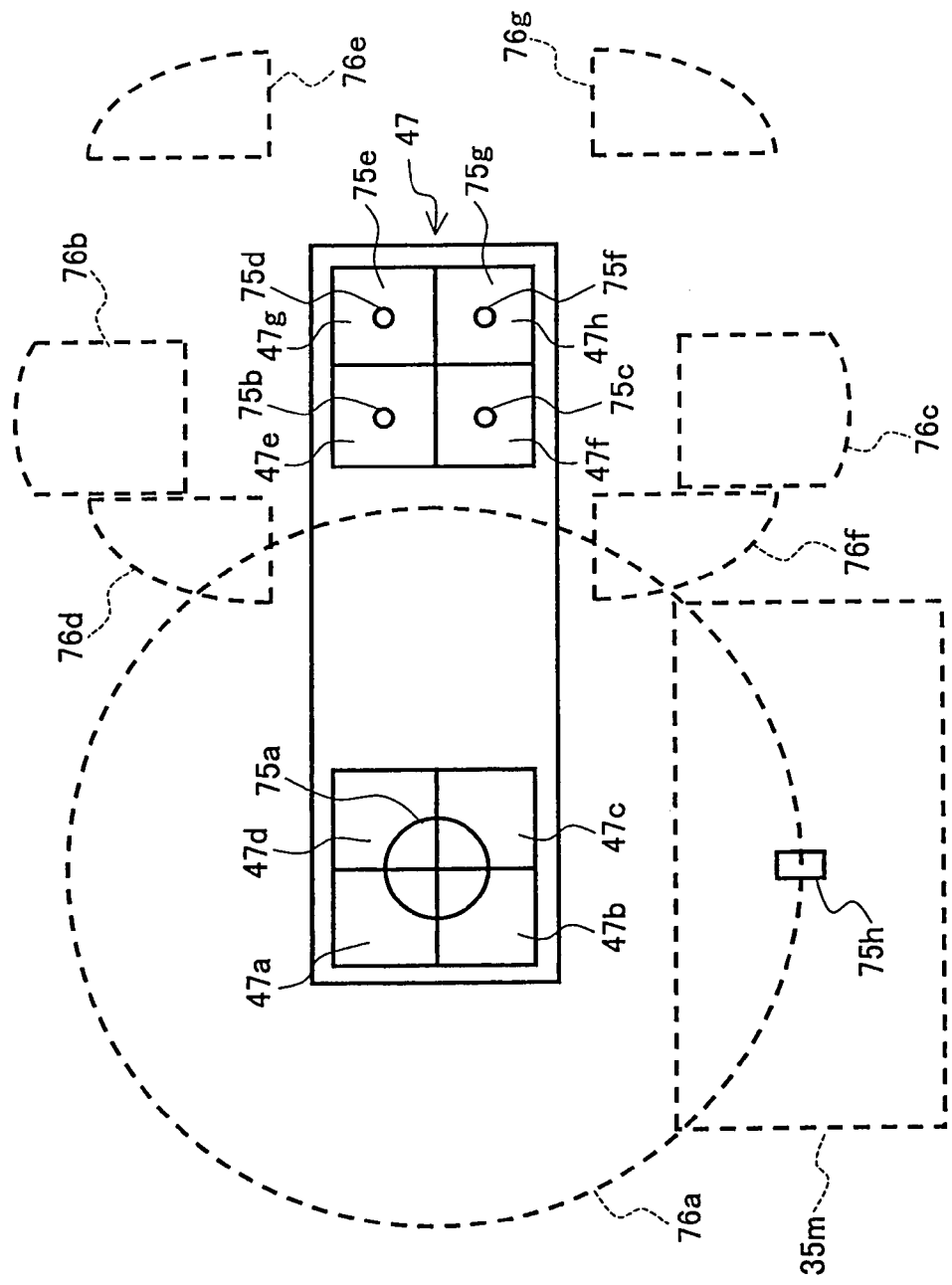
FIG. 25 shows a relationship between a beam and a photodetector constituting an optical pick-up head in the optical information apparatus of Embodiment 12 according to the present invention.

FIG. 25 schematically shows an exemplary relationship between a photodetector 47 constituting an optical pick-up head and the beams 75*a* to 75*h* and 76*a* to 76*h*, as an example of another optical information apparatus according to the present invention. By using the photodetector 47 in place of the photodetector 45 in the optical pick-up head 402 in Embodiment 10 and slightly changing the patterns to be formed in the regions 64*a* to 64*f* of the beam splitter 64, an optical pick-up head in Embodiment 12 can be configured.

In the optical pick-up head in the present embodiment, similarly to the optical pick-up head in Embodiment 11, the beams 75*d* and 75*e* are received by one light-receiving portion 47*g*, and the beams 75*f* and 75*g* are received by one light-receiving portion 47*h*. Furthermore, the beams 75*d* and 75*e* are overlapped with each other on the light-receiving portion 47g, and the beams 75f and 75g are overlapped with each other on the light-receiving portion 47h.

Furthermore, the patterns formed in the regions 64a to 64f of the beam splitter 64 shown in FIG. 21 are provided with a power so that the astigmatism provided to the beams 75b to 75g when they pass through the cylindrical lens 57 is cancelled and these beams are focused on the photodetector 47. Thus, the beams 75b to 75h on the photodetector 47 are smaller than the beams 75b to 75h on the photodetector 46, and the light-receiving portions 47e to 47h can be decreased in size compared with the light-receiving portions 46e to 46h accordingly. As a result, the photodetector 47 becomes less expensive than the photodetector 46.

Furthermore, the areas occupied by the light-receiving portions 47e to 47h are smaller than those occupied by the light-receiving portions 46e to 46j. Therefore, the beams 76a to 76h reflected from the information recording surface 41b are unlikely to be incident upon the light-receiving portions 47e to 47h accordingly, and more stable tracking control can be performed. This also applies to the beam reflected from the surface of the optical recording medium 41. The light-receiving portions 47a to 47d are the same as those of the light-receiving portions 46a to 46d. Furthermore, even if the light-receiving portions 47e to 47h are placed so that the beams 76a to 76h are not optically incident upon the light-receiving portions 47e to 47h, unintended stray light may be incident upon the light-receiving portions 47e to 47h. However, the light amount of unintended stray light is decreased, relative to the decreased areas of the light-receiving portions 47e to 47h, a fluctuation in a TE signal can be reduced further than the case of using the optical pick-up head apparatus in Embodiment 11, and more stable tracking control can be performed.

Embodiment 13

Figure 26:
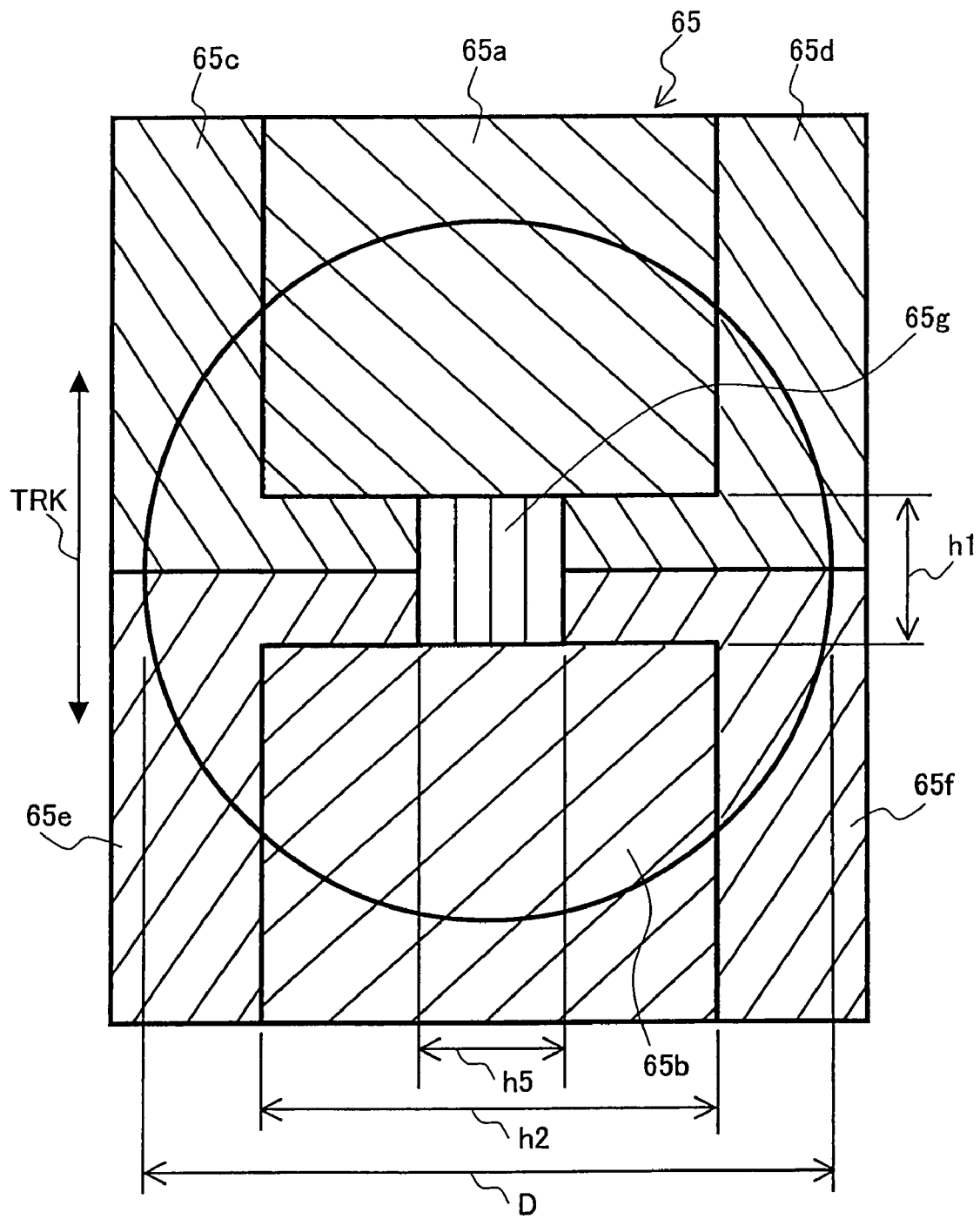
FIG. 26 shows a configuration of a beam splitter constituting the optical information apparatus of Embodiment 13 according to the present invention.

FIG. 26 schematically shows a beam splitter 65 constituting an optical pick-up head, as an example of another optical information apparatus of the present invention. By using the beam splitter 65 in place of the beam splitter 64 in the optical pick-up head 402 shown in FIG. 21 in Embodiment 10, an optical pick-up head in Embodiment 13 can be configured.

Regions 65a to 65g of the beam splitter 65 correspond to the regions 64a to 64g of the beam splitter 64, and generate 1st order diffracted light. The beam splitter 65 is different from the beam splitter 64 in that a width h5 of the region 65g corresponding to the region 64g is smaller, and the regions 65c to 65f are larger accordingly.

By setting the regions 65c to 65f to be larger than the regions 64c to 64f shown in FIG. 21, the light amount of the beams 75d to 75g received by the light-receiving portions 45g to 45j shown in FIG. 22 is increased, and the amplification degree of the variable gain amplifier 805 can be decreased accordingly. Herein, by setting a width h5 to be 0.35 D, the amplification degree of the variable gain amplifier 805 can be decreased to about 2.3 times. Since the amplification degree of the variable gain amplifier 805 can be decreased, in a signal input to the variable gain amplifier 805, the electrical influence of an offset that may be added to a signal generated and output from the adders 802, 803, etc. can be decreased.

Furthermore, even if the light-receiving portions 45g to 45j are placed so that the beams 76a to 76g are not optically incident upon the light-receiving portions 45g to 45j, unintended stray light may be incident upon the light-receiving portions 45g to 45j. However, when the light amount of the beams 75d to 75g received by the light-receiving portions 45g to 45j is increased, the light amount of unintended stray light is decreased relatively, so that more stable tracking control can be performed.

Furthermore, even in the case of using the beam splitter in the present embodiment, a fluctuation in a TE signal is reduced, which occurs when there is a variation in a position, a width, and a depth of a groove formed on an optical recording medium and when information is recorded in a track. Furthermore, unnecessary light is prevented from being incident upon a light-receiving portion used for detecting a TE signal to fluctuate the TE signal, in the case where an optical recording medium has a plurality of information recording surfaces.

Embodiment 14

Figure 27:
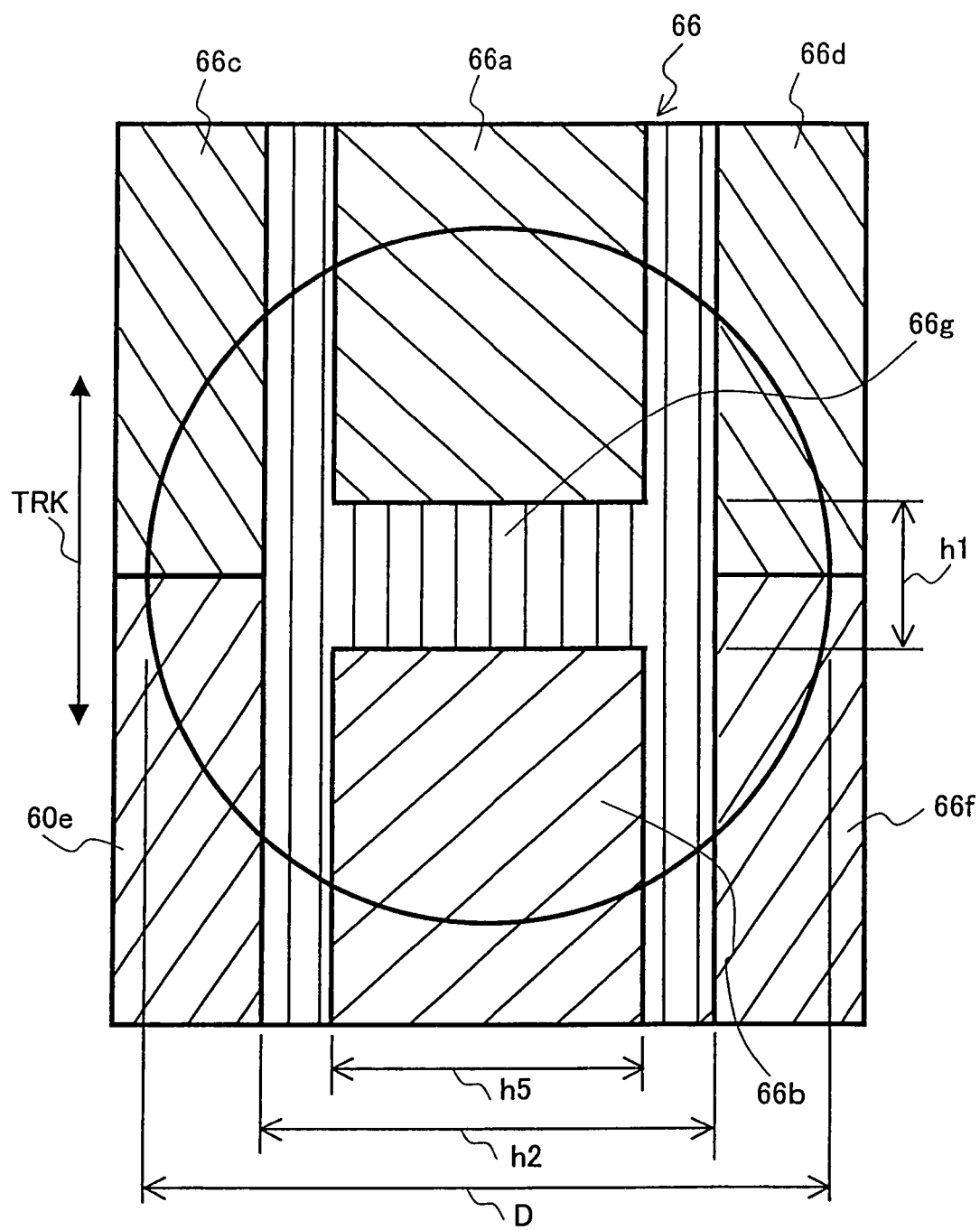
FIG. 27 shows a configuration of a beam splitter constituting the optical information apparatus of Embodiment 14 according to the present invention.

FIG. 27 schematically shows a beam splitter 66 constituting an optical pick-up head, as an example of another optical information apparatus of the present invention. By using the beam splitter 66 in place of the beam splitter 64 in the optical pick-up head 402 in Embodiment 10, an optical pick-up head in Embodiment 14 can be configured.

Regions 66a to 66g of the beam splitter 66 correspond to the regions 64a to 64g of the beam splitter 64 described with reference to FIG. 21, and generate 1st order diffracted light. The beam splitter 66 is different from the beam splitter 64 in that a width of the region 66g corresponding to the region 64g is larger, and the regions 66a and 66b are smaller accordingly.

By setting the regions 66a and 66b to be smaller than the regions 64a and 64b, the light amount of the beams 75b and 75c received by the light-receiving portions 45e to 45b is decreased, and the amplification degree of the variable gain amplifier 805 described with reference to FIG. 23 can be decreased accordingly. Herein, by setting the width h2 to be 0.35 D and the width h5 to be 0.65 D, the amplification degree of the variable gain amplifier 805 can be decreased to about 1.4 times. Since the amplification degree of the variable gain amplifier 805 can be decreased, in a signal input to the variable gain amplifier 805, the electrical influence of an offset that may be added to a signal generated and output from the adders 802, 803, etc. can be reduced.

Furthermore, even in the case of using the beam splitter in the present embodiment, a fluctuation in a TE signal is reduced, which occurs when there is a variation in a position, a width, and a depth of a groove formed on an optical recording medium and when information is recorded in a track. Furthermore, unnecessary light is prevented from being incident upon a light-receiving portion used for detecting a TE signal to fluctuate the TE signal, in the case where an optical recording medium has a plurality of information recording surfaces.

Furthermore, by setting the width h2 to be 0.3 D to 0.5 D, the fluctuation in a TE signal amplitude can be minimized, which occurs when information is recorded in some tracks on the information recording surface of the optical recording medium 41 while information is not recorded in the other tracks, and an optical information apparatus capable of recording information stably can be provided.

Embodiment 15

Figure 28:
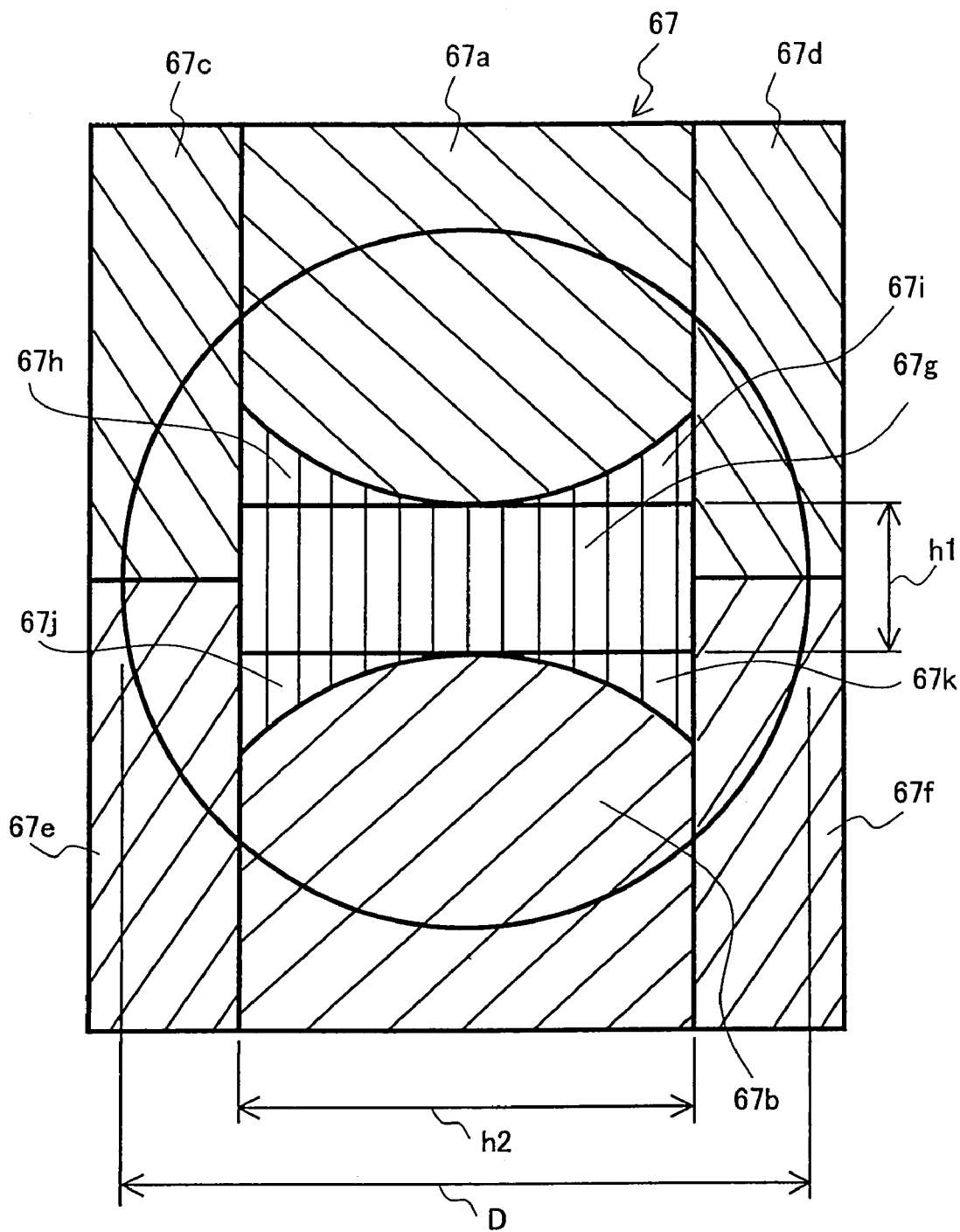
FIG. 28 shows a configuration of a beam splitter constituting the optical information apparatus of Embodiment 15 according to the present invention.

FIG. 28 schematically shows a beam splitter 67 constituting an optical pick-up head, as an example of another optical information apparatus of the present invention. By using the beam splitter 67 in place of the beam splitter 64 in the optical pick-up head 402 in Embodiment 10 described with reference to FIG. 21, the optical pick-up head apparatus in Embodiment 15 can be configured.

Regions 67a to 67g of the beam splitter 67 correspond to the regions 64a to 64g of the beam splitter 64, and generate 1st order diffracted light. The beam splitter 67 is different from the beam splitter 64 in that the regions 67h to 67k are provided in a part of the regions 67a and 67b, whereby the regions 67a and 67b are set to be smaller accordingly.

In the regions 67h to 67k, the same pattern as that of the region 67g is recorded. More specifically, the beams generated from the regions 67h to 67k are prevented from being received by the light-receiving portions 45e to 45j. By setting the regions 67a and 67b to be smaller, the beams 76b and 76c generated from the regions 67a and 67b become unlikely to be incident upon the light-receiving portions 45e to 45j. In particular, this is effective when the beam generated from the beam splitter 67 passes through the cylindrical lens 56 described with reference to FIG. 20.

Furthermore, by providing the regions 67h to 67k, the fluctuation of an offset in accordance with track-following contained in the beams 76b and 75c generated from the regions 67a and 67b is reduced. Accordingly, the amplification degree of the variable gain amplifier 805 shown in FIG. 23 can be decreased. Since the amplification degree of the variable gain amplifier 805 can be decreased, in a signal input to the variable gain amplifier 805, the electrical influence of an offset that may be added to a signal generated and output from the adders 802, 803, etc. can be decreased. Furthermore, even if the regions 67h to 67k are provided, the amplitude of a TE signal is not decreased.

Furthermore, even in the case of using the beam splitter in the present embodiment, a fluctuation in a TE signal is reduced, which occurs when there is a variation in a position, a width, and a depth of a groove formed on an optical recording medium and when information is recorded in a track. Furthermore, unnecessary light is prevented from being incident upon a light-receiving portion used for detecting a TE signal to fluctuate the TE signal, in the case where an optical recording medium has a plurality of information recording surfaces.

Embodiment 16

Figure 29:
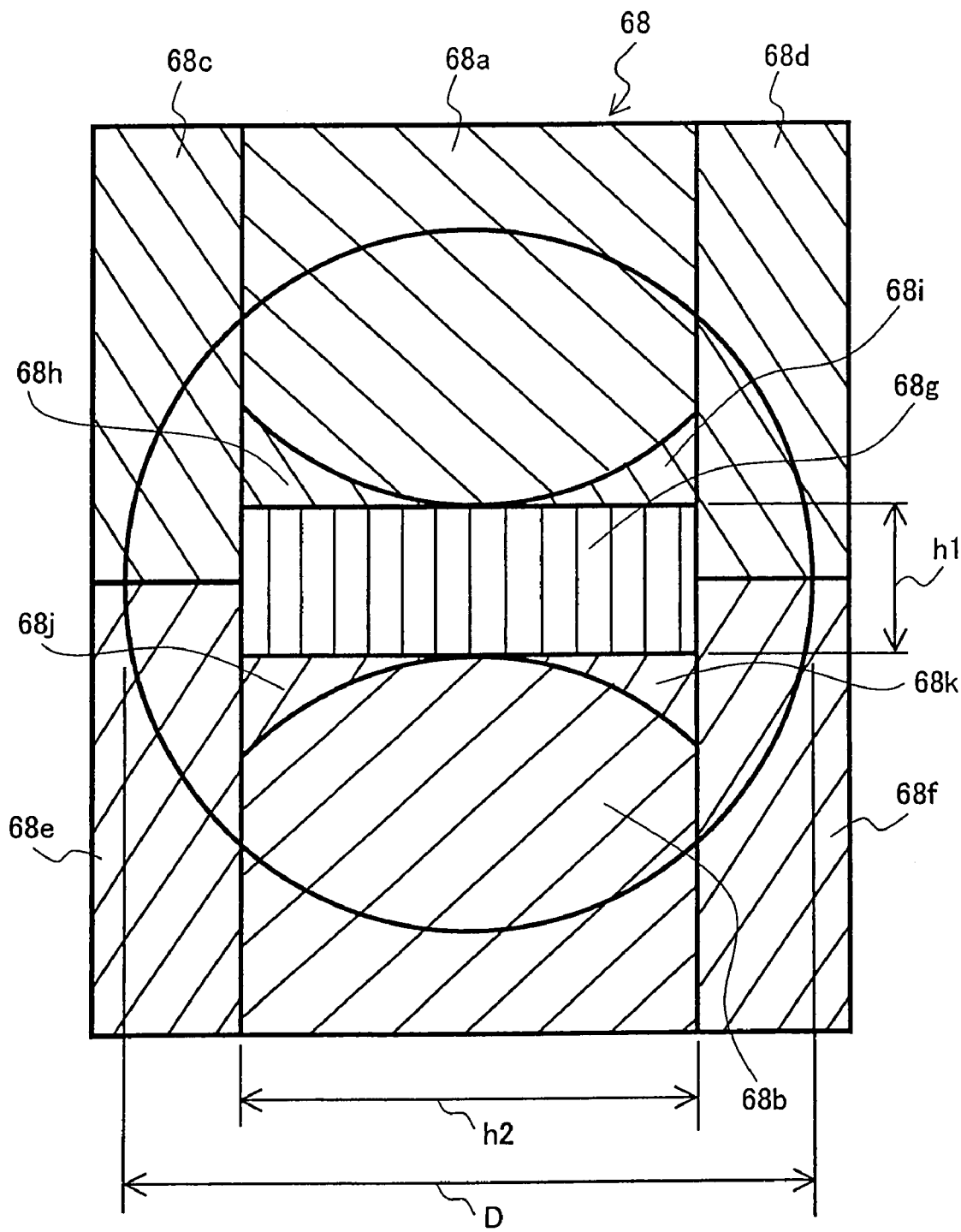
FIG. 29 shows a configuration of a beam splitter constituting the optical information apparatus of Embodiment 16 according to the present invention.

FIG. 29 schematically shows a beam splitter 68 constituting an optical pick-up head, as an example of another optical information apparatus of the present invention. By using the beam splitter 68 in place of the beam splitter 67 in Embodiment 15, an optical pick-up head in Embodiment 16 can be configured.

Regions 68a to 68k of the beam splitter 68 correspond to the regions 67a to 67k of the beam splitter 67, and generate 1st order diffracted light. The beam splitter 67 is different from the beam splitter 68 in that the patterns formed in the regions 68h to 68k are different from those formed in the regions 67h to 67k.

In the region 68h, the same pattern as that of the region 68c is recorded. In the region 68i, the same pattern as that of the region 68d is recorded. In the region 68j, the same pattern as that of the region 68e is recorded. In the region 68k, the same pattern as that of the region 68f is recorded. Therefore, the light amount of the beams 75d to 75g is increased, and the amplification degree of the variable gain amplifier 805 shown in FIG. 23 can be decreased. Since the amplification degree of the variable gain amplifier 805 can be decreased, in a signal input to the variable gain amplifier 805, the electrical influence of an offset that may be added to a signal generated and output from the adders 802, 803, etc. can be decreased. Furthermore, since the light amount of the beams 75d to 75g received by the light-receiving portions 45g to 45j is increased, the light amount of unintended stray light is decreased relatively, and more stable tracking control can be performed.

Furthermore, even in the case of using the beam splitter in the present embodiment, a fluctuation in a TE signal is reduced, which occurs when there is a variation in a position, a width, and a depth of a groove formed on an optical recording medium and when information is recorded in a track. Furthermore, unnecessary light is prevented from being incident upon a light-receiving portion used for detecting a TE signal to fluctuate the TE signal, in the case where an optical recording medium has a plurality of information recording surfaces.

The regions 64a, 64b, 65a, 65b, 66a, 66b, 67a, 67b, 68a, and 68b in the beam splitters 64 to 68 are used for detecting a TE signal according to the push-pull method. When the width h2 is in a range of $(1-\lambda/2/tp/NA)2)^{1/2} \cdot D$ to $(1-(\lambda/2/tp/NA)2)^{1/2} \cdot D/2$, a satisfactory TE signal can be obtained. Furthermore, if the width h1 is equal to or less than $(\lambda/tp/NA-1-\Delta) \cdot D$, even if the beam 70 is moved on the beam splitter in accordance with tracking control, a TE signal is not degraded at all. When the width h1 is equal to or less than $1.5 \cdot (\lambda/tp/NA-1-\Delta) \cdot D$, a satisfactory TE signal can be obtained without any practical problem.

Herein, $\Delta$ refers to a distance at which the beam 70 is moved on the beam splitter when the diameter of the beam 70 is standardized to be 1 on the beam splitter. Needless to say, in the case where it is desired to further increase the width h2, and always keep the amplitude of a TE signal constant, an amplitude control portion for keeping the amplitude of a TE signal constant in accordance with tracking control may be provided. The state of tracking control is known easily from the output from the differential arithmetic operation portion 804 shown in FIG. 23.

Embodiment 17

Figure 30:
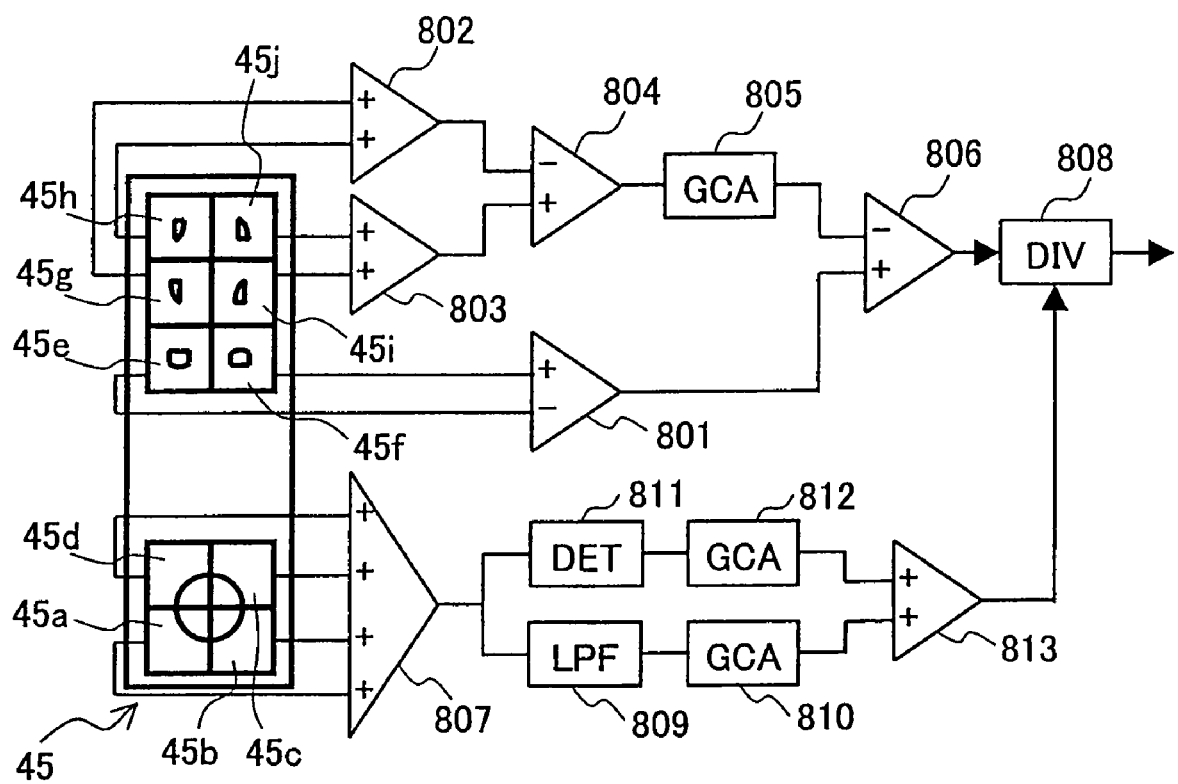
FIG. 30 shows a configuration of a signal processing part constituting an optical information apparatus of Embodiment 17 according to the present invention.

FIG. 30 shows a configuration of a signal processing portion for generating a TE signal, as an example of another optical information apparatus of the present invention. By using this signal processing portion in place of the signal processing portion in Embodiment 10 described with reference to FIG. 23, an optical information apparatus of Embodiment 17 can be configured.

Signals I45e to I45j output from the light-receiving portions 45e to 45j are subjected to a differential arithmetic operation in the differential arithmetic operation portion 806 in the same way as in the signal processing portion in Embodiment 10 described with reference to FIG. 23. The signals I45a to I45d output from the light-receiving portions 45a to 45d are added to each other in the adder 807.

Figure 31:
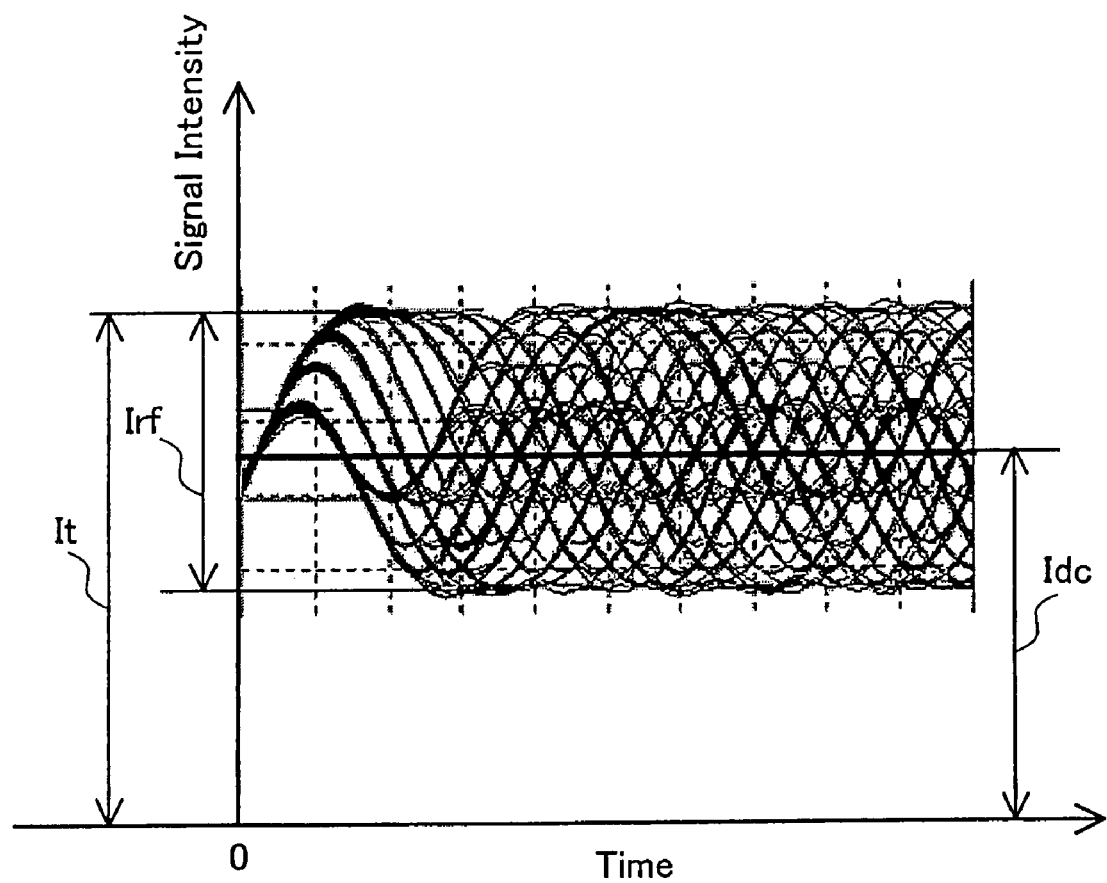
FIG. 31 shows an information signal read from the optical information apparatus of Embodiment 17 according to the present invention.

FIG. 31 shows a state (so-called eye patterns) when the signal obtained from the adder 807 is observed with an oscilloscope. The signal output from the adder 807 is input to a low pass filter 809 and an amplitude detector 811. The low pass filter 809 outputs a signal in accordance with the frequency component sufficiently lower than that of a signal composed of a mark and a space recorded on the information recording surfaces 41b and 41c of the optical recording medium 41. In the case where information is recorded on the information recording surfaces 41b and 41c, a signal intensity Idc shown in FIG. 31 is output. In the case where information is not recorded on the information recording surfaces 41b and 41c, a signal intensity It shown in FIG. 31 is output.

On the other hand, the amplitude detector 811 outputs a signal in accordance with the amplitude of a signal frequency component composed of a mark and a space recorded on the information recording surfaces 41b and 41c of the optical recording medium 41. As the amplitude detector 811, a general circuit for detecting an effective value can be used. There is no particular limit to the amplitude detector 811, as long as a circuit capable of outputting a signal in accordance with an amplitude, such as a circuit for detecting an envelope, is used. In the case where information is recorded on the information recording surfaces 41b and 41c, a signal in accordance with the signal intensity Irf shown in FIG. 31 is output. In the case where information is not recorded on the information recording surfaces 41b and 41c, 0 is output.

The signals output from the low pass filter 809 and the amplitude detector 811 are input to the variable gain amplifiers 810 and 812, and amplified or attenuated to a desired signal intensity. The signals output from the variable gain amplifiers 810 and 812 are added to each other in the adder 813, and thereafter are input to the divider 808 to be subjected to division.

The adder 807, the low pass filter 809, the amplitude detector 811, the variable gain amplifiers 810 and 812, and the adder 813 constitute a unit for detecting a recorded portion and an unrecorded portion. The divider 808 constitutes an amplitude controller.

Figure 32:
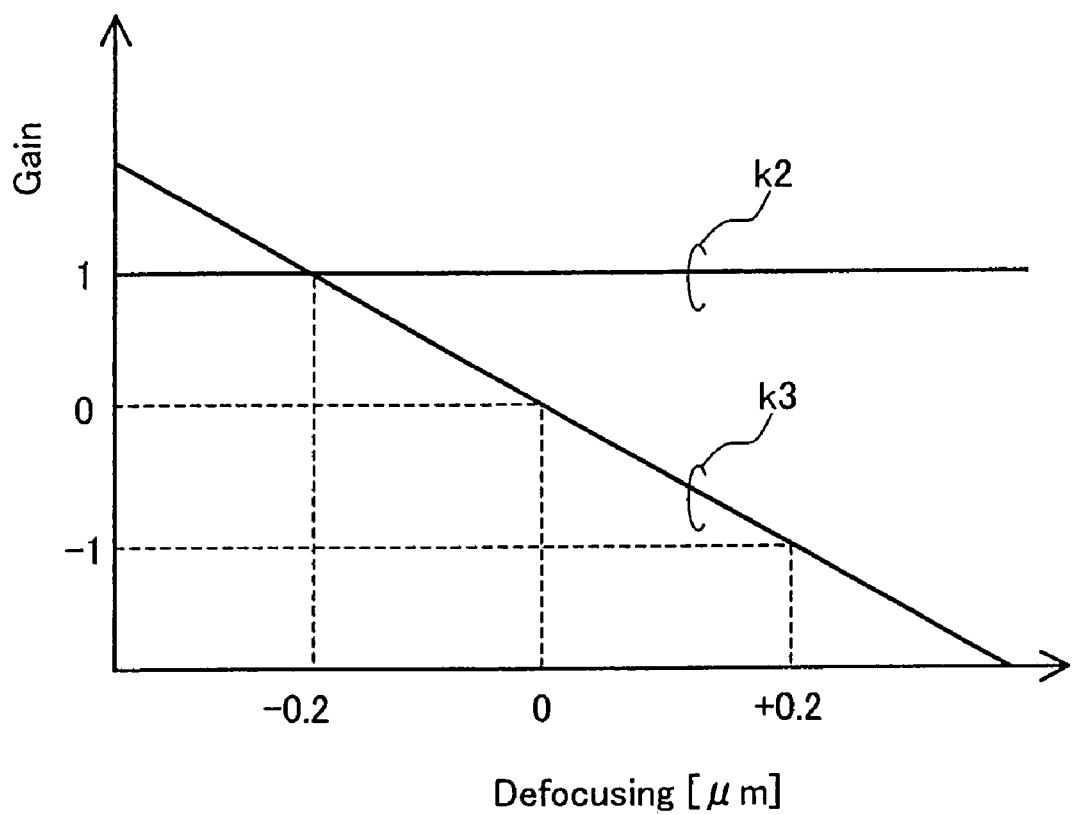
FIG. 32 shows a gain of a variable gain amplifier in a signal processing part constituting the optical information apparatus of Embodiment 17 according to the present invention.

FIG. 32 shows an example of gains of the variable gain amplifiers 810 and 812. A straight line k2 represents the gain of the variable gain amplifier 810, and a straight line k3 represents the gain of the variable gain amplifier 812. The gain of the variable gain amplifier 810 is constant without being dependent upon defocusing. However, the gain of the variable gain amplifier 812 is varied depending upon the state of defocusing of a beam condensed on the information recording surface 41b or 41c. Herein, the value of the gain represented by the straight line k3 is set to be 1 at a defocusing of −0.2 μm and set to be 0 at a defocusing of 0 μm. The value of the gain represented by the straight line k2 always is 1. The value of defocusing is known easily by using a FE signal.

When the gain of the variable gain amplifier 812 represented by the straight line k3 is varied depending upon defocusing, the fluctuation of a TE signal amplitude can be minimized, which occurs when information is recorded in some tracks on the information recording surface of the optical recording medium 41 while information is not recorded in the other tracks, and an optical information apparatus capable of recording information stably can be provided.

The values of the gains represented by the straight lines k2 and k3 are examples. The gains of the variable gain amplifiers 810 and 812, and the ratio of a change in gain, may be set to be appropriate values in accordance with the optical design. The optimum value of the gain may be set so that the fluctuation amount of a TE signal is minimized or so that off-track is minimized, in accordance with the performance required by the optical information apparatus. Alternatively, the optimum value of the gain may be set therebetween.

The above configuration is an example. Any configuration may be used, which can detect whether tracks on the information recording surfaces 41b and 41c of the optical recording medium 41 are recorded or unrecorded, and can control the amplitude of a TE signal in accordance with the recorded/unrecorded state and the state of defocusing. Furthermore, there is no limit on the number of information recording surfaces of the optical recording medium. The optical information apparatus of the present invention is applicable to all the optical recording media, as long as an optical recording medium has an information recording surface in which the amplitude of a TE signal is fluctuated due to the presence of recorded tracks and unrecorded tracks.

Figure 33:
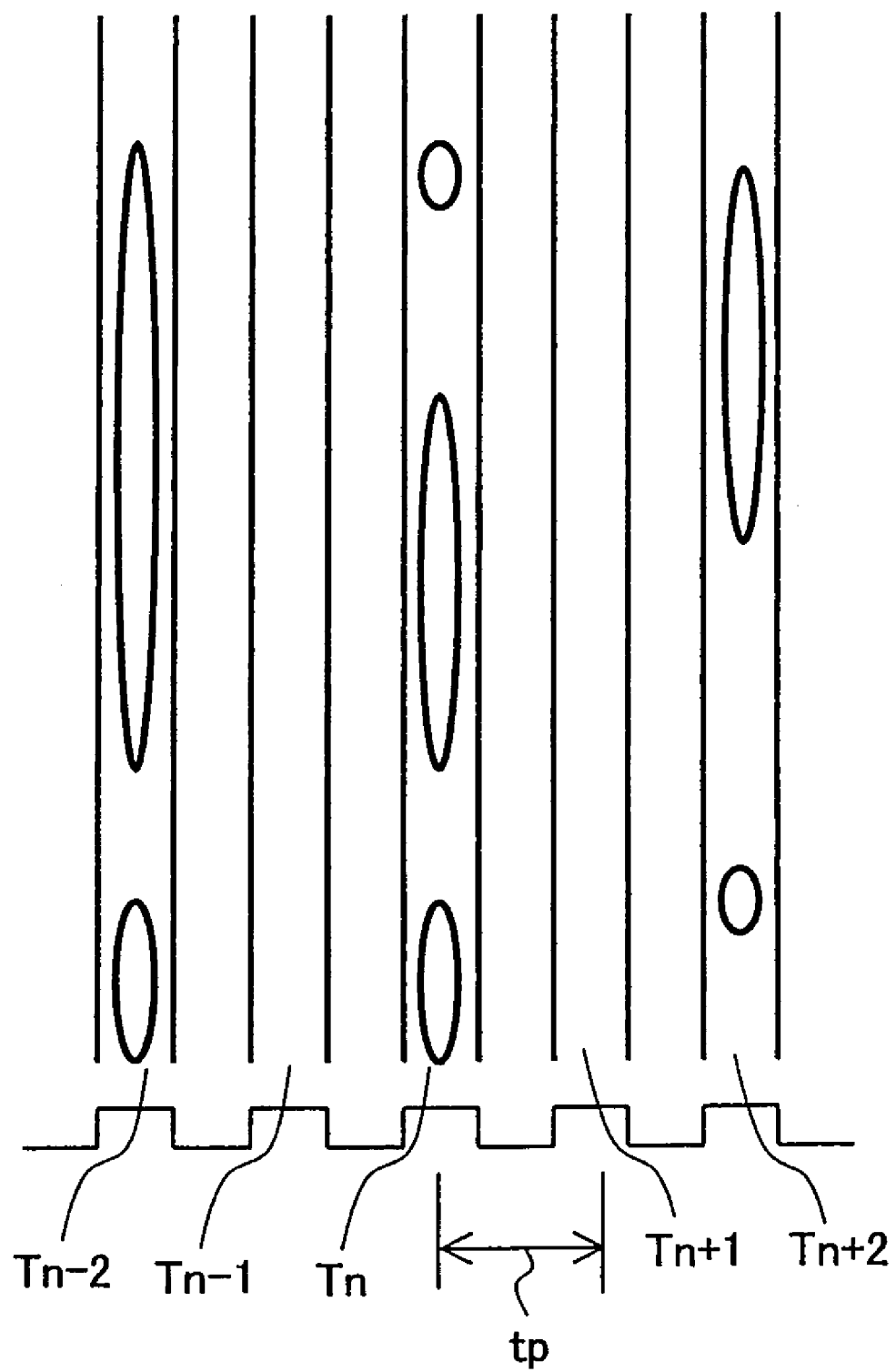
FIG. 33 shows a relationship between a recorded track and a non-recorded track on an optical recording medium in the optical information apparatus of Embodiment 17 according to the present invention.

FIG. 33 shows an example in the case where information is recorded on the information recording surfaces 41b and 41c of the optical recording medium 41 described with reference to FIG. 20. Herein, information is recorded in the tracks Tn−2, Tn, and Tn+2, and information is not recorded in the tracks Tn−1 and Tn+1. More specifically, a recorded track and an unrecorded track are formed alternately. By scanning a beam in a direction orthogonal to the tracks, a TE signal is obtained. When recorded tracks and unrecorded tracks are present, the amplitude of a TE signal is fluctuated. In order to minimize this fluctuation, the gains of the variable gain amplifiers 810 and 812 represented by the straight lines k2 and k3 may be adjusted. In the case where recorded tracks and unrecorded tracks are formed alternately, the fluctuation of a TE signal amplitude is most conspicuous, and the gains of the variable gain amplifiers 810 and 812 can be adjusted with good precision.

Embodiment 18

Figure 34:
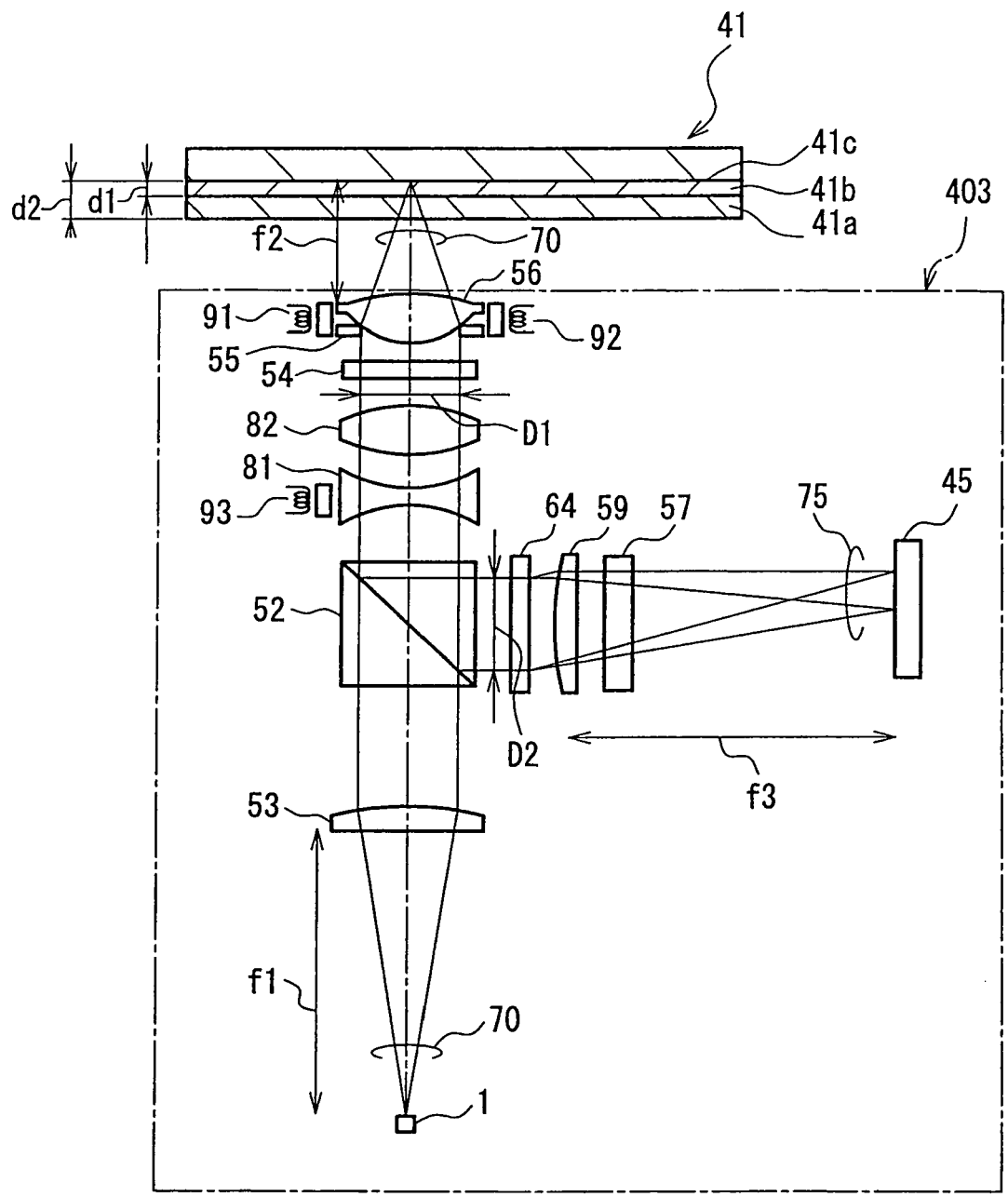
FIG. 34 shows a configuration of an optical pick-up head constituting an optical information apparatus of Embodiment 18 according to the present invention.

FIG. 34 shows an exemplary configuration of an optical pick-up head 403 in the present invention, as an example of another optical information apparatus of the present invention. The optical pick-up head 403 is different from the optical pick-up head 402 in Embodiment 10 described with reference to FIG. 20 in that a concave lens 81 and a convex lens 82 are provided between the polarized beam splitter 52 and the quarter-wavelength plate 54.

By changing the position of the concave lens 81 by an actuator 93, the spherical aberration amount given to the beam 70 can be adjusted. The spherical aberration amount of the beam 70 condensed onto the information recording surfaces 41b and 41c is varied depending upon the distance from the surface of the optical recording medium 41 to the information recording surfaces 41b, 41c. The spherical aberration is corrected by using the concave lens 81 and the convex lens 82 so that the spherical aberration of the beam 70 condensed onto the information recording surfaces 41b, 41c is decreased. By providing the concave lens 81 and the convex lens 82, information can be recorded on both the information recording surfaces 41b and 41c with less spherical aberration.

Herein, a diameter D1 of a beam incident upon the objective lens 56 is constant since the opening of the objective lens 56 is limited by the aperture 55, whereas a diameter D2 of a beam incident upon the beam splitter 64 is varied depending upon the position of the concave lens 81. The size of the regions 64a to 64g provided in the beam splitter 64 is constant. Therefore, when the diameter D2 of a beam is decreased, the light amount of the beams 75b to 75c generated in the regions 64a to 64b is increased, and the light amount of the beams 75d to 75g generated in the regions 64c to 64f is decreased. If the gain of the variable gain amplifier 805 represented by the straight line k1 remains constant, the offset fluctuation in accordance with track-following of a signal output from the differential arithmetic operation portion 801 cannot be decreased appropriately.

Figure 35:
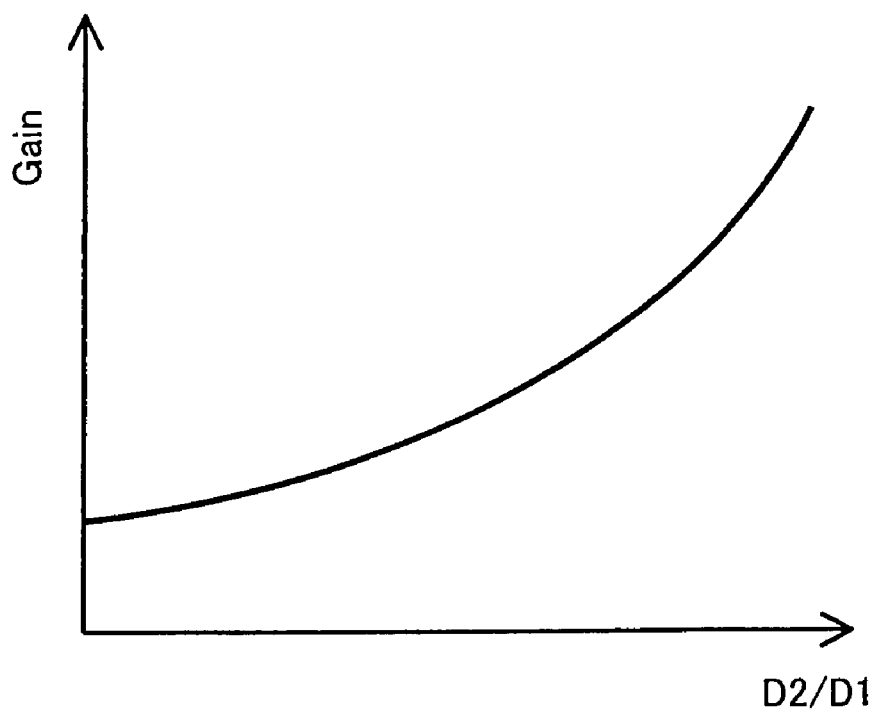
FIG. 35 shows a gain of a variable gain amplifier in a signal processing part constituting the optical information apparatus of Embodiment 18 according to the present invention.

FIG. 35 shows a relationship between a ratio D2/D1 of the beam diameters in the present embodiment and the gain of the variable gain amplifier 805 represented by the straight line k1. As the ratio D2/D1 of the beams is decreased, the gain of the variable gain amplifier 805 is increased.

Figure 36:
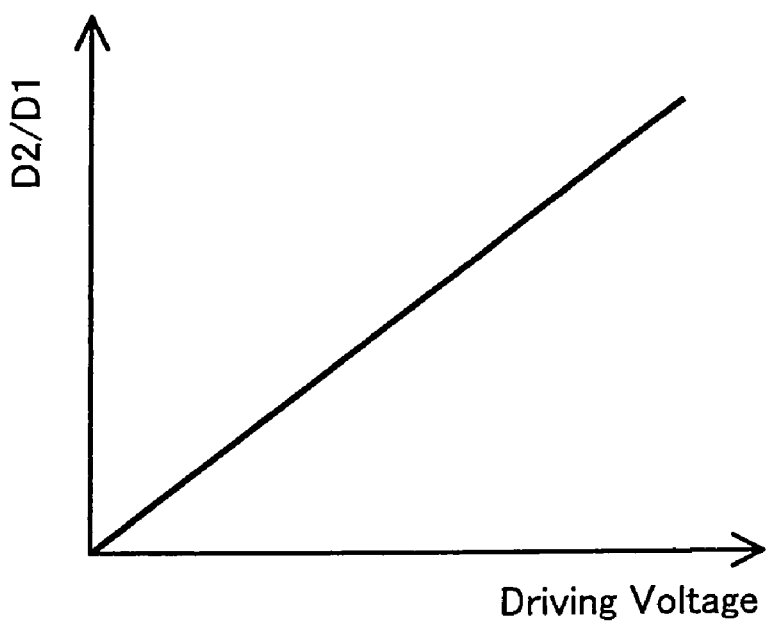
FIG. 36 shows a relationship between a beam diameter and a driving voltage of an actuator in an optical pick-up head constituting the optical information apparatus of Embodiment 18 according to the present invention.

FIG. 36 shows a relationship between a driving voltage of the actuator 93 shown in FIG. 34 and the ratio D2/D1 of the beam diameters. The driving voltage of the actuator 93 and the ratio D2/D1 of the beam diameters has a correlation. Herein, the gain of the variable gain amplifier 805 represented by the straight line k1 is controlled in accordance with the driving voltage of the actuator 93. It is difficult to measure the ratio D2/D1 of the beam diameters, whereas the driving voltage of the actuator 93 is known easily. Even in the case where the concave lens 81 is displaced so that the spherical aberration of the beam condensed on the information recording surface 41$b$ or 41$c$ is decreased, the offset fluctuation in accordance with track-following of the signal output from the differential arithmetic operation portion 801 can be reduced appropriately. More specifically, the reliability of an optical information apparatus for recording information on an optical recording medium having a plurality of information recording surfaces can be enhanced.

Embodiment 19

Figure 37:
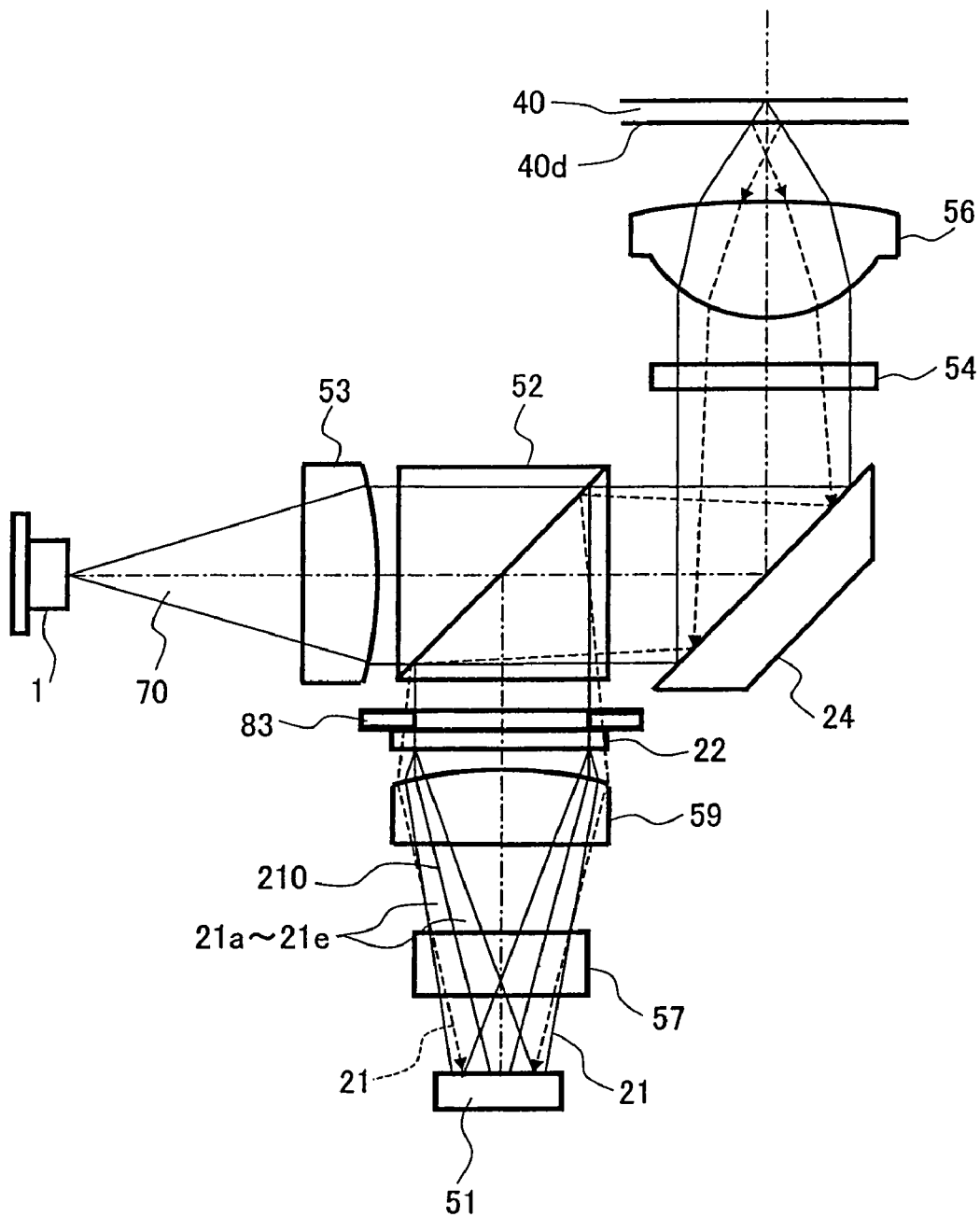
FIG. 37 shows a configuration of an optical head apparatus in Embodiment 19 according to the present invention.

FIG. 37 shows a configuration of another optical pick-up head in the present invention. A light source 1 such as a semiconductor laser emits a linearly polarized beam 70 with a wavelength λ1 of 405 nm. The beam 70 emitted from the light source 1 is converted to parallel light by a collimator lens 53 to be incident upon a polarized beam splitter 52. The beam having passed through the polarized beam splitter 52 has its optical path bent by a rising mirror 24 and passes through a quarter-wavelength plate 54 to be converted to circularly polarized light. Thereafter, the beam 70 is incident upon the objective lens 56 to be condensed on it. The objective lens-56 has a focal length f of 2 mm, and a numerical aperture NA of 0.85. The objective lens 56 is driven by an objective lens driving apparatus (not shown), and the beam 70 passes through a transparent protective layer with a thickness of 0.1 mm to be condensed onto a recording surface, of an optical recording medium 40. The optical recording medium 40 is provided with a continuous groove to be a track, and a pitch tp is 0.32 μm.

The beam 70 reflected from the optical recording medium 40 passes through the objective lens 56 and the quarter-wavelength plate 54 to be converted to linearly polarized light whose plane of polarization is shifted by 90° from an ingoing path, and is reflected from the polarized beam splitter 52 as a beam splitting unit. The beam 70 reflected from the polarized beam splitter 52 to have its direction changed passes through an opening limit element 83. The beam 70 passes through a diffraction element 22 in contact with the opening limit element 83, and is split to a plurality of beams 210 and 21$a$ to 21$e$. The split beams pass through a condensing lens 59 to be converted to convergent light. The convergent light passes through a cylindrical lens 57 to be provided with astigmatism. Thereafter, the resultant beam 70 is incident upon a photodetector 51. The beam 70 incident upon the photodetector 51 is output as an electric signal.

Figure 38:
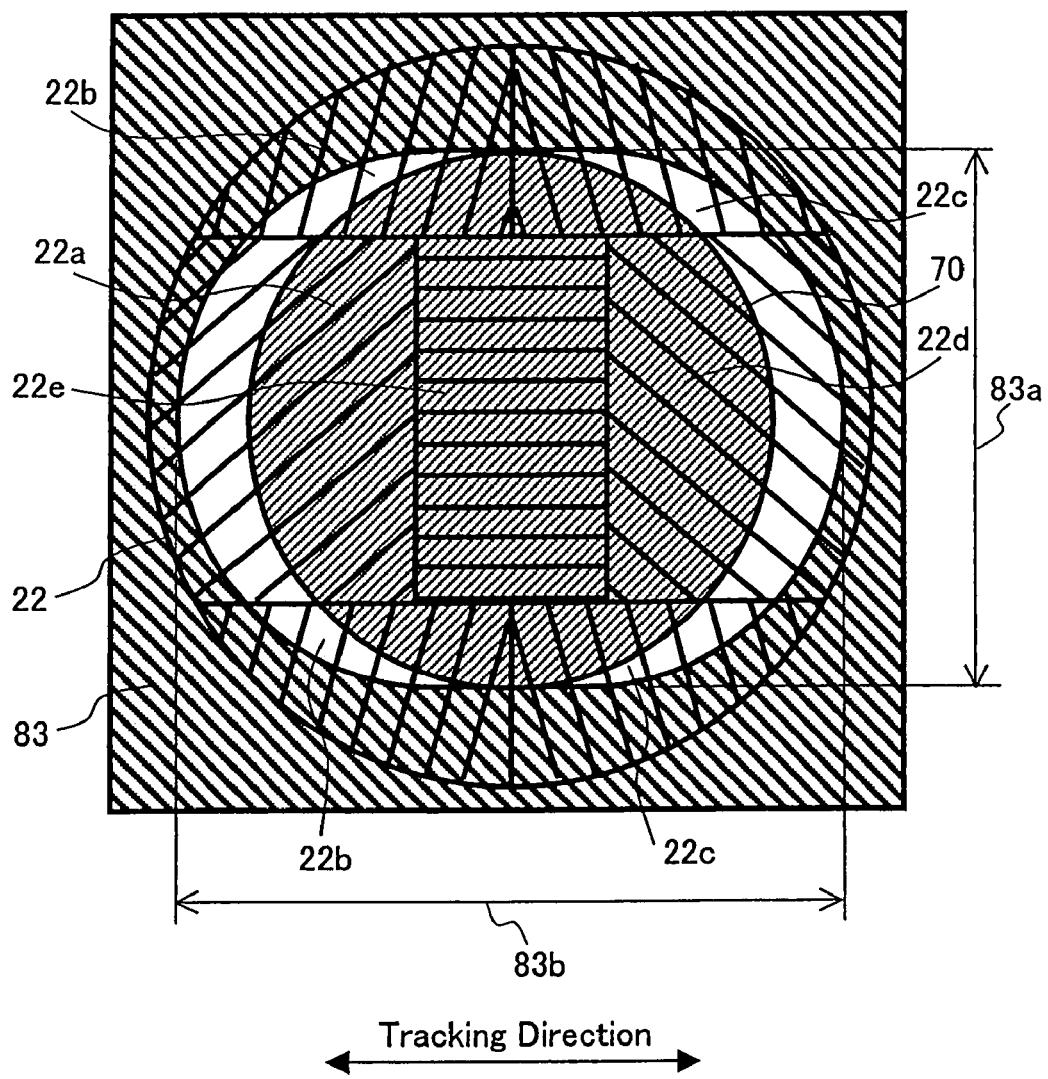
FIG. 38 schematically shows an exemplary configuration of a diffraction element and an opening limit element in Embodiment 19 according to the present invention.
Figure 39:
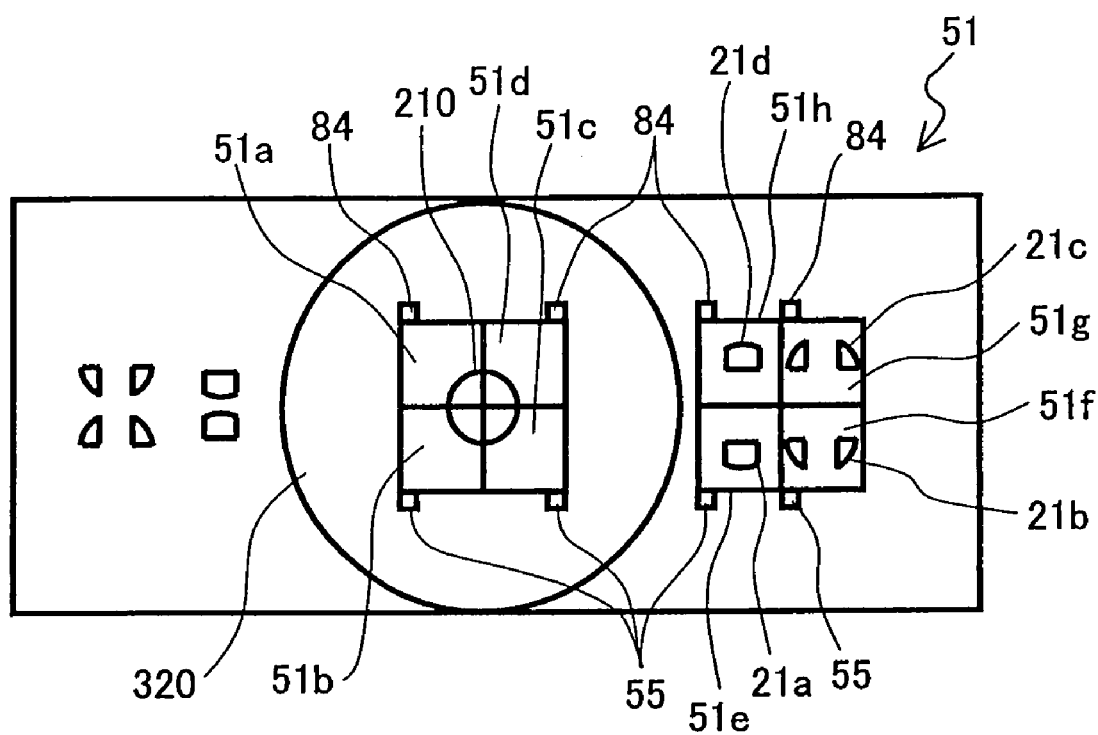
FIG. 39 shows a relationship between an incident beam and the shape of a light-receiving surface of a photodetector in Embodiment 19 according to the present invention.

FIG. 38 schematically shows configurations of the diffraction element 22 and the opening limit element 83. FIG. 39 schematically shows a relationship between the shape of the light-receiving portion of the photodetector 51 and the beams 210 and 21$a$ to 21$d$.

The diffraction element 22 has four regions 22$a$ to 22$e$. The diffraction element 22 transmits a large part of the incident beam 70 to generate 0th order diffracted light 210, and diffracts a part hereof to generate beams 70$a$ to 70$e$ from the regions 22$a$ to 22$e$, respectively.

The photodetector 51 has 8 light-receiving portions 51$a$ to 51$h$ in total. The light-receiving portions 51$a$ to 51$h$ are used for detecting a signal. The light-receiving portions 51$a$ to 51$d$ receive the beam 210. The light-receiving portion 51$g$ receives the beam 21$c$. The light-receiving portion 51$e$ receives the beam 21$a$. The light-receiving portion 51$f$ receives the beam 21$c$. The light-receiving portion 51$h$ receives the beam 21$d$. The region 22$e$ has characteristics so as to diffract light at a diffraction angle larger than the other regions, and the beam diffracted in the region 22$e$ is not incident upon the photodetector 51. The respective ends of the light-receiving portions 51$a$ to 51$h$ of the photodetector 51 are provided with electrodes 84, and current signals I51$a$ to I51$h$ in accordance with the received light amounts are output from the electrode 84 to a semiconductor circuit (not shown).

AFE signal is obtained by an arithmetic operation (I51$a$+I51$c$)−(I51$b$+I51$d$) according to the astigmatism method, and the position of the objective lens 56 is controlled based on the FE signal.

Furthermore, a TE signal is obtained by an arithmetic operation (I51$g$−I51$h$)−k·(I51$e$−I51$f$). The position of the objective lens is controlled based on the TE signal thus obtained, whereby a signal can be recorded/reproduced.

In Embodiment 19, the diffraction element 22 is divided by straight lines. However, the diffraction element 22 may be divided by any positional shape so that the characteristics of a TE signal are optimized in accordance with the characteristics and the like of the optical recording medium 40. In the above-mentioned arithmetic operation, k is a real number and set to be an appropriate value depending upon the divided positions of the grating element 22 and the characteristics of the optical recording medium 40.

Furthermore, during reproduction of information, an information signal (hereinafter, referred to as "RF signal") recorded on an information recording medium is obtained by I51$a$+I51$b$+I51$c$+I51$d$.

At this time, the beams 210, and 21$a$ to 21$d$ are incident upon the photodetector 51. In addition, light reflected from a surface 40$d$ of a transparent substrate of the optical recording medium 40 returns to the photodetector 51 as divergent light, as shown by the stray light 21 in FIG. 37.

The stray light 21 also is incident upon the condensing lens 59 after passing through the diffraction element 22. However, since the stray light 21 is divergent light that is diverged larger compared with the normal beam 70, the stray light 21 may be incident upon the surface of the photodetector 51 under the condition of being spread larger than the spot formed by the beam 210.

The stray light 21 may be incident upon the light-receiving portions for a signal. Particularly, in the case where the stray light 21 is incident upon the light-receiving portions 51$e$ to 51$h$ that receive the diffracted light beams 21$a$ to 21$d$ with a relatively small light amount, signal quality is degraded greatly. Consequently, tracking control becomes unstable, and information cannot be recorded/reproduced with high reliability. In Embodiment 19, the opening limit element 83 is inserted in the path to block ambient light of the stray light 21, whereby a spot 320 by the stray light 21 on the surface of the photodetector 51 can be decreased as shown in FIG. 39. Therefore, the stray light 21 can be prevented from being incident upon the light receiving portions 51$e$ to 51$h$ for receiving the diffracted light beams 21$a$ to 21$d$.

Furthermore, when the stray light 21 is minimized, although it is not incident upon the light-receiving portions directly, unnecessary light traveling to the light-receiving portions due to reflection from the inner surface of a lens barrel (not shown) and the inner surface of an optical head can be blocked, whereby stable tracking control can be performed.

The stray light 21 also is diffracted by the diffraction element 22. In order to prevent the diffracted light thereof from being incident upon the light-receiving portions 51$e$ to 51$h$, the stray light 21 is diffracted at a large diffraction angle so as to travel to an outside of the photodetector 51 in the region 22e at the center of the diffraction element 22.

The opening diameter of the opening limit element 83 is set to be a diameter 83a or more determined by the NA of the objective lens as shown in FIG. 38 so as not to block the normal beam 70 reflected from the recording surface of the optical recording medium 40.

Furthermore, when the objective lens follows a track to be displaced in a tracking direction, the position of the beam 70 also is changed. Even in this case, in order not to block the beam 70, it is desirable that the opening of the opening limit element 83 has an elliptical shape with a major diameter 83b that is increased considering the displacement of the objective lens in a tracking direction.

Furthermore, in order to block the stray light 21 as much as possible, the opening limit element 83 is placed at a position where the diameter of the stray light 21 is spread as largely as possible with respect to the beam 70 (i.e., at a position where the light amount of the stray light 21 having passed through the opening for passage of the beam 70 is minimized), whereby the stray light 21 can be blocked most effectively. For this purpose, in Embodiment 19, the opening limit element 83 is placed at a position in contact with the diffraction element 22.

The reason for the above is as follows. As shown in FIG. 37, the stray light 21 travels to the photodetector 51 while being diverged compared with the beam 70. Therefore, if the opening is limited at a farthest possible position from the optical recording medium 40, much of the stray light 21 can be blocked. However, on the photodetector 51 side from the diffraction element 22, the beams 21a to 21e split by the diffraction element 22 are spread with respect to the beam 210. If a large opening diameter is set with respect to the beam 210 so as not to block the beams 21a to 21e, the blocking amount of the stray light 21 is decreased accordingly.

Furthermore, in the case where the opening center of the opening limit element 83 is not matched with the center of the diffraction element 22, an imbalance is caused in the amounts of light that passes and is split therebetween. Consequently, a TE signal has an abnormal error, degrading tracking performance. In Embodiment 19, the opening limit element 83 is placed at a position in contact with the diffraction element 22. Therefore, the alignment between the opening limit element 83 and the diffraction element 22 can be performed easily. For example, it also is possible that before the diffraction element 22 is incorporated into an optical head apparatus, the opening limit element 83 is aligned to be fixed with the diffraction element 22 while the division pattern of the diffraction element 22 is being observed, and they are attached to an optical head apparatus. Thus, the number of steps of assembling an optical head apparatus is decreased, and an inexpensive optical head apparatus can be provided.

Figure 40:
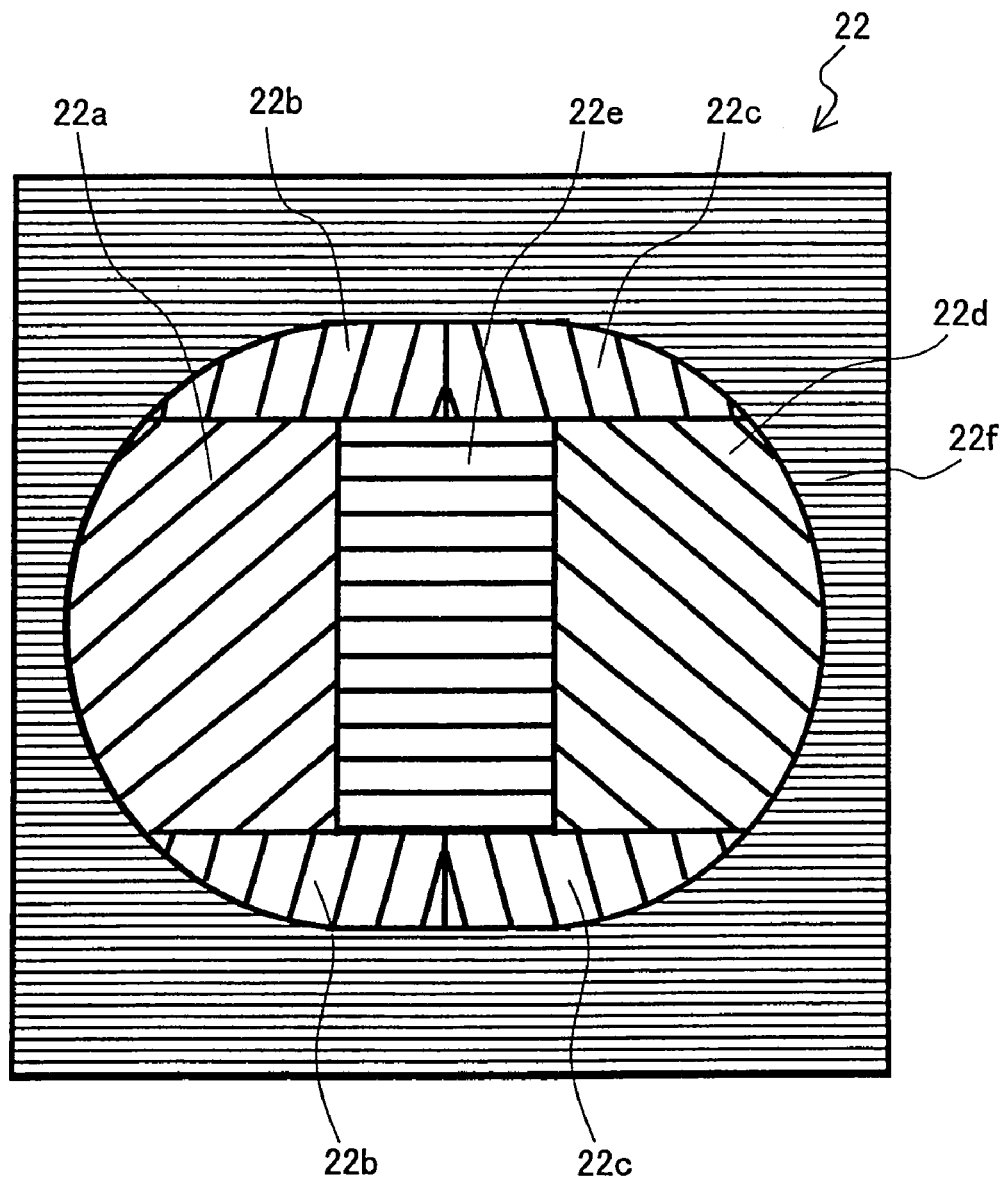
FIG. 40 schematically shows another exemplary configuration of the diffraction element and the opening limit element in Embodiment 19 according to the present invention.

In Embodiment 19, the opening limit element 83 and the diffraction element 22 are composed of separate members. However, this is not necessarily required. For example, as shown in FIG. 40, a portion of the diffraction element 22 corresponding to an opening limit element is partitioned as a region 22f having other diffraction characteristics, and this portion is provided with characteristics so as to diffract all the light beams having passed through the region 22f in such a manner that they are not incident upon the photodetector 51. Even in this case, the same effects can be obtained. Furthermore, in this case, it is not necessary to align the opening limit element 83. The region 22f may have any configuration as long as it has a function of substantially blocking the stray light 21 to the light-receiving portions 51e to 51h. For example, the region 22f may be made of a reflective film or an absorbent film. Furthermore, the region 22f may be a diffraction grating having a high diffraction efficiency.

Because of the above-mentioned configuration, a satisfactory TE signal can be obtained, which is less influenced by stray light reflected from a protective layer of an information recording medium, and an optical head apparatus capable of recording/reproducing information with high reliability can be provided.

Furthermore, by using the optical pick-up head in Embodiment 19 in place of the optical pick-up head 4 in the optical information apparatus of Embodiment 1, an optical information apparatus can be configured in which a signal output with high reliability is obtained, and satisfactory recording/reproducing characteristics are obtained.

Furthermore, the reflective surface for generating the stray light 21 is not limited to the surface 40d of the transparent substrate. In the case where the optical recording medium 40 has a plurality of recording surfaces, stray light also is generated from the other surfaces than the recording surface where information is recorded/reproduced. The present invention also is effective even in this case.

Embodiment 20

In Embodiment 20, a region required for a TE signal is divided by a hologram element, and an electrically optimum correction coefficient is determined.

Figure 41:
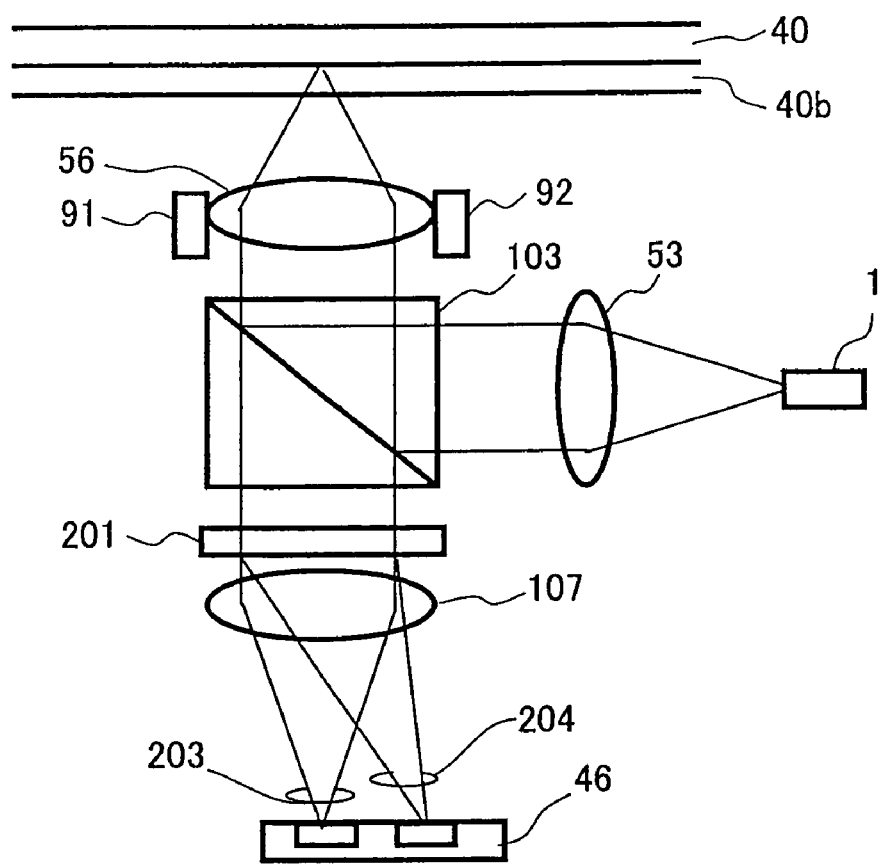
FIG. 41 illustrates a configuration of an optical system of an optical information apparatus of Embodiment 20 according to the present invention.

FIG. 41 shows a configuration of an optical pick-up head constituting an optical information apparatus of Embodiment 20. A light beam emitted from a semiconductor laser (light source) 1 is collimated by a collimator lens 53. The collimated light beam is reflected from a beam splitter (splitting unit) 103, and condensed onto an information recording surface 40b of an optical recording medium 40 by an objective lens (condensing unit) 56. On the information recording surface 40b of the optical recording medium 40, a track in which a mark and a space are placed selectively, or a guide groove for placing a mark and a space is arranged as a track concentrically or spirally at a predetermined interval. The objective lens 56 is moved in an optical axis direction and in a direction traversing a track in accordance with the deflection of a surface of an optical recording medium and the eccentricity of optical recording medium by actuators 91 and 92.

The light beam reflected/diffracted from the information recording surface 40b passes through the objective lens 56 again to be collimated, passes through the beam splitter (splitting unit) 103, and is partially diffracted by a hologram element (divider) 201. The light beam having passed through the hologram element 201 is condensed by a detection lens 107. The detection lens 107 is a complex functional lens having both the functions of the condensing lens 59 and the cylindrical lens 57 in Embodiment 1 described with reference to FIG. 2. A photodetector (light detector) 46 receives a light beam 203 and diffracted light 204 having passed through the hologram element 201.

Figure 42:
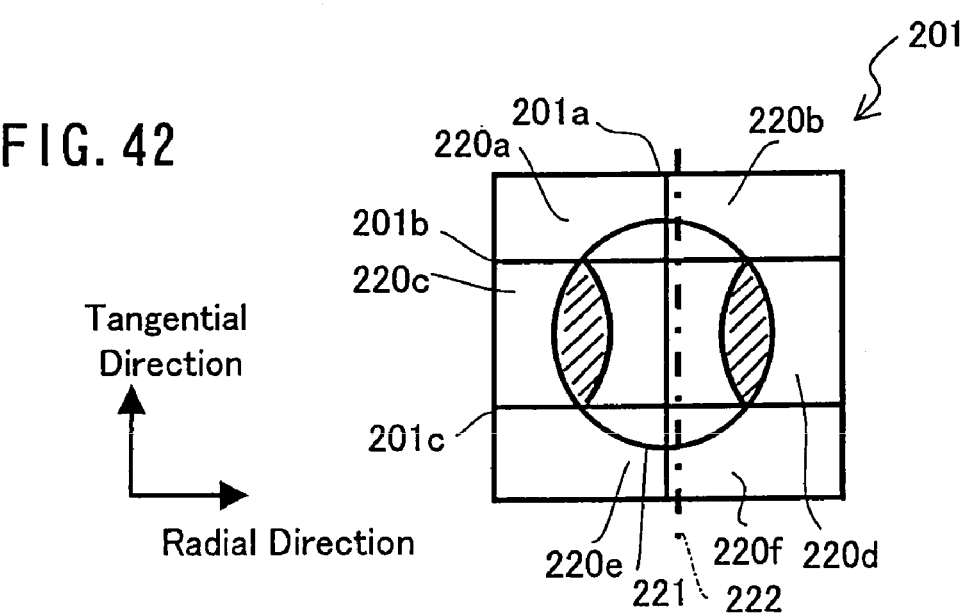
FIG. 42 shows a relationship between a light beam and division of an exemplary hologram element of the optical information apparatus of Embodiment 20 according to the present invention.

FIG. 42 shows a relationship between the division of the hologram element 201 and a light beam. The hologram element 201 is divided into 6 regions 220a to 220f by three dividing lines 201a, 201b, and 201c. A light beam 221 is substantially circular, and portions where ±1st order light and 0th order light diffracted by a track of an optical recording medium are overlapped with each other are represented by shaded parts. The shaded parts correspond to a first region mainly containing a TE signal. From the regions 220c and 220d including the first region, a signal mainly containing a TE signal component can be obtained. On the other hand, the regions 220a, 220b, 220e, and 220f correspond to a second region mainly containing an offset component of a TE signal, and a signal mainly containing an offset component can be obtained from the second region.

Figure 43:
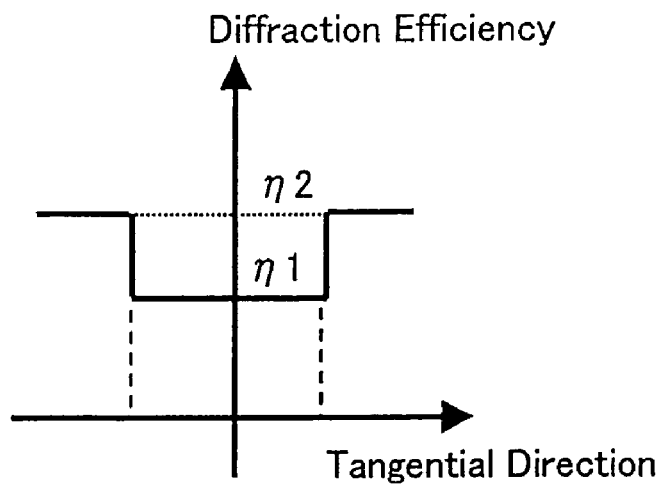
FIG. 43 shows a state of a change in a diffraction efficiency in a tangential direction of the hologram element of the optical information apparatus of Embodiment 20 according to the present invention.

FIG. 43 shows a distribution of the diffraction efficiency of the hologram element 201 along alternate long and short dashed lines 222. A horizontal axis represents a position in a tangential direction (track tangent direction), and a vertical axis represents a diffraction efficiency. Broken lines represent positions of intersection points of the dividing lines 201b and 201c. As shown in FIG. 43, a diffraction efficiency 2 outside of the dividing lines 201b and 201c is set to be higher than a diffraction efficiency η1 inside of the dividing lines 201b and 201c. In this manner, the efficiency at which a light beam in the regions mainly containing an offset component reaches the photodetector 46 is enhanced.

Figure 44:
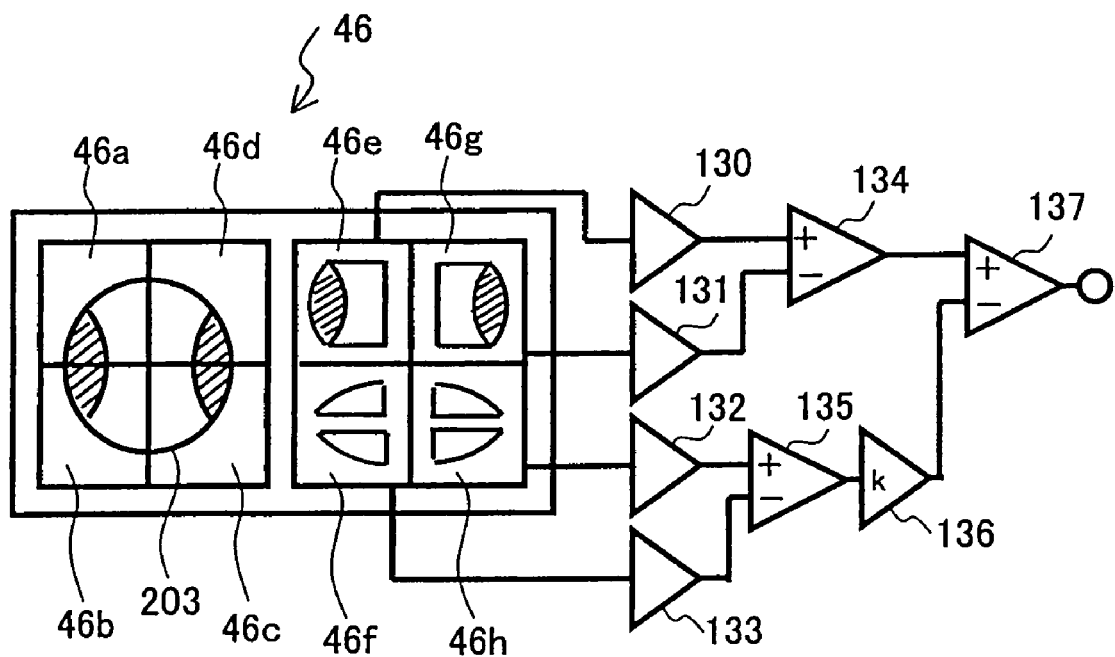
FIG. 44 shows a relationship between a light beam and division of a photodetector of the optical information apparatus of Embodiment 20 according to the present invention, and a configuration of an electric circuit.

FIG. 44 shows a configuration of the photodetector 46 and an electric circuit. 0th order light receiving portions 46a to 46d provided in the photodetector 46 receive the light beam 203 that is 0th order light having passed through the hologram element 201. Signals output from the light-receiving portions 46a to 46d are used to detect a FE signal and an information reproducing signal. Herein, the detailed description of the detection of a FE signal is omitted.

The light-receiving portions 46e to 46h receive the diffracted light 204 (FIG. 41) diffracted by the hologram element 201, and output current signals in accordance with the light amounts thereof. The light-receiving portion 46e receives light having passed through the region 220c shown in FIG. 42, and the light-receiving portion 46g receives light having passed through the region 220d. From the light-receiving portions 46e and 46g, a signal mainly containing a TE signal component can be obtained. An IV amplifier (converter) 130 converts the current signal from the light-receiving portion 46e to a voltage signal. An IV amplifier (converter) 131 converts the current signal from the light-receiving portion 46g to a voltage signal.

Furthermore, the light-receiving portion 46f receives light having passed through the regions 220a and 220e shown in FIG. 42, and the light-receiving portion 46h receives light having passed through the regions 220b and 220f. From the light-receiving portions 46f and 46h, a signal mainly containing an offset component can be obtained. An IV amplifier (converter) 132 converts the current signal from the light-receiving portion 46h to a voltage signal. An IV amplifier (converter) 133 converts the current signal from the light-receiving portion 46f to a voltage signal.

A differential arithmetic operation unit 134 receives output signals from the IV amplifiers 130 and 131 to output a differential signal thereof. This differential signal mainly contains a TE signal component. On the other hand, the differential arithmetic operation portion 135 receives outputs from the IV amplifiers 132 and 133 to output a differential signal thereof. This differential signal mainly contains an offset component. The signal output from the differential arithmetic operation portion 135 is multiplied by a gain (coefficient) k by a variable gain amplifier 136, whereby a signal multiplied by k is output. The differential arithmetic operation portion (TE signal generator) 137 receives output signals from the differential arithmetic operation portion 134 and the variable gain amplifier 136 to output a differential signal thereof.

The gain k of the variable gain amplifier 136 is determined so that the fluctuation amount of a DC component of a signal output from the differential arithmetic operation portion 135 is equal to the fluctuation amount of a DC component of a signal output from the variable gain amplifier 136 when an objective lens is moved. From the differential arithmetic operation portion 137, a TE signal that is not subjected to offset fluctuation is obtained, even when the objective lens is moved.

The gain k depends upon the ratio between the interval between the dividing lines 201b and 201c and the diameter of the light beam 221, and the light intensity distribution in the light beam 221. Herein, by setting the diffraction efficiency 2 of the regions 220a, 220b, 220e, and 220f to be twice the diffraction efficiency 1 of the regions 220c and 220d, the gain k can be set to be about 1.

Assuming that the electric offset occurring in each of the IV amplifiers 130 to 133 is ΔE on average, the gain k in the conventional example is about 2, so that an electric offset that is 6 times ΔE occurs in a corrected TE signal in the worst case. However, in Embodiment 20, since the gain k may be about 1, an electric offset may be 4 times ΔE in the worst case. Thus, the amount of an offset that is varied depending upon the temperature and the like can be reduced to ⅔ of the conventional example.

In this example, the gain that is a coefficient for reducing an offset of a TE signal can be set to be an optimum value on a head or optical recording medium basis. Therefore, an offset of a TE signal can be minimized. Furthermore, the positions of the dividing lines of the hologram element are determined independently from a diffraction efficiency, so that the degree of freedom can be ensured at which an optimum shape can be used as a dividing pattern.

If the diffraction efficiency in the region for obtaining a signal mainly containing an offset component is enhanced, the gain k can be decreased further. Therefore, the amount of an electric offset that is varied depending upon the temperature and the like can be decreased.

Furthermore, in such an example, the transmission efficiency of 0th order light for obtaining a RF signal in a tangential direction also is varied. However, the influence on a RF signal can be reduced by a waveform equalization, a maximum likelihood decoding method (PRML), and the like.

Figure 45:
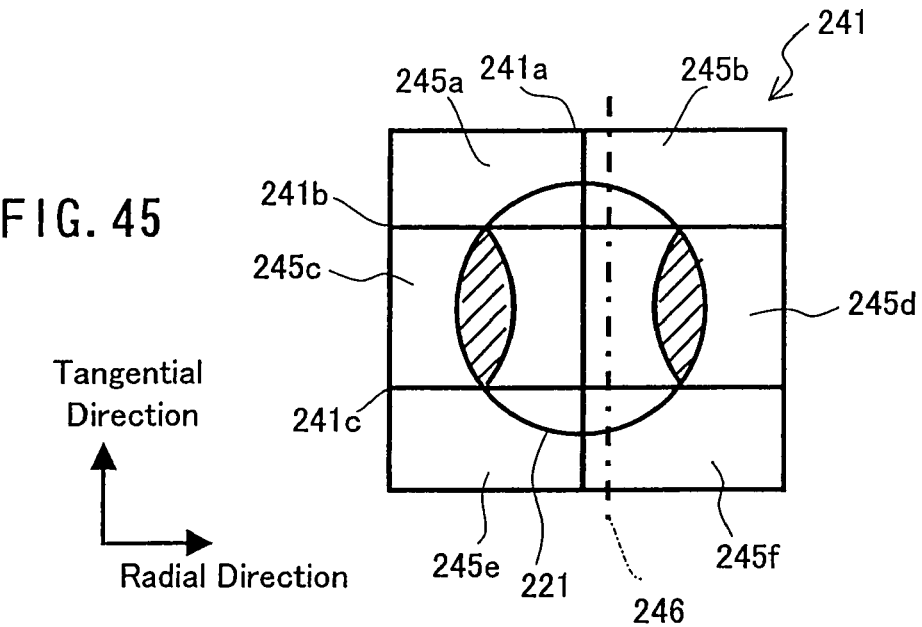
FIG. 45 shows a relationship between a light beam and division of another exemplary hologram element of the optical information apparatus of Embodiment 20 according to the present invention.

As an example using another divider, FIG. 45 shows a relationship between the division of a hologram element (divider) 241 and a light beam in another example. The hologram element 241 is used in place of the hologram element 201 described with reference to FIG. 42. The hologram element 241 is divided into 6 regions 245a to 245f by dividing lines 241a, 241b, and 241c. The diffracted light generated from each divided region is incident upon a detection system for detection in a similar manner to that described above with reference to FIG. 44.

Figure 46:
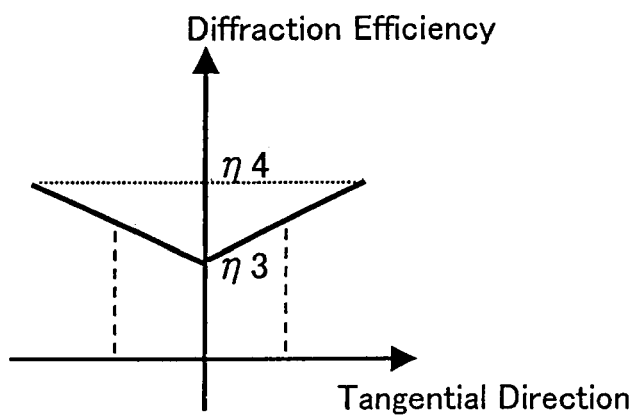
FIG. 46 shows a state of a change in a diffraction efficiency in a tangential direction of another exemplary hologram element of the optical information apparatus of Embodiment 20 according to the present invention.

FIG. 46 shows a diffraction efficiency distribution along alternate long and short dashed lines 246. A horizontal axis represents a position in a tangential direction (direction traversing a track), and a vertical axis represents a diffraction efficiency. The diffraction efficiency is changed linearly so as to be η3 at a center portion and η4 at both ends. Broken lines present positions of intersection points of the alternate long and short dashed lines 246 and the dividing lines 241b and 241c.

Even with the above-mentioned configuration, the efficiency at which light having passed through the regions 245a, 245b, 245e, and 245f mainly containing an offset reaches the photodetector 46 (FIG. 41) is high, so that the gain k of the variable gain amplifier can be decreased. Therefore, the amount of an offset due to the fluctuation of an electric offset that is varied depending upon the temperature and the like can be reduced.

Figure 47:
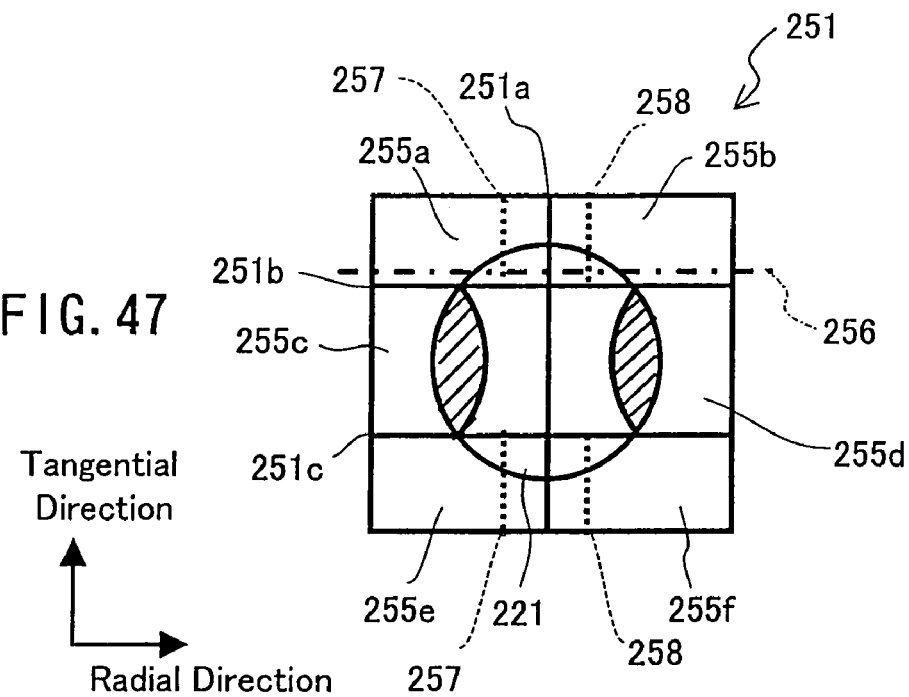
FIG. 47 shows a relationship between a light beam and division of still another exemplary hologram element of the optical information apparatus of Embodiment 20 according to the present invention.

As an example using another divider, FIG. 47 shows a relationship between the division of a hologram element (divider) 251 and a light beam in still another example. The hologram element 251 is used in place of the hologram element 201 described with reference to FIG. 42. The hologram element 251 is divided into 6 regions 255a to 255f by the dividing lines 251a, 251b, and 251c. Diffracted light generated from each divided region is incident upon a detection system for detection in a similar manner to that of the example described with reference to FIG. 44.

Figure 48:
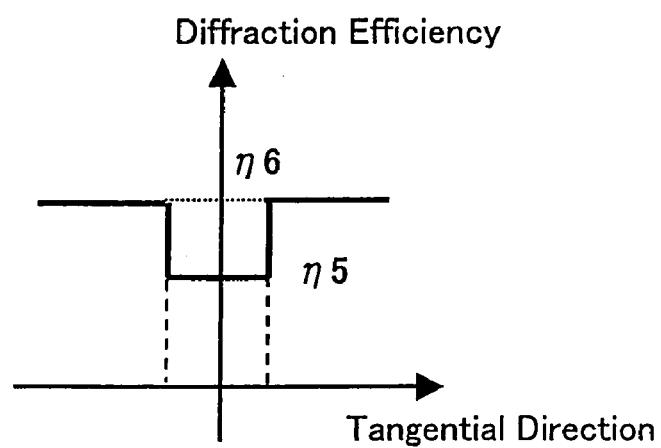
FIG. 48 shows a state of a change in a diffraction efficiency in a tangential direction of still another exemplary hologram element of the optical information apparatus of Embodiment 20 according to the present invention.

FIG. 48 shows a diffraction efficiency distribution along alternate long and short dashed lines 256. A horizontal axis represents a position in a radial direction (direction traversing a track), and a vertical axis represents a diffraction efficiency. The hologram element 251 is produced so that the diffraction efficiency is η5 at a center, and is η6, higher than η5, at both ends. Broken lines represent intersection points of dotted lines 257, 258 and the alternate long and short dashed lines 256.

Even with such a configuration, among the regions 255a, 255b, 255e, and 255f mainly containing an offset, in the circumferential portion of a light beam where the area is changed largely due to the movement of an objective lens, the efficiency at which a light beam reaches the photodetector 46 (FIG. 41) is high, so that the gain k of the variable gain amplifier can be decreased. Therefore, the amount of an offset due to the fluctuation of an electric offset that is varied depending upon the temperature and the like can be reduced. Thus, the diffraction efficiency may be varied in the same region. In such an example, the diffraction efficiency in a tangential direction is changed less, so that the partial difference in a transmission efficiency of 0th order light for obtaining a RF signal can be decreased to reduce the influence on a RF signal.

Figure 49:
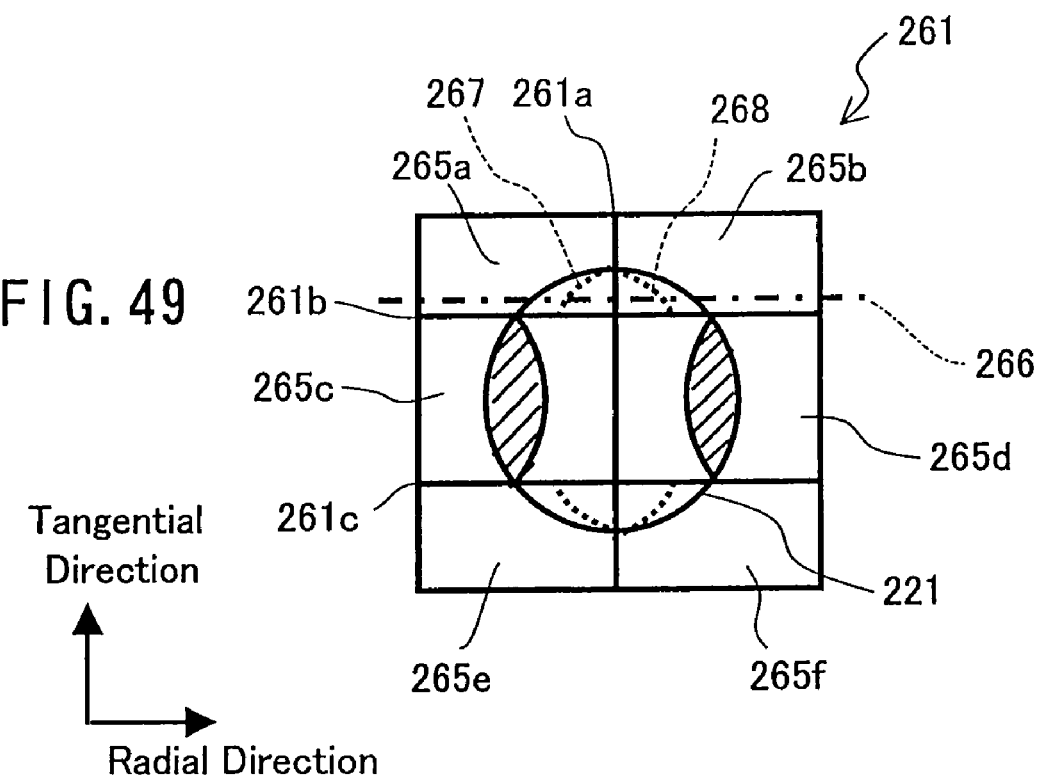
FIG. 49 shows a relationship between a light beam and division of still another exemplary hologram element of the optical information apparatus of Embodiment 20 according to the present invention.

As an example using another divider, FIG. 49 shows a relationship between the division of a hologram element (divider) 261 in still another example and a light beam. The hologram element 261 is used in place of the hologram element 201 described with reference to FIG. 42. The hologram element 261 is divided into 6 regions 265a to 265f by dividing lines 261a, 261b, and 261c. The diffracted light generated from each divided region is incident upon a detection system for detection in a similar manner to that of the example described with reference to FIG. 44.

Figure 50:
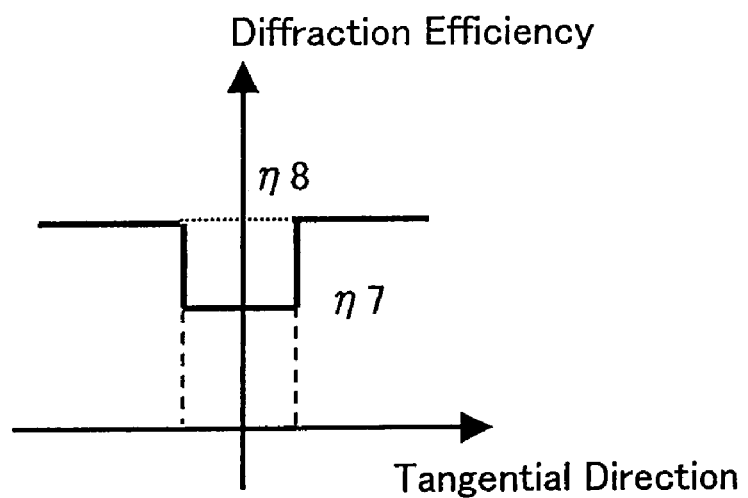
FIG. 50 shows a state of a change in a diffraction efficiency in a tangential direction of still another exemplary hologram element of the optical information apparatus of Embodiment 20 according to the present invention.

FIG. 50 shows a diffraction efficiency distribution along alternate long and short dashed lines 266. A horizontal axis represents a position in a radial direction, and a vertical axis represents a diffraction efficiency. The hologram element 261 is produced so that the diffraction efficiency is η7 at a center, and is η8 higher than η7 at both ends. Broken lines represent intersection points of dotted lines 267, 268 and the alternate long and short dashed lines 266.

Even with such a configuration, among the regions 265a, 265b, 265e, and 265f mainly containing an offset, in the circumferential portion of a light beam where the area is changed largely due to the movement of an objective lens, the efficiency at which a light beam reaches the photodetector 46 (FIG. 41) is high, so that the gain k of the variable gain amplifier can be decreased. Therefore, the amount of an offset due to the fluctuation of an electric offset that is varied depending upon the temperature and the like can be reduced. The diffraction efficiency may be varied along a light beam.

Embodiment 21

In Embodiment 21, a region required for a TE signal is split and divided by a hologram element, and these divided regions are displaced optically for an arithmetic operation.

The configuration of an optical system is substantially the same as that of Embodiment 20, so that the diagram of the configuration is omitted. Embodiment 21 is different from Embodiment 20 in that a hologram element (divider) 301 is used in place of the hologram element 201 described with reference to FIG. 42, and a photodetector light detector) 303 is used in place of the photodetector 46.

Figure 51:
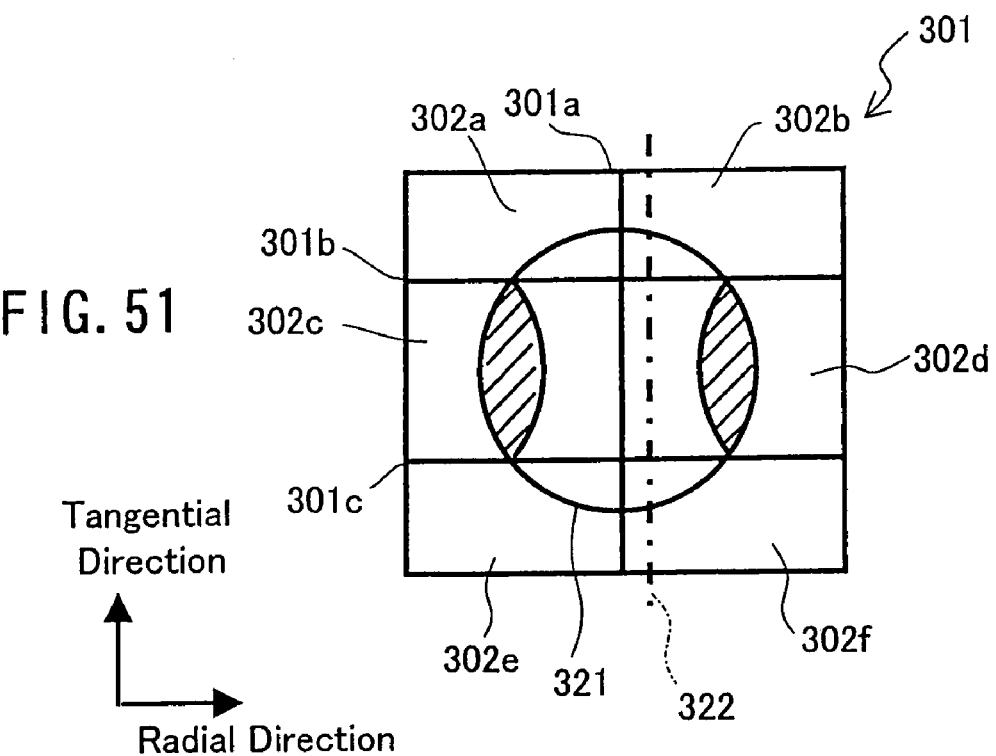
FIG. 51 shows a relationship between a light beam and division of a hologram element of an optical information apparatus of Embodiment 21 according to the present invention.

FIG. 51 shows a relationship between the division of the hologram element (divider) 301 and a light beam. The hologram element 301 is divided into 6 regions 302a to 302f by 3 dividing lines 301a, 301b, and 301c. A light beam 321 is substantially circular, and portions where ±1st order light and 0th order light diffracted by a track of an optical recording medium are overlapped with each other are represented by shaded parts. The shaded parts correspond to regions mainly containing a TE signal. From the regions 302c and 302d, a signal mainly containing a TE signal component can be obtained. On the other hand, from the regions 302a, 302b, 302e, and 302f, a signal mainly containing an offset component of a TE signal can be obtained.

Figure 52:
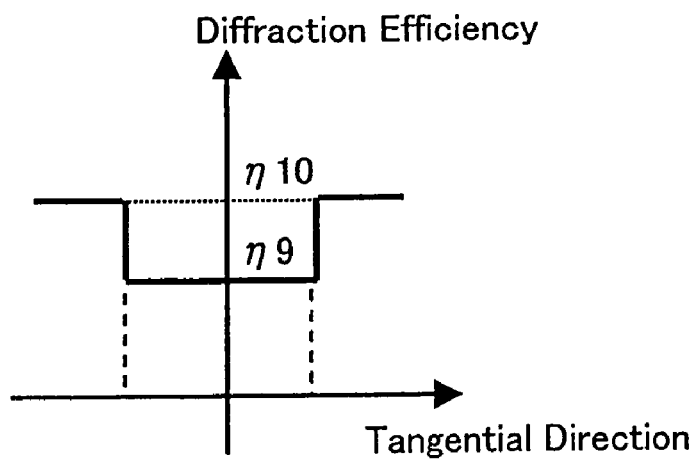
FIG. 52 shows a state of a change in a diffraction efficiency in a tangential direction of the hologram element of the optical information apparatus of Embodiment 21 according to the present invention.

FIG. 52 shows a distribution of a diffraction efficiency along alternate long and short dashed lines 322. A horizontal axis represents a position in a tangential direction (track tangent direction), and a vertical axis represents a diffraction efficiency. Broken lines represent positions of intersection points of the dividing lines 301b, 301c and the alternate long and short dashed lines 322. As shown in FIG. 52, a diffraction efficiency η10 outside of the dividing lines 301b and 301c is set to be about twice a diffraction efficiency η9 inside of the dividing lines 301b and 301c. In this manner, the efficiency at which a light beam in the regions mainly containing an offset component reaches the photodetector is enhanced.

Figure 53:
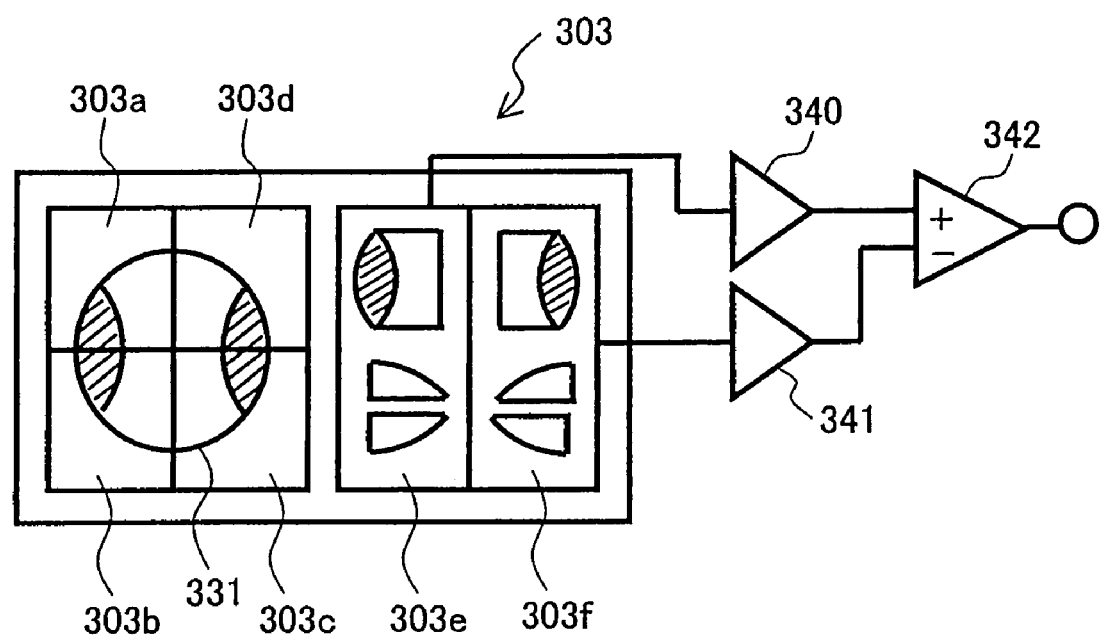
FIG. 53 shows a relationship between a light beam and division of a photodetector of the optical information apparatus of Embodiment 21 according to the present invention and a configuration of an electric circuit.

FIG. 53 shows a configuration of the photodetector 303 and an electric circuit. 0th order light receiving portions 303a to 303d provided in the photodetector 303 receive a light beam 331 that is 0th order light having passed through the hologram element 301. Signals output from the light-receiving portions 303a to 303d are used to detect a FE signal and an information reproducing signal. The light-receiving portions 303e and 303f receive light diffracted by the hologram element 301, and output current signals in accordance with the light amounts thereof. The light-receiving portion 303e receives light having passed through the regions 302b, 302c, and 302f, and the light-receiving portion 303f receives light having passed through the regions 302a, 302d, and 302e.

An IV amplifier (converter) 340 converts the current signal from the light-receiving portion 303e to a voltage signal. An IV amplifier (converter) 341 converts the current signal from the light-receiving portion 303f to a voltage signal. From the regions 302a and 302b, a signal mainly containing a TE signal component can be obtained, and from the regions 302a, 302b, 302e, and 302f, a signal mainly containing an offset component can be obtained. Thus, each light-receiving portion is placed so that regions on different sides with respect to the dividing line 301a belong to the same light-receiving portion. This can reduce an offset due to the movement of an objective lens. A differential arithmetic operation portion 342 receives output signals from the IV amplifiers 340 and 341, and outputs a differential signal thereof. Because of this, even if an objective lens is moved, a TE signal without the fluctuation in an offset is obtained.

In Embodiment 21, two IV amplifiers may be used. Therefore, assuming that an electric offset occurring in each IV amplifier is ΔE on average, an electric offset that is twice ΔE occurs in a corrected TE signal in the worst case. Thus, the amount of an offset that is varied depending upon the temperature and the like can be reduced to ⅓ of the conventional example.

Embodiment 22

In Embodiment 22, a far field is divided by a prism, and is electrically multiplied by a correction coefficient to reduce a TE signal offset.

Figure 54:
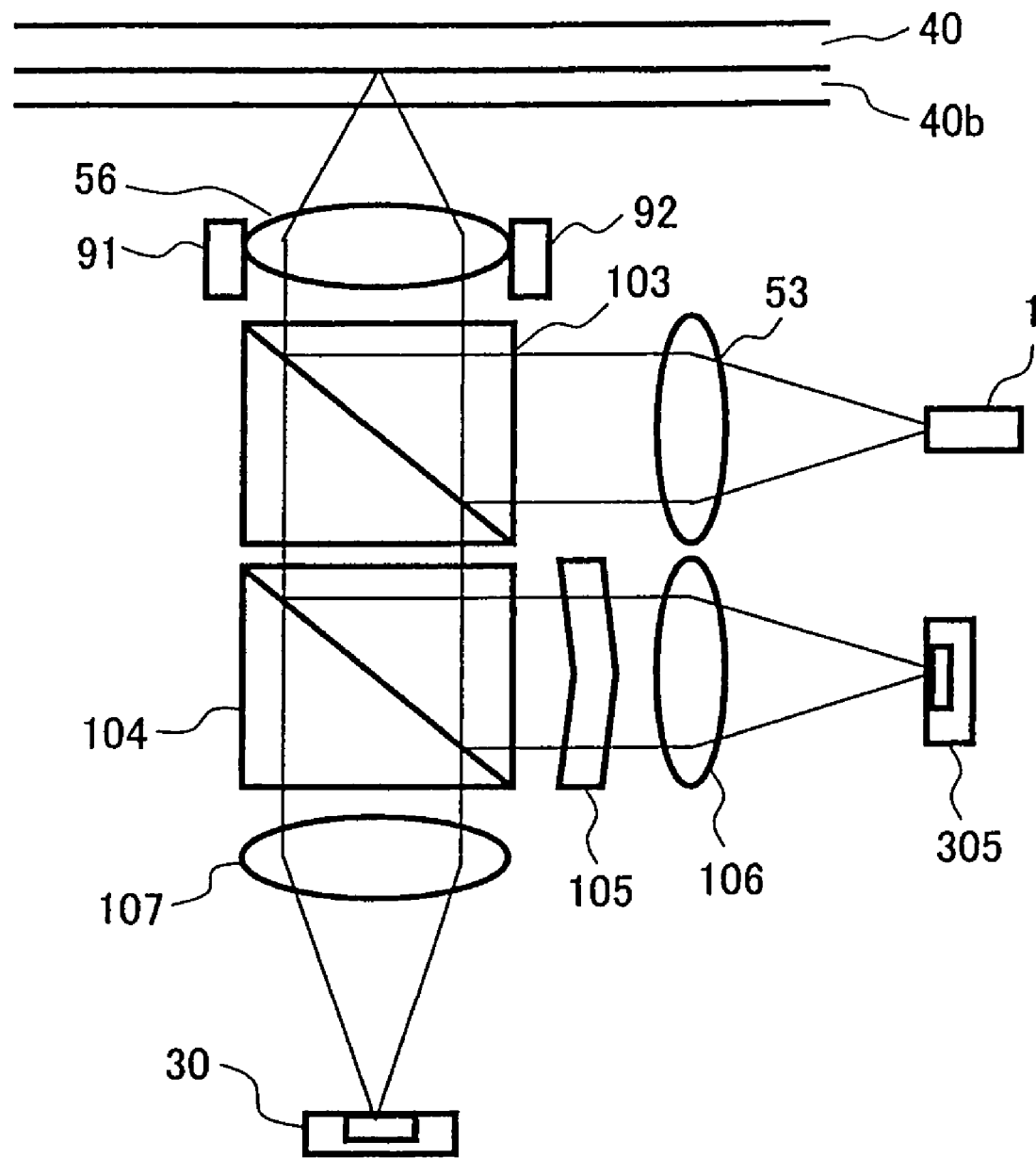
FIG. 54 illustrates a configuration of an optical system of the optical information apparatus of Embodiment 22 according to the present invention.

FIG. 54 shows a configuration of an optical pick-up head constituting an optical information apparatus of Embodiment 22. A light beam emitted from a semiconductor laser (light source) 1 is collimated by a collimator lens 53, reflected from a beam splitter (splitting unit) 103, and condensed onto an information recording surface 40b of an optical recording medium (optical recording medium) 40 by an objective lens (condensing unit) 56. The objective lens 56 is moved in an optical axis direction and in a direction traversing a track in accordance with the deflection of a surface of an optical recording medium and the eccentricity of an optical recording medium by actuators 91 and 92. The light beam reflected/diffracted from the information recording surface 40b passes through the objective lens 56 again to be collimated, and passes through the beam splitter (splitting unit) 103. A part of the light is reflected from a beam splitter (divider) 104, and a part thereof passes therethrough.

The light having passed through the beam splitter 104 is condensed by a detection lens 107, and received by a photodetector light detector) 30. On the other hand, the light reflected from the beam splitter 104 is split by a prism (splitting unit) 105. The split light is condensed by a detection lens 106 to be detected by a photodetector (light detector) 305.

Figure 55:
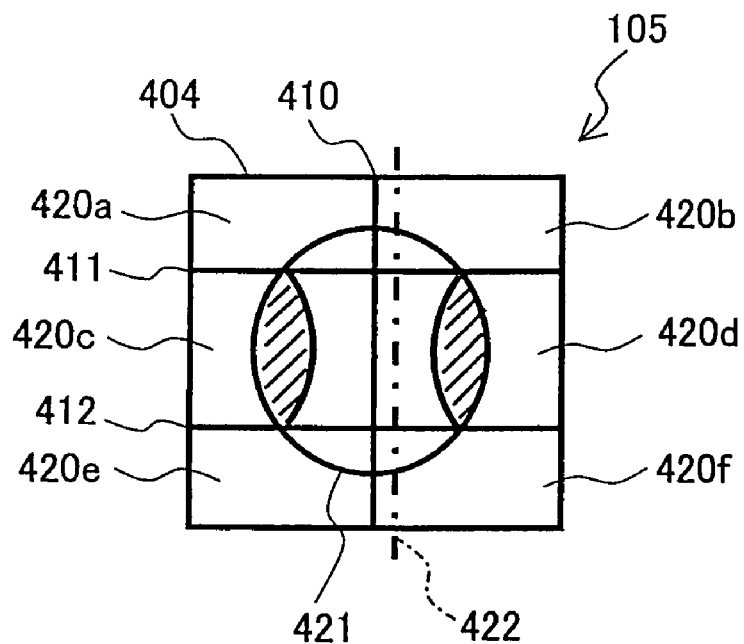
FIG. 55 shows a relationship between a light beam and division of a prism of the optical information apparatus of Embodiment 22 according to the present invention.

FIG. 55 shows a relationship between the division of the prism 105 and a light beam. The prism 105 is divided into 6 regions 420a to 420f by three dividing lines 410, 411, and 412. A light beam 421 is substantially circular, and portions where ±1st order light and 0th order light diffracted by a track of an optical recording medium are overlapped with each other are represented by shaded parts. The shaded parts correspond to regions mainly containing a TE signal. From the regions 420c and 420d, a signal mainly containing a TE signal component can be obtained. On the other hand, from the regions 420a, 420b, 420e, and 420f, a signal mainly containing an offset component of a TE signal can be obtained.

Figure 56:
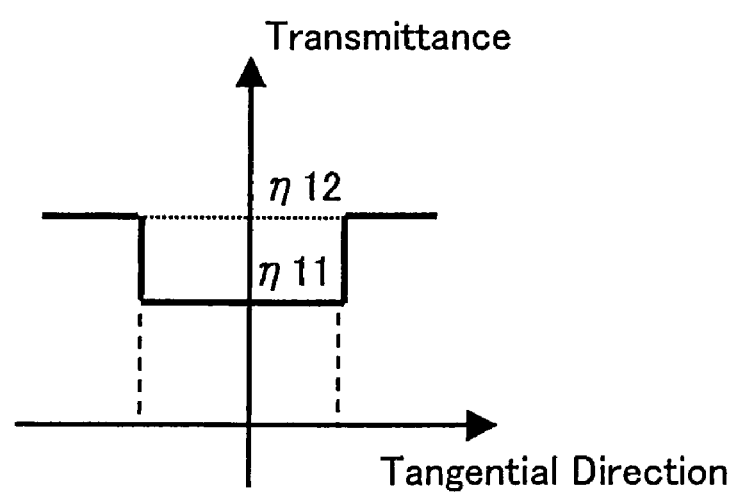
FIG. 56 shows a state of a change in a diffraction efficiency in a tangential direction of a prism of the optical information apparatus of Embodiment 22 according to the present invention.

FIG. 56 shows a distribution of a transmittance along alternate long and short dashed lines 422. A horizontal axis represents a position in a tangential direction (track tangent direction), and a vertical axis represents a transmittance. Broken lines represent positions of the dividing lines 411 and 412. In this manner, a transmittance η12 outside of the dividing lines 411 and 412 is set to be higher than a transmittance η11 inside of the dividing lines 411 and 412. Thus, the efficiency at which a light beam in the regions mainly containing an offset component reaches the photodetector 305 is enhanced.

FIG. 57 shows a configuration of the photodetector 305 and an electric circuit. Six light-receiving portions 305a to 305f receive light reflected from the beam splitter 104 and split by the prism 105, and output current signals in accordance with the light amounts thereof. A light-receiving portion 305c receives light having passed through the region 420c shown in FIG. 55, and a light-receiving portion 305d receives light having passed through the region 420d. From the light-receiving portions 305c and 305d, a signal mainly containing a TE signal component can be obtained. An IV amplifier (converter) 130 converts the current signal from the light-receiving portion 305c to a voltage signal. An IV amplifier (converter) 131 converts the current signal from the light-receiving portion 305d to a voltage signal.

Furthermore, the light-receiving portion 305a receives light having passed through the region 420a. The light-receiving portion 305e receives light having passed through the region 420e. The light-receiving portion 305b receives light having passed through the region 420b. The light-receiving portion 305f receives light having passed through the region 420f. From the light-receiving portions 305a, 305b, 305e, and 305f, a signal mainly containing an offset component can be obtained. An IV amplifier (converter) 132 converts the current signals from the light-receiving portions 305b and 305f to voltage signals. An IV amplifier (converter) 133 converts the current signals from the light-receiving portions 305a and 305e to a voltage signal.

A differential arithmetic operation unit 134 receives output signals from the IV amplifiers 130 and 131 to output a differential signal thereof. This differential signal mainly contains a TE signal component. On the other hand, the differential arithmetic operation portion 135 receives outputs from the IV amplifiers 132 and 133 to output a differential signal thereof. This differential signal mainly contains an offset component. The signal output from the differential arithmetic operation portion 135 is multiplied by a gain k by a variable gain amplifier 136, whereby a signal multiplied by k is output. The differential arithmetic operation portion 137 receives output signals from the differential arithmetic operation portion 134 and the variable gain amplifier 136 to output a differential signal thereof.

The gain k of the variable gain amplifier 136 is determined so that the fluctuation amount of a DC component of a signal output from the differential arithmetic operation portion 135 is equal to the fluctuation amount of a DC component of a signal output from the variable gain amplifier 136 when an objective lens is moved. From the differential arithmetic operation portion 137, a TE signal that is not subjected to offset fluctuation is obtained, even when the objective lens is moved.

The gain k depends upon the ratio between the interval from the dividing lines 411 to 412 and the diameter of the light beam 421, and the light intensity distribution in the light beam 421. Herein, by setting the transmittance η12 of the regions 420a, 420b, 420e, and 420f to be twice the transmittance η11 of the regions 420c and 420d, the gain k can be set to be about 1.

Assuming that the electric offset occurring in each of the IV amplifiers 130 to 133 is ΔE on average, the gain k may be about 1 in Embodiment 22 in the same way as in Embodiment 20. Therefore, an electric offset that is 4 times ΔE occurs in the worst case. Thus, the amount of an offset that is varied depending upon the temperature and the like can be reduced to ⅔ of the conventional example.

In the example in Embodiment 22, the gain that is a coefficient for reducing an offset of a TE signal can be set to be an optimum value on a head or optical recording medium basis in the same way as in Embodiment 20. Therefore, an offset of a TE signal can be minimized. Furthermore, the positions of the dividing lines of the hologram element are determined independently from a diffraction efficiency, so that the degree of freedom can be ensured at which an optimum shape can be used as a dividing pattern. Furthermore, compared with the case of utilizing a hologram element, a loss caused by diffraction is small because of the use of a prism, and light use efficiency can be enhanced; therefore, the influence of an electric offset can be reduced.

Embodiment 23

In Embodiment 23, a part of light is diffracted by a hologram element that is moved integrally with an objective lens, and regions are replaced.

Figure 58:
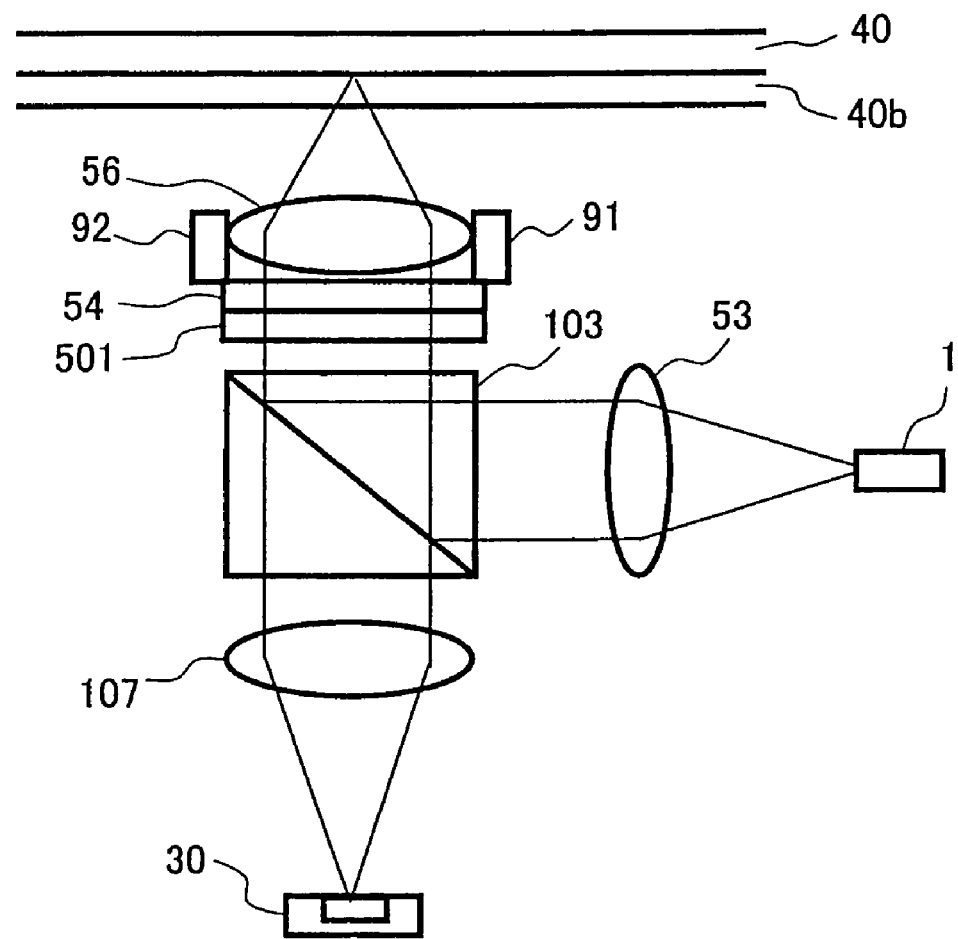
FIG. 58 illustrates a configuration of an optical system of the optical information apparatus of Embodiment 23 according to the present invention.

FIG. 58 shows a configuration of an optical pick-up head constituting an optical information apparatus of Embodiment 23. A linearly polarized light beam emitted from a semiconductor laser (light source) 1 is collimated by a collimator lens 53, is reflected from a beam splitter (splitting unit) 103, passes trough a polarized light hologram element (divider) 501 and a quarter-wavelength plate 54 to be circularly polarized light, and is condensed onto an information recording surface 40b of an optical recording medium 40 by an objective lens (condensing unit) 56. The objective lens 56, the polarized light hologram element 501, and the quarter-wavelength plate 54 are moved in an optical axis direction and in a direction traversing a track in accordance with the deflection of a surface of an optical recording medium and the eccentricity of an optical recording medium by actuators 91 and 92. The light beam reflected/diffracted from the information recording surface 40b passes through the objective lens 56 again to be collimated, and passes through the quarter-wavelength plate 54 to be linearly polarized light whose plane of polarization is shifted by 90° from that of an ingoing light beam.

The linearly polarized light is partially diffracted by the polarized light hologram element 501, and has its traveling direction changed. The light output from the polarized light hologram element 501 passes through a beam splitter (splitting unit) 103, is provided with astigmatism by the detection lens 107, is condensed, and is received by a photodetector (light detector) 30.

Figure 59:
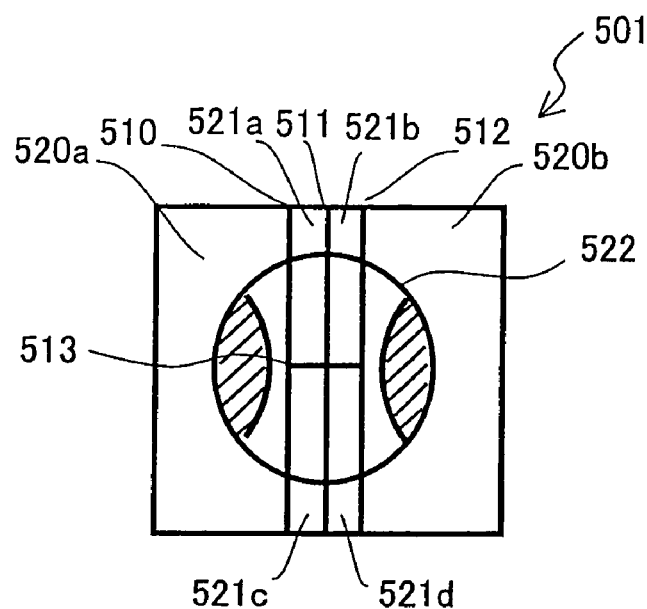
FIG. 59 shows a relationship between a light beam and division of a polarizing hologram element of the optical information apparatus of Embodiment 23 according to the present invention.

FIG. 59 shows a relationship between the division of the polarized light hologram element 501 and a light beam. The polarized light hologram element 501 is divided into 6 regions by 4 dividing lines 510, 511, 512, and 513. Among them, the regions 520a and 520b correspond to a first region mainly containing a TE signal component. The first region has no grooves of the hologram, so that light beams pass therethrough completely. The regions 521a, 521b, 521c and 521d correspond to a second region mainly containing an offset component. The second region has blazed grooves, so that a light beam is diffracted in a particular direction in the second region. The second region is divided into four regions by the dividing line 511 substantially parallel to a track tangent direction and the dividing line 513 substantially parallel to a direction orthogonal to a track.

Figure 60:
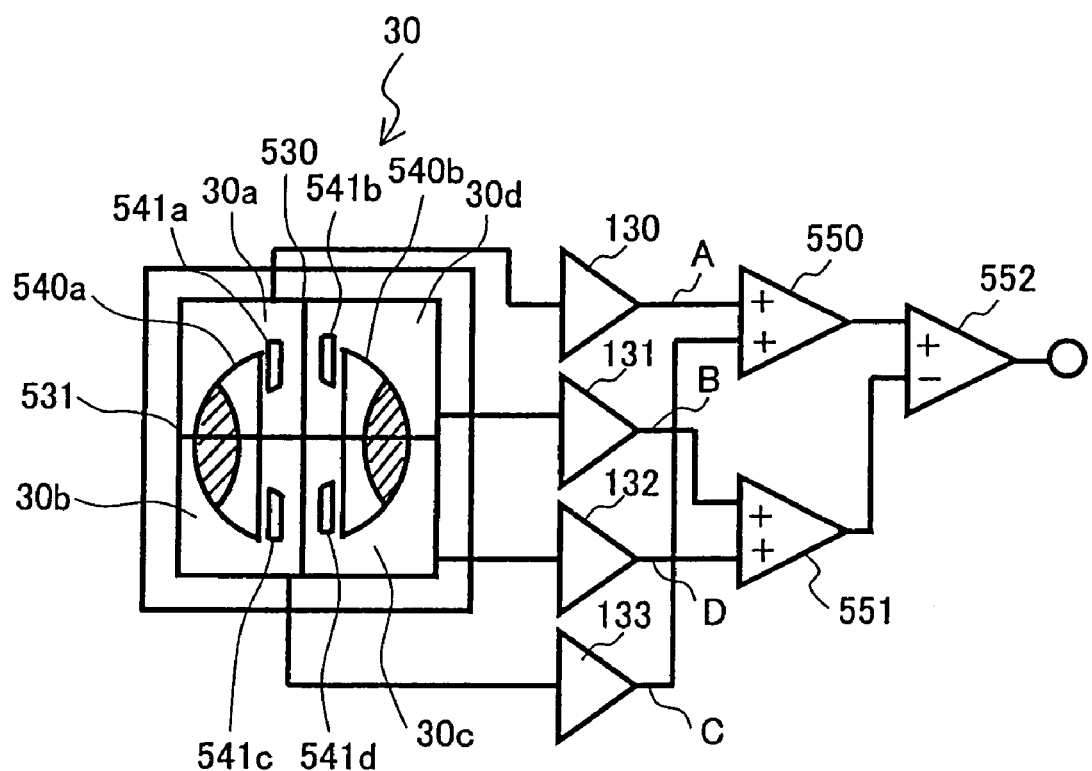
FIG. 60 shows a relationship between a light beam and division of a photodetector of the optical information apparatus of Embodiment 23 according to the present invention and a configuration of an electric circuit.

FIG. 60 shows configurations of the photodetector 30 and an electric circuit. The photodetector 30 is composed of four light-receiving portions 30a to 30d divided by a dividing line 530 substantially parallel to a track tangent direction and a dividing line 531 substantially parallel to a direction orthogonal to a track. Light having passed through the region 520a of the polarized hologram element 501 shown in FIG. 59 becomes a light beam 540a that extends across the light-receiving portions 30a and 30b. Light having passed through the region 520b becomes a light beam 540b that extends across the light-receiving portions 30c and 30d. Thus, the light beam having passed through the regions 520a and 520b mainly containing a TE signal component is split into 4 regions by the dividing lines 510, 512 substantially parallel to a track tangent direction on the hologram element 501 and the dividing line 531 substantially parallel to a direction orthogonal to a track.

On the other hand, light having passed through four regions sandwiched by the dividing lines 510 and 512 shown in FIG. 59 is placed at a position diagonally opposed to the position of the light having passed through the first region. More specifically, the light having passed through the region 521a becomes a light beam 541d and is received by the light-receiving portion 30c, and the light having passed through the region 521b becomes a light beam 541c and is received by the light-receiving portion 30b. The light having passed through the region 521c becomes a light beam 541b and is received by the light-receiving portion 30d. The light having passed through the region 521d becomes a light beam 541a and is received by the light-receiving portion 30a.

The light received by the light-receiving portion 30a is output as a current signal, and converted to a voltage signal by the IV amplifier 130. The signal output from the IV amplifier 130 is defined as a signal A. The light received by the light-receiving portion 30d is output as a current signal, and converted to a voltage signal by the IV amplifier 131. The signal output from the IV amplifier 131 is defined as a signal B. The light received by the light-receiving portion 30b is converted to a voltage signal by the IV amplifier 133. The signal output from the IV amplifier 133 is defined as a signal C. The light received by the light-receiving portion 30c is converted to a voltage signal by the IV amplifier 132. The signal output from the IV amplifier 132 is defined as a signal D.

An adder 550 receives the signals A and C, and outputs a sum (A+C). An adder 551 receives the signals B and D, and outputs a sum (B+D). A differential arithmetic operation portion 552 receives signals from the adders 550 and 551, and outputs a differential signal {(A+C)−(B+D)}. ATE signal can be obtained from the signal of the differential arithmetic operation portion 522.

In this example, a FE signal is detected by the astigmatism method. A light beam is provided with astigmatism by the detection lens 107 shown in FIG. 58. Therefore, when the distance between the objective lens 56 and the optical recording medium 40 is changed, a spot on the photodetector 30 is distorted, whereby the light beam is changed from a substantially circular shape to an elliptical shape to become a focal line. By setting the direction for providing astigmatism so that an angle formed by the focal line and the dividing line of the photodetector 30 is 45°, and generating a signal (A+D)−(B+C), a focus error can be detected.

Furthermore, when using an optical recording medium dedicated to reproducing, on which information is recorded in a pit string, the phase of the signal (A+D) is compared with that of the signal (B+C), whereby tracking control can be performed by a phase difference method. Furthermore, by adding all the four detection signals, a reproducing signal for reproducing information can be obtained.

In Embodiment 23, the polarized light hologram element also is moved simultaneously with the movement of the objective lens. Therefore, there is no relative movement of the dividing lines, and the amount of an offset is small. However, even in this case, due to the influence of the movement of a light amount distribution of a semiconductor laser, an offset occurs. In order to decrease the amount of an offset, regions in the vicinity of the center of a light beam are replaced, whereby detection is performed. Because of this, the influence of the movement of a light amount distribution can be reduced. In this case, by replacing the regions at diagonally opposed positions, a FE signal according to the astigmatism method and a TE signal according to the phase difference method are not influenced largely.

Thus, because of the configuration of Embodiment 23, a TE signal, a FE signal, an information reproducing signal, and a phase difference TE signal can be obtained without an offset by using small number (four) of light-receiving portions and small number of circuits.

Embodiment 24

In Embodiment 24, the light diffracted in Embodiment 23 is condensed in the vicinity of a diffraction-limit. Only the difference between Embodiments 23 and 24 will be described. As an optical configuration, a polarized light hologram element (splitting unit) 307 is used in place of a polarized light hologram element 501.

Figure 61:
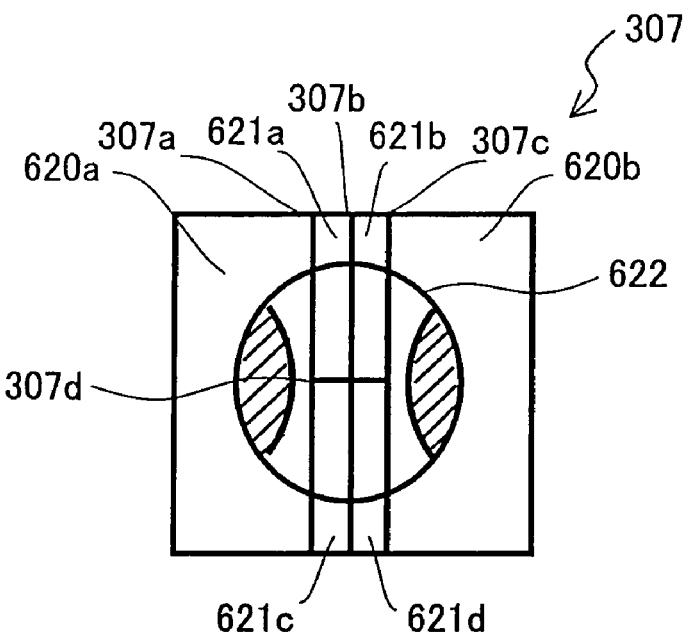
FIG. 61 shows a relationship between a light beam and division of a polarizing hologram element of an optical information apparatus of Embodiment 24 according to the present invention.

FIG. 61 shows a relationship between the division of a polarized light hologram element (splitting unit) 307 and a light beam. The polarized light hologram element 307 is divided into 6 regions by 4 dividing lines 307*a*, 307*b*, 307*c*, and 307*d*. Among them, the regions 620*a* and 620*b* correspond to a first region mainly containing a TE signal component. The first region has no grooves of the hologram, and light beams pass therethrough completely. The regions 621*a*, 621*b*, 621*c*, and 621*d* correspond to a second region mainly containing an offset component of a TE signal. The second region has blazed grooves. In the second region, a light beam is diffracted in a particular direction, and is provided with astigmatism so as to previously cancel the astigmatism provided by the detection lens 107 shown in FIG. 58. The seconds region is divided into 4 regions by a dividing line 307*b* substantially parallel to a track tangent direction and a dividing line 307*d* substantially parallel to a direction orthogonal to a track.

Figure 62:
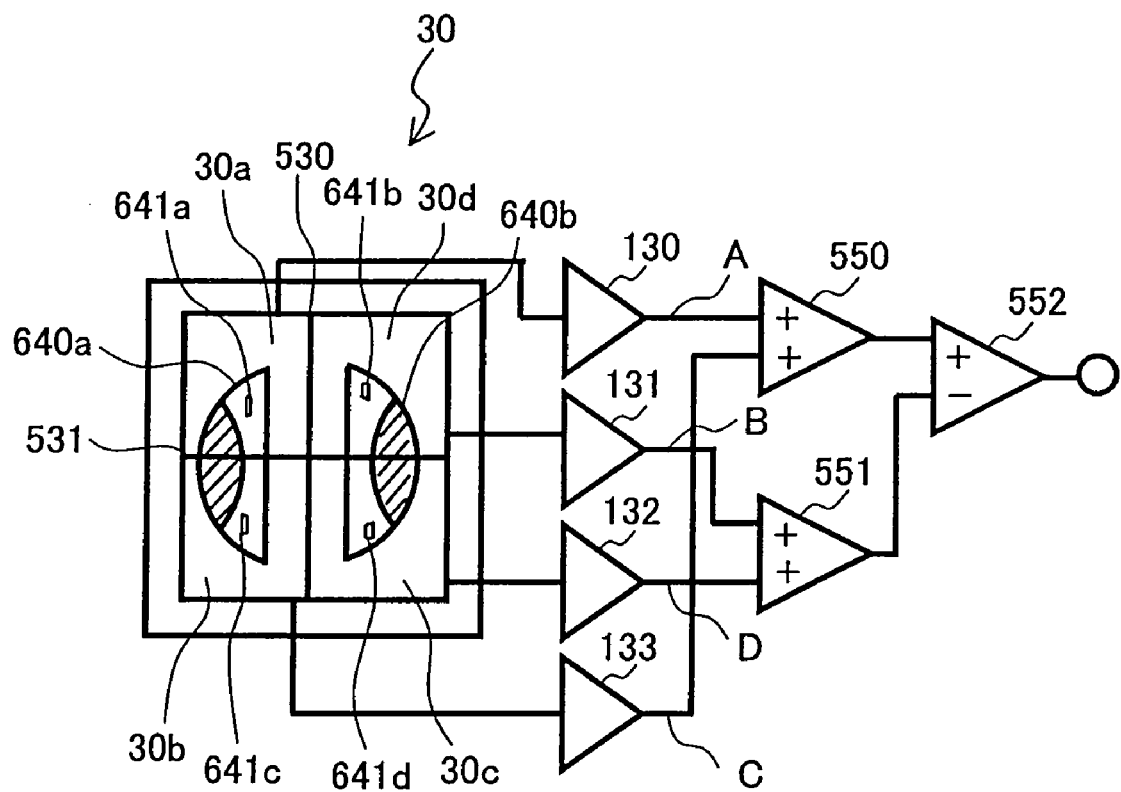
FIG. 62 shows a relationship between a light beam and division of a photodetector of the optical information apparatus of Embodiment 24 according to the present invention and a configuration of an electric circuit.

FIG. 62 shows configurations of the photodetector (light detector) 30 and an electric circuit. The light having passed through the region 620*a* of the polarized light hologram element 307 becomes a light beam 640*a* that extends across light-receiving portions 30*a* and 30*b*. The light having passed through the region 620*b* becomes a light beam 640*b* that extends across light-receiving portions 30*c* and 30*d*. Thus, the light having passed through the regions 620*a* and 620*b* mainly containing a TE signal component is split into 4 regions by the dividing lines 307*a* and 307*c* substantially parallel to a track tangent direction on the hologram element 307 and the dividing line 531 substantially parallel to a direction orthogonal to a track on the photodetector 30.

On the other hand, the light having passed through four regions sandwiched by the dividing lines 307*a* and 307*c* is placed at a position diagonally opposed to the position of the light having passed through the first region. The respective light beams having passed through the four regions have their astigmatism (provided by the detection lens 107) cancelled and are condensed in the vicinity of a diffraction-limit. More specifically, the light having passed through the region 621*a* becomes a light beam 641*d* and is received by the light-receiving portion 30*c*. The light having passed through the region 621*b* becomes a light beam 641*c* and is received by the light-receiving portion 30*b*. The light having passed through the region 621*c* becomes a light beam 641*b* and is received by the light-receiving portion 30*c*. The light having passed through the region 621*d* becomes a light beam 641*a* and is received by the light-receiving portion 30*a*.

An IV amplifier 130 receives the current signal from the light-receiving portion 30*a* and outputs a voltage signal A. An IV amplifier 131 receives the current signal from the light-receiving portion 30*b* and outputs a voltage signal B. An IV amplifier 133 receives the current signal from the light-receiving portion 30*c* and outputs a voltage signal C. An IV amplifier 132 receives the current signal from the light-receiving portion 30*d* and outputs a voltage signal D. Adders 550 and 551 and a differential arithmetic operation portion 522 subject these signals to an arithmetic operation to obtain a signal $\{(A+C)-(B+D)\}$ as a TE signal.

In Embodiment 24, a FE signal, a RF signal, and a TE signal according to the phase difference method are obtained in the same way as in Embodiment 23, and a push-pull signal with less offset is obtained. Furthermore, the light beams 641*a* to 641*d* are condensed. Therefore, even when a focusing shift and a positional shift of a photodetector occur, a light beam does not extend off a light-receiving portion, and a TE signal can be obtained stably.

More specifically, even when an ambient temperature is changed in the case of using an optical recording medium with a low reflectance, an offset fluctuation of a TE signal is small, so that an optical information apparatus capable of recording/reproducing information with high reliability can be realized.

A division pattern for a light beam is not limited to those described in Embodiments 20 to 24. The same effect can be obtained even with other division patterns of a hologram. In particular, herein, the case has been described in which a region (first region) mainly containing a TE signal includes all the regions where a TE signal is generated, and a region (second region) mainly containing an offset component of a TE signal does not include a region where a TE signal is generated. However, the present invention is not limited thereto. The first region may include only a part of a region where a TE signal is generated, and the second region may include a part of a region where a TE signal is generated.

Furthermore, it is not necessary to use all the regions in a light beam so as to generate a TE signal. For example, even in the case where the vicinity of the center of a light beam is not used for generating a TE signal, the present invention is applicable, and its effect can be obtained.

In Embodiment 24, as a unit for splitting a light beam, a hologram element and a prism are used. However, a light-receiving portion of a photodetector may be divided so as to be used as a splitting unit. In this case, in order to change the efficiency for a light beam to reach a photodetector, a filter having different transmittances may be used, and the transmittance of a beam splitter may be changed partially.

Embodiment 25

Figure 63:
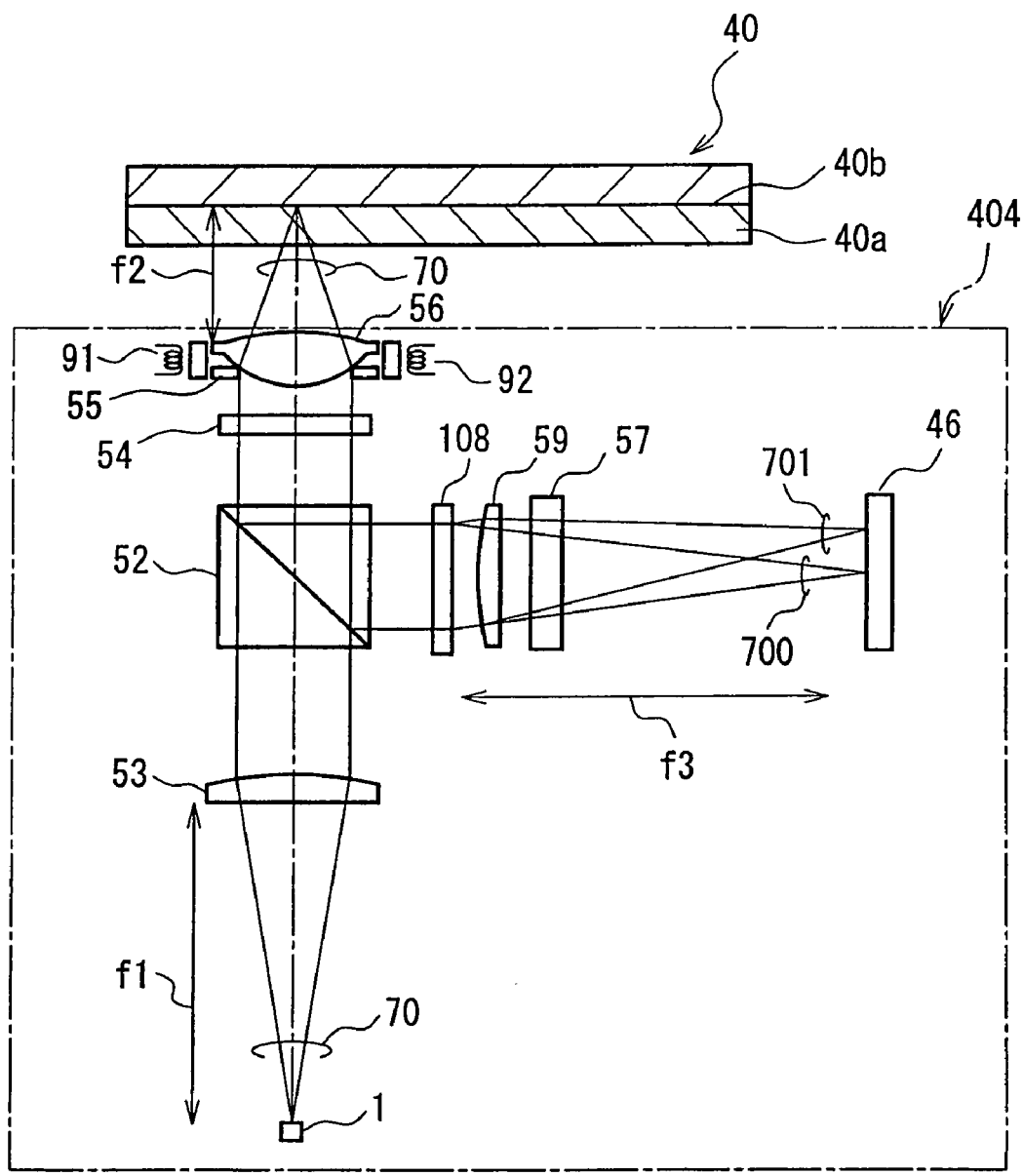
FIG. 63 shows a configuration of an optical pick-up head constituting an optical information apparatus of Embodiment 25 according to the present invention.

FIG. 63 shows an exemplary configuration of an optical pick-up head 404 constituting an optical information apparatus, as an example of still another optical information apparatus of the present invention.

A light source 1 emits a linearly polarized divergent beam 70 with a wavelength λ of 405 nm. The divergent beam 70 emitted from the light source 1 is collimated by a collimator lens 53 with a focal length f1 of 15 mm. The collimated beam 70 passes through a polarized beam splitter 52 and a quarter-wavelength plate 54 to be converted to circularly polarized light. Then, the beam 70 is converted to a convergent beam by an objective lens 56 with a focal length f2 of 2 mm, passes through a transparent substrate 40*a* provided on an optical recording medium 40, and is condensed onto an information recording surface 40*b*. The opening of the objective lens 56 is limited by an aperture 55, and a numerical aperture NA is set to be 0.85. The transparent substrate 40*a* has a thickness of 0.1 mm, and a refractive index n of 1.62.

The beam 70 reflected from the information recording surface 40*b* passes through the objective lens 56 and the quarter-wavelength plate 54 to be converted to linearly polarized light whose plane of polarization is shifted by 90° from an ingoing path, and thereafter, is reflected from the polarized beam splitter 52. A large part of the beam 70 reflected from the polarized beam splitter 52 passes through a beam splitter 108 to be a 0th order diffracted light beam 700, and a part thereof is diffracted to generate a 1st order diffracted light beam 701. The beams 700 and 701 having passed through the beam splitter 108 pass through a detection lens 59 with a focal length f3 of 30 mm and a cylindrical lens 57 to be incident upon a photodetector 46. The beams 700 and 701 are provided with astigmatism when passing through the cylindrical lens 57.

Figure 64:
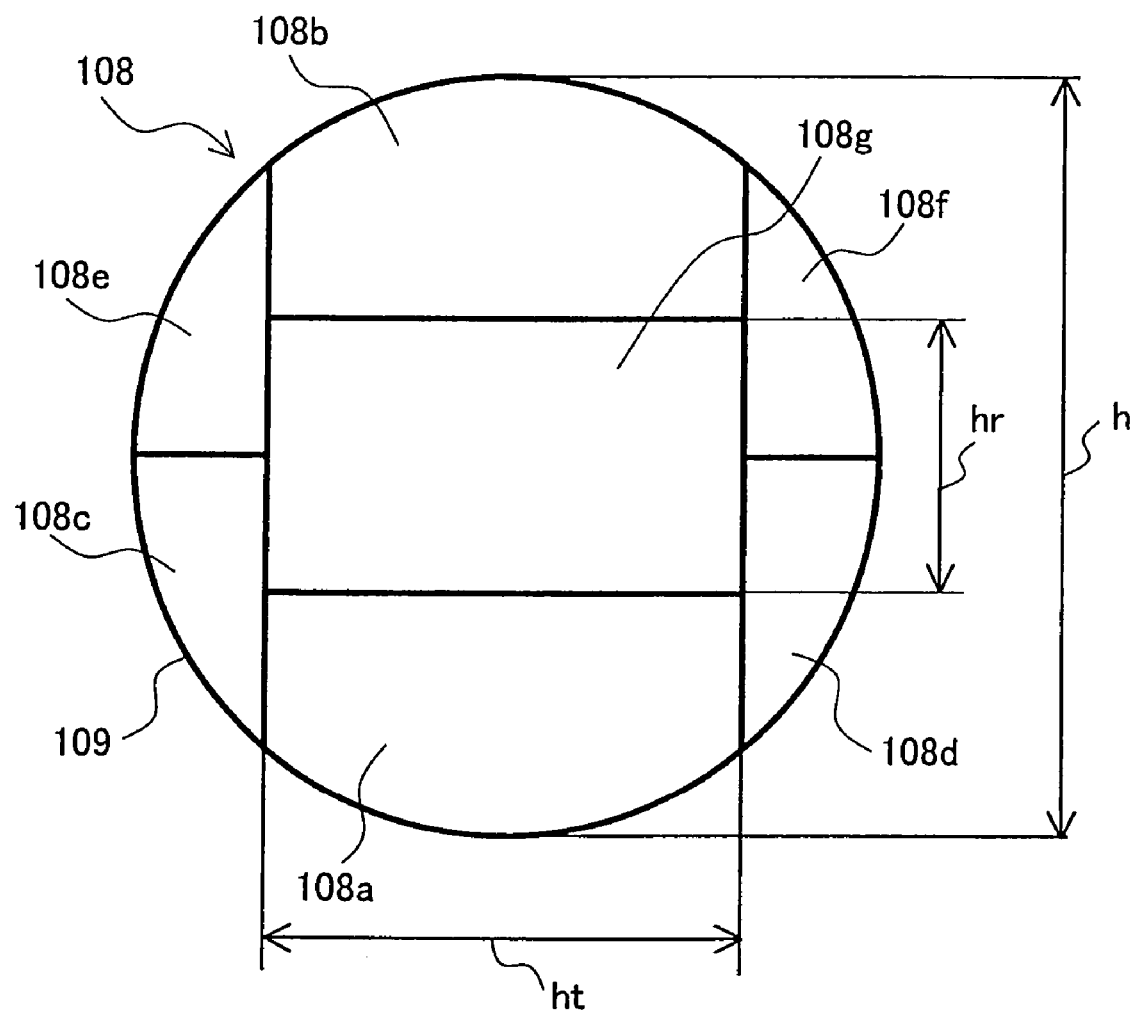
FIG. 64 shows a configuration of a beam splitter constituting an optical information apparatus of Embodiment 25 according to the present invention.

FIG. 64 schematically shows a configuration of the beam splitter 108. The beam splitter 108 has 7 divided regions 108a to 108g. Reference numeral 109 denotes a beam passing through the beam splitter 108. The beam splitter 108 transmits a large part of the incident beam 70 to generate a 0th order diffracted light beam 700 for generating a RF signal, and diffracts a part thereof to generate 1st order diffracted light beams 701a to 70 if for generating a TE signal from the regions 108a to 108f. In FIG. 64, h denotes a diameter of a beam passing through the beam splitter 108, hr denotes a length in a radius direction of the optical recording medium 40 in the region 108g, and ht denotes a length in a track direction of the optical recording medium 40 in the region 108g. In Embodiment 25, the diffraction efficiencies of 0th order diffracted light and 1st order diffracted light in the regions 108a to 108f of the beam splitter 108 at hr/h=0.35 and ht/h=0.65 are 80% and 20%, respectively, and the diffraction efficiency of 0th order diffracted light in the region 108g of the beam splitter 108 is 100%. That is, the beam 70 is allowed to pass through the region 108g in the vicinity of the center of the beam splitter 108, whereby the diffraction efficiency of 0th order diffracted light is set to be higher than that in the regions 108a to 108f on the outer circumferential side of the beam 70.

Figure 65:
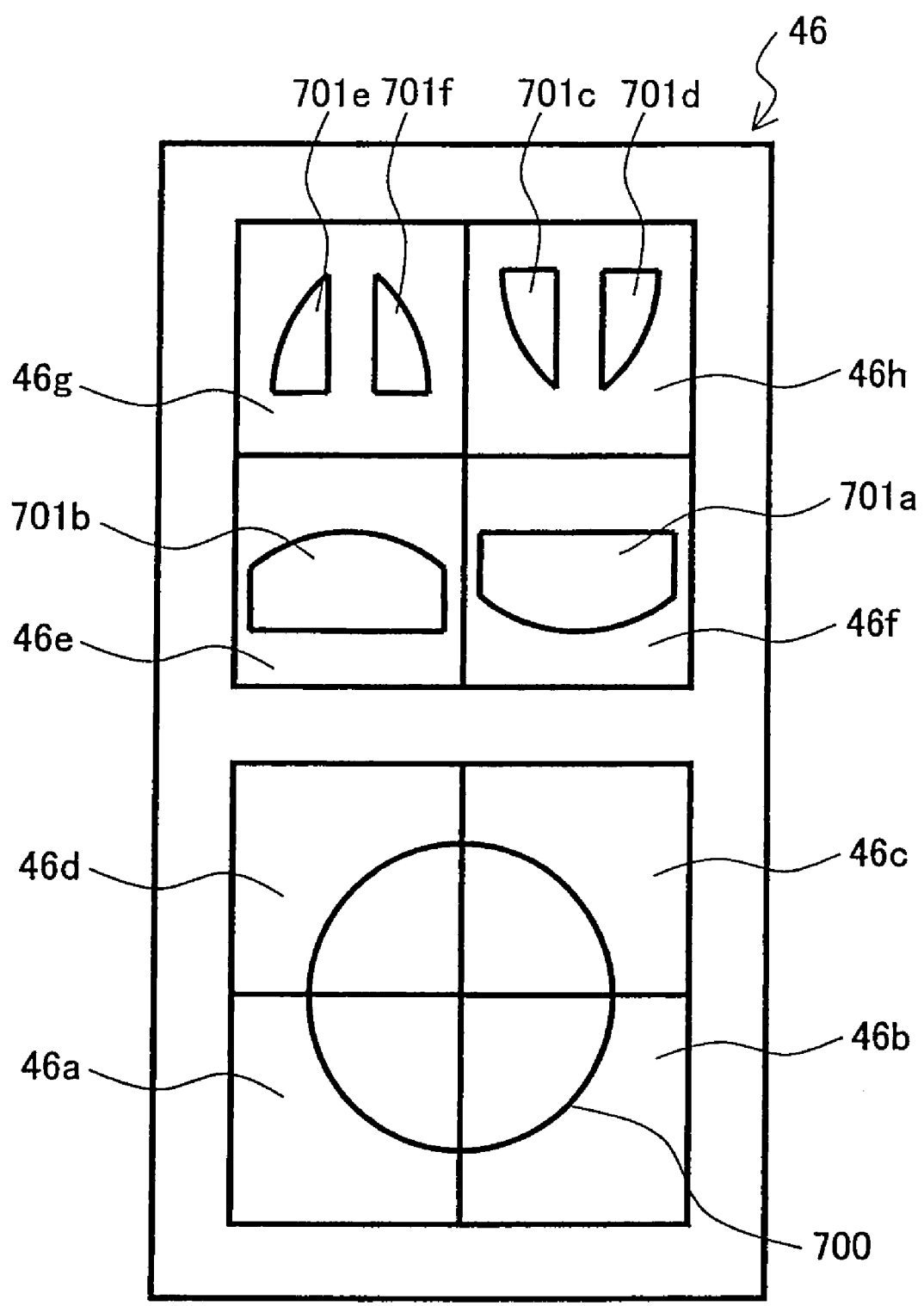
FIG. 65 shows a relationship between a beam and a photodetector constituting an optical pick-up head in the optical information apparatus of Embodiment 25 according to the present invention.

FIG. 65 schematically shows a relationship between the photodetector 46 and the beams 701a to 701g and 700. The photodetector 46 has 8 light-receiving portions 46a to 46h in total. The light-receiving portions 46a to 46d receive the beam 700. The light-receiving portion 46e receives the beam 701b. The light-receiving portion 46f receives the beam 701a. The light-receiving portion 46g receives the beams 701e and 701f. The light-receiving portion 46h receives the beams 701c and 701d. The light-receiving portions 46a to 46h output current signals I46a to I46h in accordance with the respectively received light amount.

AFE signal is obtained by the astigmatism method using the signals I46a to I46d output from the photodetector 46, i.e., by an arithmetic operation (I46a+I46c)−(I46b+I46d).

Furthermore, a TE signal is obtained by an arithmetic operation (I46g−I46h)−k·(I46e−I46f). By optimizing a correction coefficient k, an offset of a TE signal involved in the movement of the objective lens 56 in a radius direction can be corrected. Furthermore, a TE signal is generated without using the region (the region 108g of the beam splitter 108) in the vicinity of the center of a beam. This is based on the following principle: a number of fluctuation components are concentrated in the vicinity of the center of the beam when a track to be formed on the optical recording medium 40 is formed by being fluctuated from a pitch tp; therefore, the fluctuation can be reduced by avoiding the use of the fluctuation component generated in the vicinity of the center of the beam. For example, in the case where a positional shift of a track occurs every three tracks, three tracks should be considered as one periodic structure. The pitch in this case is three times of tp. The diffracted light from this periodic structure has a long pitch, so that the diffraction angle of the beam is smaller accordingly. That is, 1st order diffracted light from the periodic structure is concentrated at the center of the beam.

ARF signal is obtained by an arithmetic operation (I46a+I46c+I46b+I46d). Thus, the RF signal is generated based on the 0th order diffracted light 700 having passed through 7 regions 108a to 108g of the beam splitter 108.

Furthermore, the beam 70 passes through the region 108g in the vicinity of the center of the beam splitter 108. Therefore, compared with a conventional optical information apparatus in which the beam reflected from the optical recording medium 40 is split to 0th order diffracted light and 1st order diffracted light to generate a RF signal from 0th order diffracted light, the light amount of the 0th order diffracted light beam 700 is increased, so that a S/N for reading information recorded on the optical recording medium 40 is enhanced. Accordingly, an optical information apparatus capable of reproducing information recorded on the optical recording medium 40 with high reliability can be realized.

Figure 66:
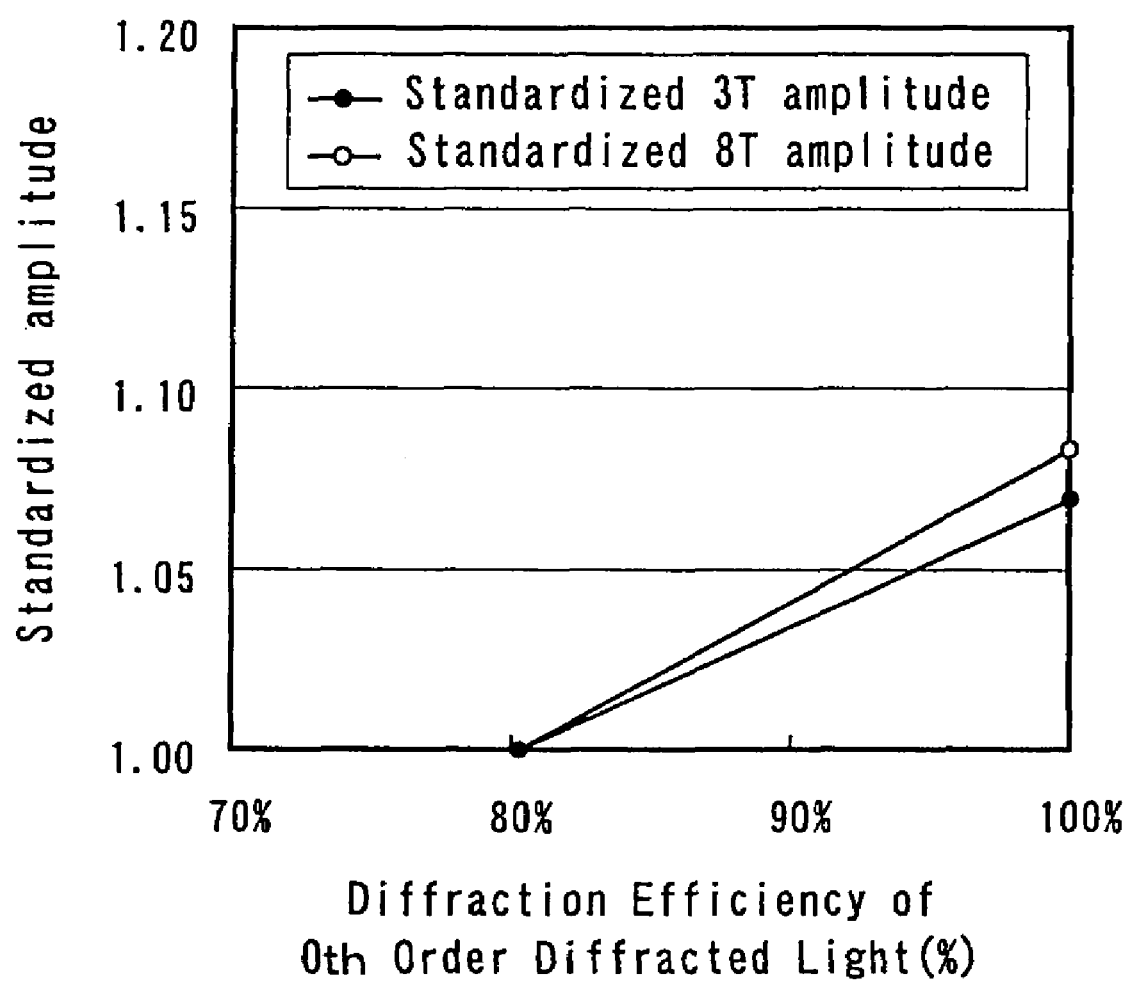
FIG. 66 shows a state of an amplitude with respect to an efficiency of 0th order diffracted light in a region in the vicinity of a center of a beam splitter obtained in the optical information apparatus of Embodiment 25 according to the present invention.

FIG. 66 shows a relationship of 3T and 8T amplitudes with respect to the diffraction efficiency of 0th order diffracted light in the region in the vicinity of the center of a beam. The conditions are follows: 8-14 modulation, 3T mark length=0.23 μm, ht/h=0.65, hr/h=0.35, and the 0th order diffraction efficiency in the regions 108a to 108f other than the region in the vicinity of the center of a beam splitter is 80%. In FIG. 66, ● represents a standardized 3T amplitude, and ○ represents a standardized 8T amplitude. The 3T and 8T amplitudes are standardized with the amplitude in the case where the 0th order diffraction efficiency of the region 108g in the vicinity of the center of the beam splitter 108 is 80%. By increasing the diffraction efficiency of 0th order diffracted light in the region 108g in the vicinity of the center of a beam from 80% to 100%, the 3T and 8T amplitudes are improved by about 7% and 8%, respectively When the 0th order diffraction efficiency in the region in the vicinity of the center of a beam is increased as in Embodiment 25, the S/N of a RF signal can be enhanced without influencing the characteristics of a TE signal.

Furthermore, the effect in Embodiment 25 can be obtained by using any modulation system, instead of the 8-14 modulation. In the case where the modulation system in which a shortest mark length is 2T, modulation such as 1-7 modulation is used together with a signal detection method by a partial response (PRML), and if the condition (e.g., 2T=0.15 μm, 3T=0.25 μm) under which the amplitude of a 3T signal is enhanced is set, an error ratio is decreased noticeably.

The beam splitter 108 in Embodiment 25 may be a non-polarized type element, so that it can be produced by very inexpensive resin molding. Therefore, an optical information apparatus that is inexpensive accordingly can be provided.

In Embodiment 25, the case has been described in which the shape of the region in the vicinity of the center of the beam splitter 108 is rectangular. However, the division pattern of the region in the vicinity of the center of the beam splitter 108 is not limited thereto. For example, even with the division pattern as shown in FIG. 28, the same effect can be obtained.

In Embodiment 25, the beam splitter 108 is placed in the optical path from the polarized beam splitter 52 to the photodetector 46. However, the beam splitter 108, the quarter-wavelength plate 54, and the objective lens 56 may be integrated with each other. In this case, the beam splitter 108 is composed of a polarization-dependent element, whereby the beam splitter 108 is allowed to transmit all the incident beams 70 in an ingoing path from the light source 1 to the optical recording medium 40. On the other hand, in a return path in which a beam reflected from the optical recording medium 40 travels to the photodetector 46, a large part of the beam 70 incident upon the beam splitter 108 passes through the beam splitter 108 to be the 0th order diffracted light beam 700, and a part thereof is diffracted to generate a plurality of 1st diffracted light beams 701. In the case where the beam splitter 108, the quarter-wavelength plate 54, and the objective lens 56 are integrated with each other, the positional relationship between the beam 70 and the region 108g is kept constant at all times. Therefore, the increase ratio of a 3T signal becomes constant, and information recorded on an optical recording medium can be reproduced more stably.

Embodiment 26

Figure 67:
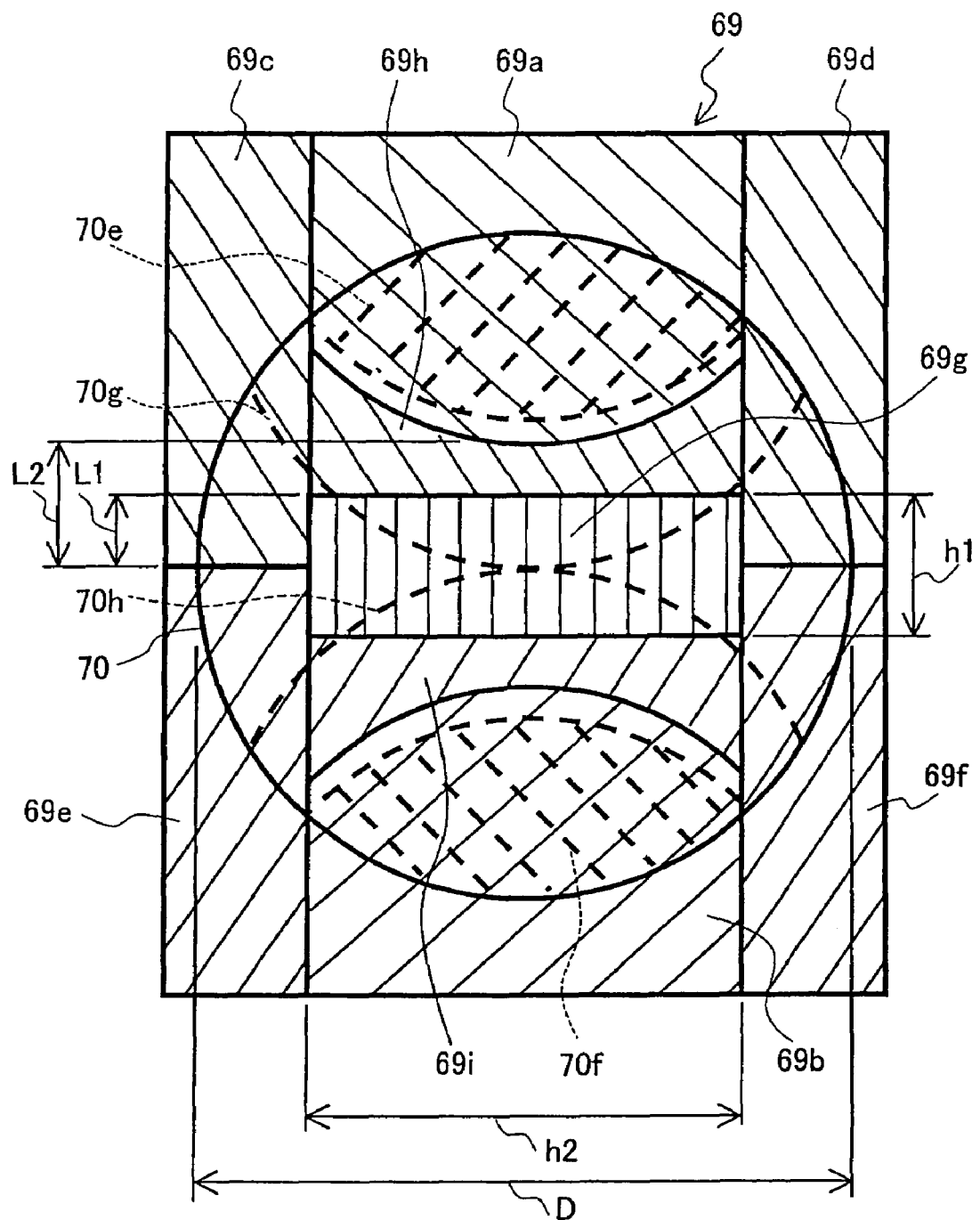
FIG. 67 shows a configuration of a beam splitter constituting the optical information apparatus of Embodiment 26 according to the present invention.

FIG. 67 schematically shows a beam splitter 69 constituting an optical pick-up head, as an example of another optical information apparatus of the present invention. By using the beam splitter 69 in place of the beam splitter 68 in Embodiment 16, an optical pick-up head in Embodiment 26 can be configured.

Regions 69a to 69g of the beam splitter 69 correspond to the regions 68a to 68g of the beam splitter 68, and generate 1st order diffracted light. The region 69h of the beam splitter 69 corresponds to the regions 68h and 68i of the beam splitter 68, and generates 1st order diffracted light. The region 69i of the beam splitter 69 corresponds to the regions 68j and 68k of the beam splitter 68, and generates 1st order diffracted light. The beam splitter 69 is different from the beam splitter 68 in that the width of the region 69h of the beam splitter 69 corresponding to the regions 68h and 68i of the beam splitter 68 is enlarged, and the width of the region 69a is smaller than that of the region 68a accordingly. This also applies to the relationship among the regions 68j, 68k, 69i, 69b, and 68b.

In the case where information is recorded as a mark string in which a complex reflectance is changed every other track as shown in FIG. 33, a mark string recorded on the optical recording medium behaves as a diffraction grating in which a pitch is twice tp. Thus, a beam radiated to the optical recording medium is diffracted by a groove-shaped track with a pitch of tp and a diffraction grating with a pitch of 2·tp.

In FIG. 67, broken-line regions 70e and 70f represent an image of 1st order diffracted light diffracted by the groove-shaped track having a pitch of tp of the optical recording medium in the beam 70. On the other hand, broken lines 70g and 70h represent the position of the innermost circumference of the image of 1st order diffracted light diffracted by the diffraction grating with a pitch of 2·tp in the beam 70. Although not shown in detail for simplicity, the 1st order diffracted light diffracted by the diffraction grating with a pitch of 2·tp is incident from the broken lines 70g and 70h to the outside of the beam 70 (i.e., the region facing the regions 70e and 70f).

The fluctuation in symmetry of a TE signal is caused by the diffracted light generated by the diffraction grating with a pitch of 2·tp. In the regions 69a, 69c, and 69d, the amount of incident 1st order diffracted light diffracted by the diffraction grating with a pitch of 2·tp is compared, and the incident amount in the region 69a is much larger than the sum of the incident amounts in the regions 69c and 69d. This also applies to the regions 69b, 69e, and 69f.

As described above, when a TE signal is generated, the signal obtained from the region 69a and the signal obtained from the regions 69c, 69d are multiplied by a coefficient and subjected to subtraction. Therefore, a component to be fluctuated in a TE signal contained in the region 69a is reduced. However, the amount of 1st order diffracted light diffracted by the diffraction grating with a pitch of 2·tp contained in the regions 69c and 69d may be insufficient for eliminating a fluctuation component from a TE signal by subtraction.

In Embodiment 26, the area of the region 69h is enlarged. The polarity of the signal obtained from the region 69h is the same as that of the signal obtained from the regions 69c and 69d. Therefore, by enlarging the area of the region 69h, the fluctuation in a TE signal can be reduced sufficiently. Herein, assuming that the radius of the beam 70 on the beam splitter 69 is 1, the width h1 of the region 70h is set to be 0.70, and the width L2 from the center of the beam splitter 69 to the innermost side of the region 69a is 0.40. These widths are shown merely for illustrative purpose, and they may be designed appropriately, considering the characteristics of an optical recording medium, the numerical aperture of an optical system, the wavelength of a light source, and the like.

Even in the case where the amplitude of a TE signal is fluctuated when the reflectance of a mark formed on an optical recording medium is changed, by using the beam splitter 69 in Embodiment 26, the fluctuation in a TE signal is alleviated, and an optical information apparatus capable of performing a tracking operation stably can be provided. The optical information apparatus of the present embodiment is particularly effective in the case where an optical recording medium having a large reflectance ratio is used (i.e., the ratio of a reflectance between a recorded state and an unrecorded state is 3 or more).

It should be appreciated that, as described in Embodiment 10, the amplitude of a TE signal can be stabilized further by controlling the amplitude of a TE signal, using a variable gain amplifier.

Furthermore, herein, for simplicity of description, the case where information is recorded on every other track as shown in FIG. 33 has been described. However, various pitches may be used depending upon the positional relationship between a recorded track and an unrecorded track. In any case, a pitch is longer than the pitch tp in terms of equivalence, and the effect in the case of using the beam splitter 69 in Embodiment 26 can be obtained. In particular, there is no limit to recording of information in a track. Furthermore, even in the case where the pitch of an unrecorded track is partially varied, the effect in the case of using the beam splitter in Embodiment 26 can be obtained.

Embodiment 27

Figure 68:
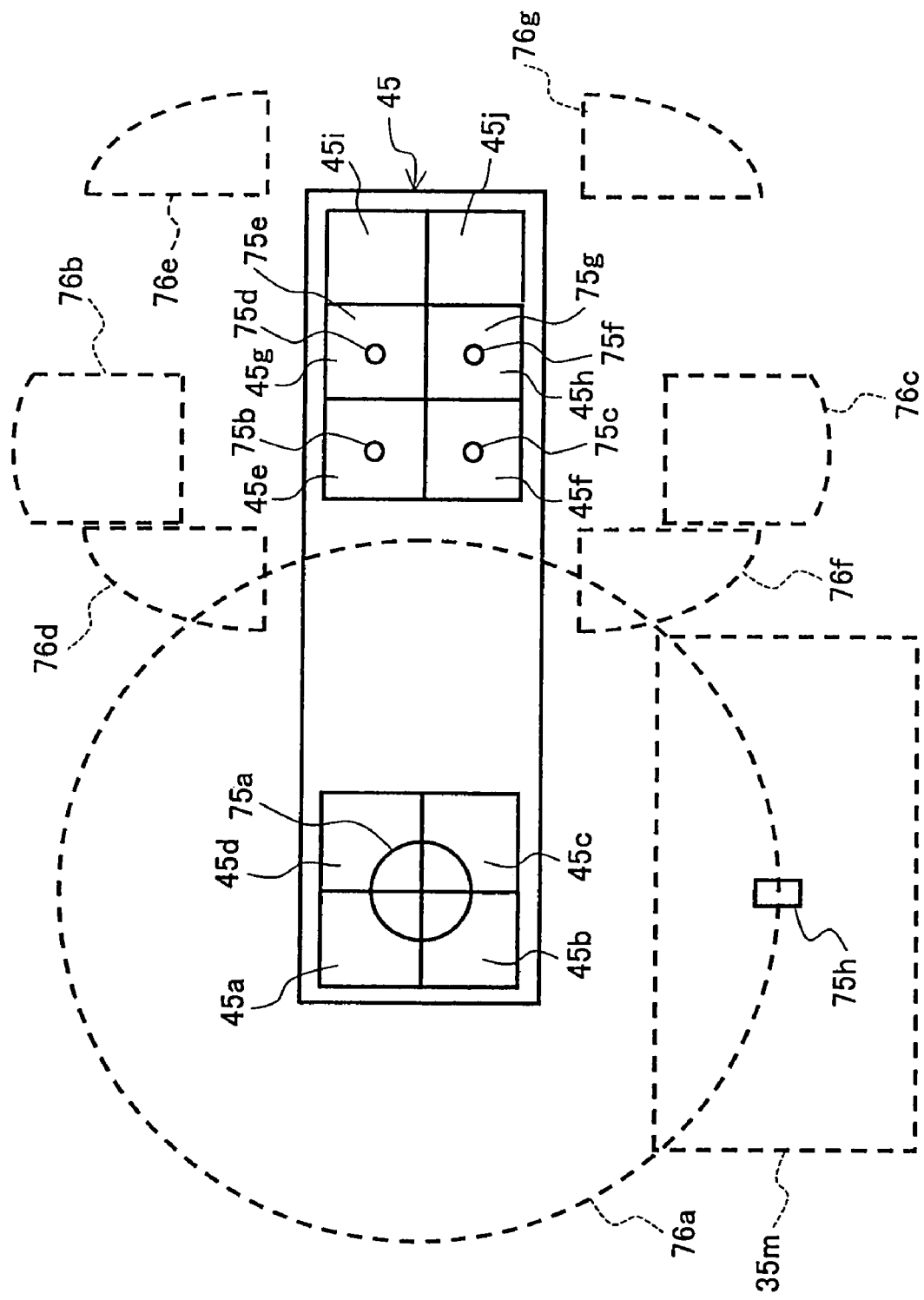
FIG. 68 shows a relationship between a beam and a photodetector constituting an optical information apparatus of Embodiment 27 according to the present invention.

FIG. 68 schematically shows an example of a relationship between a photodetector 45 constituting an optical pick-up head and the beams 75a to 75h, and 76a to 76h, as an example of another optical information apparatus of the present invention. By using the photodetector 45 in place of the photodetector 46 in Embodiment 11, and using a signal processing portion (described later) for generating a TE signal, an optical pick-up head in Embodiment 27 can be configured.

In the optical pick-up head in the present embodiment, the beams 75d and 75e are received by one light-receiving portion 45g in the same way as in the optical pick-up head in Embodiment 11, and the beams 75f and 75g are received by one light-receiving portion 45h, respectively. A beam used for generating a TE signal is not incident upon the light-receiving portions 45i and 45j.

Figure 69:
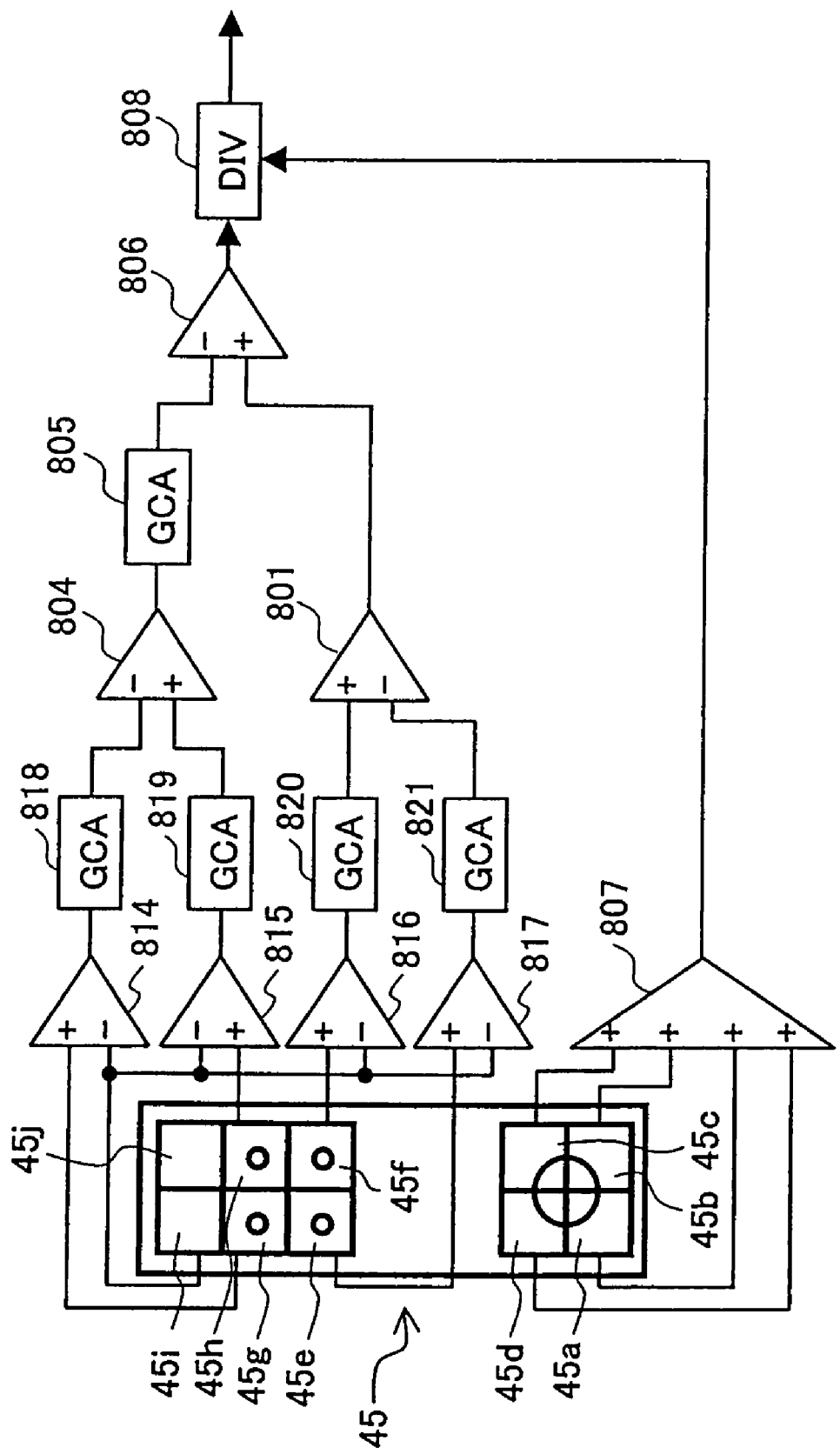
FIG. 69 shows a configuration of a signal processing part constituting the optical information apparatus of Embodiment 27 according to the present invention.
Figure 70:
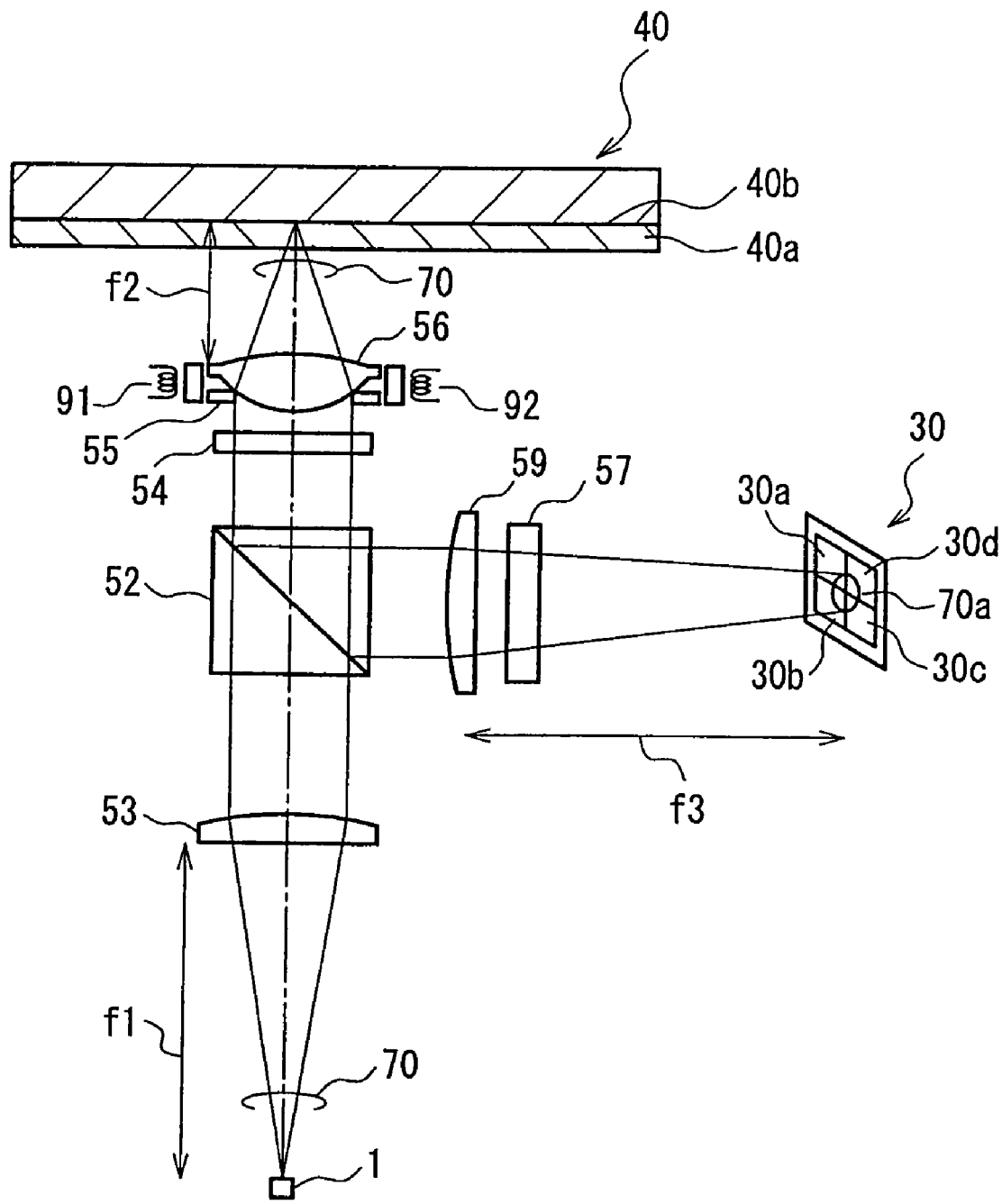
FIG. 70 shows a configuration of an optical pick-up head constituting a conventional optical information apparatus.
Figure 71:
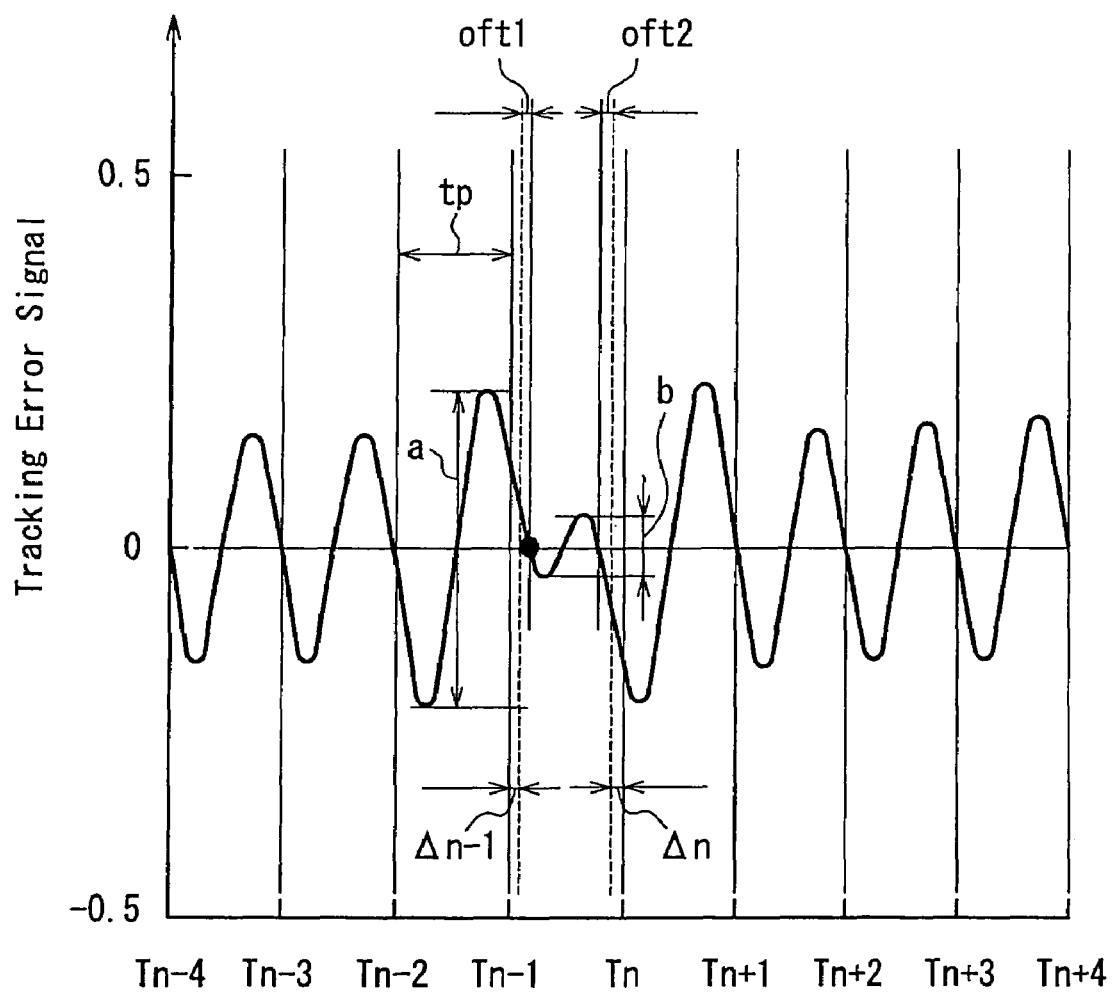
FIG. 71 shows a state of a TE signal obtained in the conventional optical information apparatus.

FIG. 69 shows a configuration of a signal processing portion for generating a TE signal. This signal processing portion is different from the signal processing portion in Embodiment 10 described with reference to FIG. 23 as follows: the beams 75d and 75e are received by one light-receiving portion 45g, and the beams 75f and 75g are received by one light-receiving portion 45h, so that the adders 802 and 803 are not necessary; and differential arithmetic operation portions 814 to 817 and variable gain amplifiers 818 to 821 are provided.

The differential arithmetic operation portions 814 to 817 receive signals output from the light-receiving portions 45e to 45h and subtract the signal output from the light-receiving portion 45i from the signals output from the light-receiving portions 45e to 45h. Unnecessary stray light, such as light randomly reflected from a peripheral portion of an optical component constituting the optical pick-up head, natural light emitted from a light source, and the like, may be incident upon the light-receiving portions 45e to 45i. This unnecessary stray light is mostly composed of a largely diverged beam on the photodetector 45, and substantially the same amount of stray light is incident upon the light-receiving portions 45e to 45i. The light-receiving portion 45i does not receive a beam used for generating a TE signal. Therefore, the signal output from the light-receiving portion 45i is caused by stray light. By providing the differential arithmetic operation portions 814 to 817, a signal caused by stray light can be reduced from the signal output from the light-receiving portions 45e to 45h. Since the light-receiving portion 45j is not used, it is not necessarily required to provide the photodetector 45.

The signals output from the differential arithmetic operation portions 814 to 817 are input to the variable gain amplifiers 818 to 821, and adjusted to desired signal levels. Herein, the gains of the variable gain amplifiers 820 and 821 are adjusted so that the signal levels based on the light amounts of the beams divided by a beam splitter incident upon the light-receiving portions 45e and 45f are equal to each other, when actuators are placed in a neutral position. Similarly, the gains of the variable gain amplifiers 818 and 819 are adjusted so that the signal levels based on the light amounts of the beams divided by the beam splitter incident upon the light-receiving portions 45g and 45h are equal to each other. The methods for processing the signals output from the variable gain amplifiers 818 to 821 are the same as those in Embodiment 10. Even in the case where defects and fingerprints, which may change a reflectance, adhere to an optical recording medium, unintended fluctuation is caused less in the signals output from the differential amplifiers 804 and 801, and a stable tracking operation can be performed.

Herein, the light-receiving portion 45i is used for detecting stray light; however, the light-receiving portion 45j may be used in place of the light-receiving portion 45i.

Furthermore, since the sizes of the light-receiving portions 45e to 45h, and 45i are set to be the same, a differential arithmetic operation is performed simply. However, the same effect can be obtained even in the case where both the light-receiving portions 45i and 45j are used (i.e., a light-receiving portion with a double area is used) for detecting stray light, and the signals output from the light-receiving portions 45i and 45j are subjected to a differential arithmetic operation after being attenuated to ½. By enlarging the area of a light-receiving portion for detecting stray light, the influence of the bias in the distribution of stray light can be alleviated. Therefore, a signal caused by stray light can be eliminated with good precision.

Embodiments 1 to 27 described above are examples, and various embodiments can be used in a range without departing the spirit of the present invention. It should be appreciated that various alterations such as the use of a non-polarization optical system may be made in a range without departing the spirit of the present invention. AFE signal detection system other than the astigmatism method has not bee described since it is not related to the spirit of the present invention. However, there is no particular limit to a detection system of a FE signal. All the general FE signal detection systems, such as a spot size dictation method, a Fourcault method, and the like, can be used.

Furthermore, even in the case of using an optical recording medium in which a TE signal amplitude is fluctuated when there is a variation in a position, a width, and a depth of a track in the course of production of the optical recording medium or information is recorded in a track, the fluctuation in a TE signal amplitude can be reduced, and a stable tracking operation can be performed in all the optical information apparatuses of the above-mentioned embodiments. Therefore, an inexpensive optical recording medium can be provided in improved yield.

Furthermore, an optical recording medium in which a TE signal amplitude is fluctuated can be used according to the present invention. Therefore, an original master of an optical recording medium can be cut with a laser beam at a high speed, instead of cutting with an electron beam. This enables an original master to be produced at a low cost, and an optical recording medium that is inexpensive accordingly can be provided.

Herein, the wavelength $\lambda$ of the light source 1 is set to be 405 nm, and the numerical aperture NA of the objective lens 56 is set to be 0.85. The optical information apparatus of the present embodiment exhibits the features described above remarkably, in particular when tp/$0.8<\lambda$/NA$<0.5$ μm.

Furthermore, when a diffraction element is used for a beam splitter, ±1st order diffracted light generally is generated. However, in the case of using conjugate light, light-receiving portions receiving the respective beams of conjugate light may be provided. In the case where conjugate light is not used, a diffraction element is blazed so as to enhance a light use efficiency.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical information apparatus, comprising:
   an optical pick-up head including:
   a light source emitting a light beam;
   a diffraction unit receiving a beam emitted from the light source to generate a plurality of diffracted beams composed of a 0th order diffracted light beam and a 1st or higher order diffracted light beam;
   a condensing unit receiving the plurality of diffracted beams from the diffraction unit and condensing the beams onto an optical recording medium;
   a beam splitter receiving the plurality of beams reflected from the optical recording medium and splitting the beams; and
   a photodetector receiving the beams split by the beam splitter and outputting signals in accordance with amounts of the received light beams,
   wherein the 0th order diffracted light beam generated in the diffraction unit is set to be a main beam, and two 1st or higher order diffracted light beams generated in the diffraction unit are set to be a first sub-beam and a second sub-beam,
   the photodetector has a plurality of light-receiving portions, and
   the main beam, the first sub-beam, and the second sub-beam are received by the plurality of light-receiving portions, respectively; and
   a tracking error signal generator generating a tracking error signal for irradiating a desired track with a beam,
   wherein the optical recording medium has tracks arranged substantially at a constant pitch, an average of the pitch is tp, when the main beam is placed on the track, the first sub-beam and the second sub-beam are placed between the tracks, the tracking error signal generator performs a differential arithmetic operation with respect to signals output from the light-receiving portion receiving the main beam to generate a first push-pull signal, performs a differential arithmetic operation with respect to signals output from the light-receiving portions receiving the first sub-beam and the second sub-beam to generate a second push-pull signal, and performs a differential arithmetic operation with respect to the first push-pull signal and the second push-pull signal to generate the tracking error signal, in a case where an amplitude of the first push-pull signal obtained at the pitch tp is fluctuated when the light beam is scanned in a direction orthogonal to the tracks of the optical recording medium.

2. An optical pick-up head, comprising:

a light source emitting a light beam;

a diffraction unit receiving the light beam emitted from the light source to generate a plurality of diffracted beams composed of a 0th order diffracted light beam and a 1st or higher order diffracted light beam;

a condensing unit receiving the plurality of diffracted beams from the diffraction unit and condensing the beams onto an optical recording medium;

a beam splitter receiving the plurality of beams reflected from the optical recording medium and splitting the beams; and a photodetector receiving the beams split by the beam splitter and outputting signals in accordance with amounts of the received light beams, wherein the 0th order diffracted light beam generated in the diffraction unit is set to be a main beam, and two 1st or higher order diffracted light beams generated in the diffraction unit are set to be a first sub-beam and a second sub-beam, assuming that $T_{n-2}$, $T_{n-1}$, $T_n$, $T_{n+1}$, and $T_{n+2}$ represent tracks irradiated with the main beam when the main beam is scanned in a direction orthogonal to the tracks, and the main beam is placed at a center of the track $T_n$, the first sub-beam is placed between the tracks $T_{n-2}$ and $T_{n-1}$, and the second sub-beam is placed between the tracks $T_{n+1}$ and $T_{n+2}$.

3. A method for reproducing optical information using an optical pick-up head including:

a light source emitting a light beam;

a diffraction unit receiving the light beam emitted from the light source to generate a plurality of diffracted beams composed of a 0th order diffracted light beam and 1st or higher order diffracted light beams;

a condensing unit receiving the plurality of beams from the diffraction unit and condensing the beams onto an optical recording medium;

a beam splitter receiving the plurality of beams reflected from the optical recording medium and splitting the beams; and a photodetector receiving the beams split by the beam splitter and outputting signals in accordance with amounts of the received light beams, and a tracking error signal generator generating a tracking error signal for irradiating a desired track with a beam, wherein the photodetector has a plurality of light-receiving portions, the plurality of beams are radiated to positions different in a direction orthogonal to the tracks, the tracking error signal generator performs a differential arithmetic operation with respect to the signals output from the light-receiving portions to generate a push-pull signal, the optical recording medium has tracks arranged substantially at a constant pitch, and an average of the pitch is tp, and when an amplitude of the push-pull signal obtained at the pitch tp when the light beam is scanned in a direction orthogonal to the tracks of the optical recording medium is changed at a pitch different from the pitch tp, the change in the amplitude of the push-pull signal is reduced by manipulating a signal obtained from the plurality of beams.

4. An optical information apparatus, comprising:

an optical pick-up head including:

a light source emitting a light beam;

a diffraction unit receiving a beam emitted from the light source to generate a plurality of diffracted beams composed of a 0th order diffracted light beam and a 1st or higher order diffracted light beam;

a condensing unit receiving the plurality of diffracted beams from the diffraction unit and condensing the beams onto an optical recording medium;

a beam splitter receiving the plurality of beams reflected from the optical recording medium and splitting the beams; and a photodetector receiving the beams split by the beam splitter and outputting signals in accordance with amounts of the received light beams, wherein the 0th order diffracted light beam generated in the diffraction unit is set to be a main beam, and two 1st or higher order diffracted light beams generated in the diffraction unit are set to be a first sub-beam and a second sub-beam, the photodetector has a plurality of light-receiving portions, and the main beam, the first sub-beam, and the second sub-beam are received by the plurality of light-receiving portions, respectively;

wherein the light-receiving portions do not receive light in the vicinity of a center of the first sub-beam and light in the vicinity of a center of the second sub-beam; and a tracking error signal generator generating a tracking error signal for irradiating a desired track with a beam, wherein the optical recording medium has tracks arranged substantially at a constant pitch, an average of the pitch is tp, the tacking error signal generator performs a differential arithmetic operation with respect to signals output from the light-receiving portion receiving the main beam to generate a first push-pull signal, performs a differential arithmetic operation with respect to signals output from the light-receiving portions receiving the first sub-beam and the second sub-beam to generate a second push-pull signal, and performs a differential arithmetic operation with respect to the first push-pull signal and the second push-pull signal to generate the tacking error signal, in a case where an amplitude of the first push-pull signal obtained at the pitch tp is fluctuated when the light beam is scanned in a direction orthogonal to the tracks of the optical recording medium.

* * * * *